United States Patent
Elkins et al.

(10) Patent No.: US 11,591,411 B2
(45) Date of Patent: *Feb. 28, 2023

(54) REGIOSELECTIVELY SUBSTITUTED CELLULOSE ESTERS

(71) Applicant: Eastman Chemical Company, Kingsport, TN (US)

(72) Inventors: Casey Lynn Elkins, Kingsport, TN (US); Robert Jacks Sharpe, Johnson City, TN (US); Bin Wang, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/492,966

(22) PCT Filed: Mar. 28, 2018

(86) PCT No.: PCT/US2018/024805
§ 371 (c)(1),
(2) Date: Sep. 11, 2019

(87) PCT Pub. No.: WO2018/183472
PCT Pub. Date: Oct. 4, 2018

(65) Prior Publication Data
US 2020/0017607 A1    Jan. 16, 2020

Related U.S. Application Data

(60) Provisional application No. 62/478,385, filed on Mar. 29, 2017.

(51) Int. Cl.
| | | |
|---|---|---|
| *C08B 3/16* | (2006.01) | |
| *C08B 3/06* | (2006.01) | |
| *C08B 3/08* | (2006.01) | |
| *C08J 5/18* | (2006.01) | |

(52) U.S. Cl.
CPC .......... *C08B 3/16* (2013.01); *C08B 3/06* (2013.01); *C08B 3/08* (2013.01); *C08J 5/18* (2013.01); *C08J 2301/10* (2013.01); *C08J 2301/12* (2013.01); *C08J 2301/14* (2013.01)

(58) Field of Classification Search
CPC .............. C08B 3/16; C08B 3/08; C08B 3/00
See application file for complete search history.

(56) References Cited

U.S. PATENT DOCUMENTS

| | | | |
|---|---|---|---|
| 4,592,885 A | 6/1986 | Ichino et al. | |
| 7,172,713 B2 | 2/2007 | Arai et al. | |
| 8,067,488 B2 | 11/2011 | Buchanan et al. | |
| 8,344,134 B2 | 1/2013 | Shelby et al. | |
| 9,243,072 B2 | 1/2016 | Buchanan et al. | |
| 9,777,074 B2 * | 10/2017 | Buchanan | C08J 5/18 |
| 11,136,414 B2 | 10/2021 | Elkins et al. | |

| | | |
|---|---|---|
| 2005/0133953 A1 | 6/2005 | Yamazaki et al. |
| 2009/0096962 A1 | 4/2009 | Shelton et al. |
| 2010/0029927 A1 | 2/2010 | Buchanan et al. |
| 2010/0267942 A1 | 10/2010 | Buchanan et al. |
| 2012/0055356 A1 | 3/2012 | Zheng |
| 2012/0262650 A1 | 10/2012 | Buchanan et al. |
| 2013/0190485 A1 | 7/2013 | Buchanan et al. |
| 2016/0108137 A1 | 4/2016 | Buchanan et al. |

FOREIGN PATENT DOCUMENTS

| | | |
|---|---|---|
| WO | WO 91/16357 A1 | 10/1991 |
| WO | WO 2013/063336 A1 | 5/2013 |
| WO | WO 2017/184394 A1 | 10/2017 |
| WO | WO 2017/184395 A1 | 10/2017 |

OTHER PUBLICATIONS

Co-pending U.S. Appl. No. 16/492,964, filed Sep. 11, 2019; Elkins, et al.
Co-pending U.S. Appl. No. 16/492,967, filed Sep. 11, 2019; Elkins, et al.
Co-pending U.S. Appl. No. 16/492,965, filed Sep. 11, 2019; Elkins, et al.
Rouse, Ben P., Jr.; "Cellulose Derivatives", Kirk-Othmer Encyclopedia of Chemical Technology, vol. 4, 1964, 616-683.
Buchanan, Charles M., et al.; "Preparation of Cellulose [1-$^{13}$C] Acetates and Determination of Monomer Composition by NMR Spectroscopy"; Macromolecules, 24, 1991, pp. 3050-3059.
Fox, S. Carter, et al.; "Regioselective Esterification and Etherification of Cellulose: A Review"; Biomacromolecules 2011, 12, 1956-1972.
Hearon, W.M., et al.; "Cellulose Trityl Ether" *J. Am. Chem. Soc.* 1943, 65, 249-2452.
Honeyman, John; "Reactions of Cellulose" *J. Chem. Soc.* 1947, 168-173.
Edgar, Kevin J., et al.; "Advances in cellulose ester performance and application"; Prog. Polym. Sci 26, (2001), pp. 1605-1688.
Hall, David M., et al.; "Model Compounds of Cellulose: Trityl Ethers Substituted Exclusively at C-6 Primary Hydroxyls"; Journal of Applied Polymer Science, vol. 17, (1973), pp. 2891-2896.
McCormick, Charles, et al.; "Derivatization of cellulose in lithium chloride and N—N-dimethylacetamide solutions"; *Polymer* 1987, 28, 2317-2323.
Klemm, D.O.; "Cellulose Derivatives. Modification, Characterization, and Nanostructures", ACS Symposium Series 688, 1998, Oxford University Press, pp. 19-37.
Furuhata, Ken-Ichi, et al.; "Dissolution of cellulose in lithium bromide-organic solvent systems and homogeneous bromination of cellulose with N-bromosuccinimide-triphenylphosphine in lithium bromide-N,N-dimethylacetamide"; Carbohydrate Research, 230, (1992), pp. 165-177.

(Continued)

*Primary Examiner* — Leigh C Maier
*Assistant Examiner* — Everett White

(57) ABSTRACT

The present application discloses regioselectively substituted cellulose esters, films made from the regioselectively substituted cellulose esters and methods for making the same. The regioselectively substituted cellulose esters are synthesized using trifluoroacetic anhydride and cellulose with various acyl donors or acyl donor precursors.

6 Claims, No Drawings

(56) References Cited

OTHER PUBLICATIONS

Xu, Daiqiang, et al.; "Regioselective Synthesis of Cellulose Ester Homopolymers", *Biomacromolecules* 2012, 13, 2195.

Schnabelrauch, Matthias, et al.; "Readily hydrolyzable cellulose esters as intermediates for the regioselective derivatization of cellulose, 1"; Die Angewandte Makromolekulare Chemie 198, (1992), pp. 155-164.

Geddes, A.L.; "Interaction of Trifluoroacetic Acid with Cellulose and Related Compounds"; Journal of Polymer Science, vol. XXII, (1956), pp. 31-39.

Liebert, Tim, et al.; "Readily hydrolysable cellulose esters as intermediates for the regioselective derivatization of cellulose; II. Soluble, highly substituted cellulose trifluoroacetates"; Cellulose 1, (1994), pp. 249-258.

Notification of Transmittal of The International Search Report and The Written Opinion of The International Searching Authority, or the Declaration; International Application No. PCT/US2018/024805 with a filing date of Mar. 28, 2018.

Notification of Transmittal of The International Search Report and The Written Opinion of The International Searching Authority, or the Declaration; International Application No. PCT/US2018/024793 with a filing date of Mar. 28, 2018.

Notification of Transmittal of The International Search Report and The Written Opinion of The International Searching Authority, or the Declaration; International Application No. PCT/US2018/024797 with a filing date of Mar. 28, 2018.

Notification of Transmittal of The International Search Report and The Written Opinion of The International Searching Authority, or the Declaration; International Application No. PCT/US2018/024798 with a filing date of Mar. 28, 2018.

USPTO Office Action received in co-pending U.S. Appl. No. 16/492,965 dated Sep. 24, 2020.

USPTO Office Action received in co-pending U.S. Appl. No. 16/492,964 dated Sep. 25, 2020.

USPTO Office Action received in co-pending U.S. Appl. No. 16/492,967 dated Sep. 28, 2020.

USPTO Office Action received in co-pending U.S. Appl. No. 16/492,964 dated Feb. 12, 2021.

USPTO Office Action received in co-pending U.S. Appl. No. 16/492,967 dated Apr. 8, 2021.

USPTO Office Action received in co-pending U.S. Appl. No. 16/492,965 dated May 4, 2021.

USPTO Notice of Allowance received in co-pending U.S. Appl. No. 16/492,964 dated Jun. 8, 2021.

USPTO Office Action received in co-pending U.S. Appl. No. 16/492,967 dated Aug. 4, 2021.

USPTO Office Action received in co-pending U.S. Appl. No. 16/492,967 dated Dec. 29, 2021.

\* cited by examiner

REGIOSELECTIVELY SUBSTITUTED CELLULOSE ESTERS

FIELD OF THE INVENTION

This invention relates to the field of cellulose chemistry, cellulose ester compositions, methods of making cellulose ester, and films made from cellulose esters.

BACKGROUND OF THE INVENTION

Cellulose is a β-1,4-linked polymer of anhydroglucose. Cellulose is typically a high molecular weight, polydisperse polymer that is insoluble in water and virtually all common organic solvents. The use of unmodified cellulose in wood or cotton products such as housing or fabric is well known. Unmodified cellulose is also utilized in a variety of other applications usually as a film, such as cellophane, as a fiber, such as viscose rayon, or as a powder, such as microcrystalline cellulose used in pharmaceutical applications. Modified cellulose such as cellulose esters are also widely utilized in a wide variety of commercial applications. *Prog. Polym. Sci.* 2001, 26, 1605-1688. Cellulose esters are generally prepared by first converting cellulose to a cellulose triester before hydrolyzing the cellulose triester in acidic aqueous media to the desired degree of substitution. Hydrolysis of cellulose triacetate under these conditions yields a random copolymer that can consist of 8 different monomers depending upon the final degree of substitution. *Macromolecules* 1991, 24, 3050.

This application describes new regioselectively substituted cellulose esters prepared by first treating cellulose with trifluoroacetic anhydride in trifluoroacetic acid, followed by the addition of acyl donors or acyl donor precursors.

SUMMARY OF THE INVENTION

The present application discloses a regioselectively substituted cellulose ester comprising:
(i) a plurality of $R^1$—CO-substituents; and
(ii) a plurality of hydroxyl substituents,
wherein the degree of substitution of $R^1$—CO— at the C2 position ("$C2DS_{R1}$") is in the range of from about 0.2 to about 1.0,
wherein the degree of substitution of $R^1$—CO— at the C3 position ("$C3DS_{R1}$") is in the range of from about 0.2 to about 1.0,
wherein the degree of substitution of $R^1$—CO— at the C6 position ("$C6DS_{R1}$") is in the range of from about 0 to about 0.5,
wherein the degree of substitution of hydroxyl is in the range of from about 0 to about 2.6, and
wherein $R^1$ is chosen from $(C_{1-20})$alkyl; halo$(C_{1-20})$alkyl; $(C_{2-20})$alkenyl, $(C_{3-7})$cycloalkyl, $(C_{6-20})$aryl, wherein the aryl is unsubstituted or substituted by 1 to 6 $R^2$ groups; or a 5- to 20 membered heteroaryl containing 1 to 3 heteroatoms independently selected from oxygen, sulfur, and nitrogen, wherein the heteroaryl is unsubstituted or substituted by 1 to 6 $R^3$ groups,
$R^2$ is chosen from $(C_{1-6})$alkyl, halo$(C_{1-6})$alkyl, $(C_{1-6})$alkoxy, halo$(C_{1-6})$alkoxy, halo, $(C_{3-7})$cycloalkyl, $(C_{6-10})$aryl, or nitro, and
$R^3$ is chosen from $(C_{1-6})$alkyl, halo$(C_{1-6})$alkyl, $(C_{1-6})$alkoxy, halo$(C_{1-6})$alkoxy, halo, $(C_{3-7})$cycloalkyl, $(C_{6-10})$aryl, or nitro.

The present application also discloses a regioselectively substituted cellulose ester comprising:
(i) a plurality of $R^1$—CO-substituents;
(ii) a plurality of $R^4$—CO-substituents;
(iii) a plurality of hydroxyl substituents,
wherein the degree of substitution of $R^1$—CO— at the C2 position ("$C2DS_{R1}$") is in the range of from about 0.2 to about 1.0,
wherein the degree of substitution of $R^1$—CO— at the C3 position ("$C3DS_{R1}$") is in the range of from about 0.2 to about 1.0,
wherein the degree of substitution of $R^1$—CO— at the C6 position ("$C6DS_{R1}$") is in the range of from about 0 to about 0.5,
wherein the degree of substitution of $R^4$—CO— at the C6 position ("$C6DS_{R4}$") is in the range of from about 0.1 to about 1.0,
wherein the degree of substitution of hydroxyl is in the range of from about 0 to about 2.6,
wherein $R^1$ is chosen from $(C_{1-20})$alkyl; halo$(C_{1-20})$alkyl; $(C_{2-20})$alkenyl, $(C_{3-7})$cycloalkyl, $(C_{6-20})$aryl, wherein the aryl is unsubstituted or substituted by 1 to 6 $R^2$ groups; or a 5- to 20 membered heteroaryl containing 1 to 3 heteroatoms independently selected from oxygen, sulfur, and nitrogen, wherein the heteroaryl is unsubstituted or substituted by 1 to 6 $R^3$ groups,
wherein $R^2$ is chosen from $(C_{1-6})$alkyl, halo$(C_{1-6})$alkyl, $(C_{1-6})$alkoxy, halo$(C_{1-6})$alkoxy, halo, $(C_{3-7})$cycloalkyl, $(C_{6-10})$aryl, or nitro,
wherein $R^3$ is chosen from $(C_{1-6})$alkyl, halo$(C_{1-6})$alkyl, $(C_{1-6})$alkoxy, halo$(C_{1-6})$alkoxy, halo, $(C_{3-7})$cycloalkyl, $(C_{6-10})$aryl, or nitro;
wherein $R^4$ is chosen from $(C_{1-20})$alkyl; halo$(C_{1-5})$alkyl; $(C_{2-20})$alkenyl, $(C_{3-7})$cycloalkyl, $(C_{6-20})$aryl, wherein the aryl is unsubstituted or
substituted by 1 to 6 $R^5$ groups; or monocyclic or bicyclic heteroaryl containing 1 to 3 heteroatoms independently selected from oxygen, sulfur, and nitrogen, wherein the heteroaryl is unsubstituted or substituted by 1 to 6 $R^6$ groups,
$R^5$ is chosen from $(C_{1-6})$alkyl, halo$(C_{1-6})$alkyl, $(C_{1-6})$alkoxy, halo$(C_{1-6})$alkoxy, halo, $(C_{3-7})$cycloalkyl, $(C_{6-10})$aryl, or nitro, and
$R^6$ is chosen from $(C_{1-6})$alkyl, halo$(C_{1-6})$alkyl, $(C_{1-6})$alkoxy, halo$(C_{1-6})$alkoxy, halo, $(C_{3-7})$cycloalkyl, $(C_{6-10})$aryl, or nitro.

The present application also discloses films made from the regioselectively substituted cellulose esters disclosed herein. The present application also discloses processes for preparing the regioselectively substituted cellulose esters disclosed herein.

DETAILED DESCRIPTION

In this specification and in the claims that follow, reference will be made to a number of terms, which shall be defined to have the following meanings.

The singular forms "a," "an," and "the" include plural referents unless the context clearly dictates otherwise.

Values may be expressed as "about" or "approximately" a given number. Similarly, ranges may be expressed herein as from "about" one particular value and/or to "about" or another particular value. When such a range is expressed, another aspect includes from the one particular value and/or to the other particular value. Similarly, when values are expressed as approximations, by use of the antecedent "about," it will be understood that the particular value forms another aspect.

Optical films are commonly quantified in terms of birefringence which is, in turn, related to the refractive index n. The refractive index can typically be in the range of 1.4 to 1.8 for polymers in general, and can be approximately 1.46 to 1.50 for cellulose esters. The higher the refractive index, the slower a light wave propagates through that given material.

For an unoriented isotropic material, the refractive index will be the same regardless of the polarization state of the entering light wave. As the material becomes oriented, or otherwise anisotropic, the refractive index becomes dependent on material direction. For purposes of the present invention, there are three refractive indices of importance, denoted $n_x$, $n_y$, and $n_z$, which correspond to the machine direction ("MD"), the transverse direction ("TD") and the thickness direction respectively. As the material becomes more anisotropic (e.g., by stretching), the difference between any two refractive indices will increase. This difference is referred to as the "birefringence." Because there are many combinations of material directions to choose from, there are correspondingly different values of birefringence. The two that are the most common, namely the planar birefringence (or "in-plane" birefringence) $\Delta_e$ and the thickness birefringence (or "out-of-plane" birefringence) $\Delta_{th}$, are defined as:

$$\Delta_e = n_x - n_y \tag{1a}$$

$$\Delta_{th} = n_z - (n_x + n_y)/2 \tag{1b}$$

The birefringence $\Delta_e$ is a measure of the relative in-plane orientation between the MD and TD directions and is dimensionless. In contrast $\Delta_{th}$ gives a measure of the orientation of the thickness direction, relative to the average planar orientation.

Another term often used with regards to optical films is the optical retardation R. R is simply the birefringence times the thickness d, of the film in question. Thus, $$R_e = \Delta_e d = (n_x - n_y)d \tag{2a}$$

$$R_{th} = \Delta_{th} d = [n_z - (n_x + n_y)/2]d \tag{2b}$$

Retardation is a direct measure of the relative phase shift between the two orthogonal optical waves and is typically reported in units of nanometers (nm). Note that the definition of $R_{th}$ varies among some authors, particularly with regards to the sign (+/−), depending on how $R_{th}$ is calculated.

Materials are also known to vary with regards to their birefringence/retardation behavior. For example, most materials when stretched will exhibit a higher refractive index along the stretch direction and a lower refractive index perpendicular to the stretch. This follows because, on a molecular level, the refractive index is typically higher along the polymer chain's axis and lower perpendicular to the chain. These materials are commonly termed "positively birefringent" and represent most standard polymers, including current commercial cellulose esters. Note that, as we will describe later, a positively birefringent material can be used to make either positive or negative birefringent films or waveplates.

To avoid confusion, the birefringence behavior of the polymer molecule itself will be referred to as the "intrinsic birefringence" and is a property of the polymer. From a material optics standpoint, intrinsic birefringence is a measure of the birefringence that would occur if the material was fully stretched with all chains perfectly aligned in one direction (for most polymers this is a theoretical limit since they can never be fully aligned). For purposes of the present invention, it also provides a measure of the sensitivity of a given polymer to a given amount of chain orientation. For example, a sample with high intrinsic birefringence is going to exhibit more birefringence during film formation than a sample with low intrinsic birefringence, even though the relative stress levels in the film are approximately the same.

Polymers can have positive, negative, or zero intrinsic birefringence. Negative intrinsic birefringent polymers exhibit a higher refractive index perpendicular to the stretch direction (relative to the parallel direction). Certain styrenics and acrylics can have negative intrinsic birefringent behavior due to their rather bulky side groups. Depending on composition, some cellulose esters having aromatic ring structures can exhibit negative intrinsic birefringence as well. Zero intrinsic birefringence, in contrast, is a special case and represents materials that show no birefringence with stretching and thus have a zero intrinsic birefringence. Such materials can be ideal for certain optical applications as they can be molded, stretched, or otherwise stressed during processing without showing any optical retardation or distortion.

The actual compensation film(s) that is used in an LCD can take on a variety of forms including biaxial films where all three refractive indices differ and two optical axes exist, and uniaxial films having only one optical axis where two of the three refractive indices are the same. There are also other classes of compensation films where the optical axes twist or tilt through the thickness of the film (e.g., discotic films), but these are generally of lesser importance. Generally, the type of compensation film that can be made is limited by the birefringence characteristics of the polymer (i.e., positive, negative or zero intrinsic birefringence). The sign can be placed before or after the type of film (e.g., +A or A+). A few examples are described below.

In the case of uniaxial films, a film having refractive indices such that $$n_x > n_y = n_z \text{ "+A" optical film} \tag{3a}$$

is denoted as a "+A" optical film. In such films, the x-direction (machine direction) of the film has a high refractive index, whereas the y and thickness directions are approximately equal in magnitude (and lower than $n_x$). This type of film is also referred to as a positive uniaxial crystal structure with the optic axis along the x-direction. Such films can be made by uniaxially stretching a positive intrinsic birefringent material using, for example, a film stretcher.

In contrast, a "−A" uniaxial film is defined as $$n_x < n_y = n_z \text{ "−A" optical film} \tag{3b}$$

where the x-axis refractive index is lower than the other directions (which are approximately equal). One method for making a −A optical film is to stretch a negative intrinsic birefringent polymer or, alternately, by coating a negatively (intrinsic) birefringent liquid crystal polymer onto a surface such that the molecules are lined up in a preferred direction (for example, by using an underlying etched orientation layer).

In terms of retardation, "±A" optical films have the following relationship between $R_e$ and $R_{th}$, shown in (3c):

$$R_{th} = -R_e/2 \text{ "±A" optical films} \tag{3c}$$

Another class of uniaxial optical films is the C optical film which can also be "+C" or "−C". The difference between a C and an A optical film is that, in C optical films, the unique refractive index (or optical axis) is in the thickness direction as opposed to in the plane of the film. Thus, $$n_z > n_y = n_x \quad \text{``+C'' optical film} \quad (4a)$$

$$n_z < n_y = n_x \quad \text{``-C'' optical film} \quad (4b)$$

C optical films can be produced by taking advantage of the stresses that form during solvent casting of a film. Tensile stresses are generally created in the plane of the film due to the restraint imposed by the casting belt, which are also equi-biaxial stretched in nature. These tend to align the chains in the plane of the film resulting in –C or +C films for positive and negative intrinsic birefringent materials respectively. As many cellulose ester films used in displays are solvent cast, and many are essentially positive birefringent, then it is apparent that solvent cast cellulose esters normally only produce –C optical films. These films can also be uniaxially stretched to produce +A optical films (assuming the initial as-cast retardation is very low).

Besides uniaxial optical films, it is also possible to use biaxial oriented films. Biaxial films are quantified in a variety of ways including simply listing the 3 refractive indices $n_x$, $n_y$, and $n_z$ in the principal directions (along with the direction of these principal axes). Generally, $n_x \neq n_y \neq n_z$.

One specific biaxial oriented film has unique optical properties to compensate light leakage of a pair of crossed polarizer or in-plane switching ("IPS") mode liquid crystal displays. The optical film has a parameter Nz in the range of from about 0.4 to about 0.9, or equals about 0.5, where Nz is defined as $$Nz = (n_x - n_z)/(n_x - n_y) \quad (5)$$

This parameter gives the effective out-of-plane birefringence relative to the in-plane birefringence. Nz can be chosen to be about 0.5 when used as a compensation film for a pair of crossed polarizers. When Nz is about 0.5, the corresponding out-of-plane retardation, $R^{th}$, equals about 0.0 nm.

To show the optical film's compensation effect, the following light transmission or leakage of a pair of crossed polarizers with and without compensation films is calculated by computer simulation.

"Degree of substitution" means the average number of substituents per anhydroglucose monomer of the cellulose ester. Degree of substitution can refer to a substituent attached to the anhydroglucose monomer, for example an acyl group. Degree of substitution can also refer to the number of free hydroxyl groups on the anhydroglucose monomer. The degree of substitution can specify the position on the anhydroglucose monomer. For example, the degree of substitution can apply to the C2, C3, or C6 position of the anhydroglucose monomer (e.g., C2DS, C3DS, C6DS):

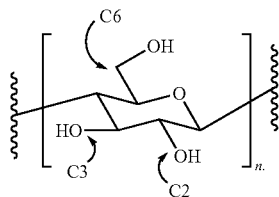

Alternatively, the positional degree of substitution can be expressed by indicating the position before the term "degree of substitution" (e.g., C2 degree of substitution or combined C2 and C3 degree of substitution).

"Degree of polymerization" means the number of glucose units that make up one polymer molecule.

Regioselectively substituted cellulose esters suitable for use in making optical films can comprise a plurality of alkyl-acyl substituents and a plurality of aryl-acyl substituents. As used herein, the term "acyl substituent" shall denote a substituent having the structure:

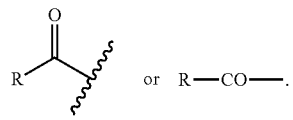

Such acyl groups in cellulose esters are generally bound to the pyranose ring of the cellulose via an ester linkage (i.e., through an oxygen atom).

As used herein, the term "alkyl-acyl" shall denote an acyl substituent where "R" is an alkyl group. Often the carbon units of the alkyl groups are included; for example, $(C_{1-6})$ alkyl-acyl. Examples of alkyl-acyl groups include acetyl, propionyl, butyryl, and the like.

As used herein, the term "alkyl" shall denote a hydrocarbon substituent. Alkyl groups suitable for use herein can be straight, branched, or cyclic, and can be saturated or unsaturated. The carbon units in the alkyl group is often included; for example $(C_{1-6})$alkyl. Alkyl groups suitable for use herein include any $(C_{1-20})$, $(C_{1-12})$, $(C_{1-5})$, or $(C_{1-3})$ alkyl groups. In various embodiments, the alkyl can be a $C_{1-5}$ straight chain alkyl group. In still other embodiments, the alkyl can be a $C_{1-3}$ straight chain alkyl group. Specific examples of suitable alkyl groups include, but are not limited to, methyl, ethyl, n-propyl, isopropyl, n-butyl, isobutyl, sec-butyl, tert-butyl, pentyl, hexyl, octyl, decyl, dodecyl, cyclopentyl, and cyclohexyl groups.

The acylating agents can be any known in the art for acylating cellulose to produce cellulose esters. In one embodiment of the invention, the acylating reagent is one or more $C_1$-$C_{20}$ straight- or branched-chain alkyl or aryl carboxylic anhydrides, carboxylic acid halides, diketene, or acetoacetic acid esters. Examples of carboxylic anhydrides include, but are not limited to, acetic anhydride, propionic anhydride, butyric anhydride, isobutyric anhydride, valeric anhydride, hexanoic anhydride, 2-ethylhexanoic anhydride, nonanoic anhydride, lauric anhydride, palmitic anhydride, stearic anhydride, benzoic anhydride, substituted benzoic anhydrides, phthalic anhydride, and isophthalic anhydride. Examples of carboxylic acid halides include, but are not limited to, acetyl, propionyl, butyryl, hexanoyl, 2-ethylhexanoyl, lauroyl, palmitoyl, benzoyl, substituted benzoyl, and stearoyl halides. Examples of acetoacetic acid esters include, but are not limited to, methyl acetoacetate, ethyl acetoacetate, propyl acetoacetate, butyl acetoacetate, and tert-butyl acetoacetate. In one embodiment of the invention, the acylating reagent is at least one $C_2$-$C_9$ straight- or branched-chain alkyl carboxylic anhydrides selected from the group consisting of acetic anhydride, propionic anhydride, butyric anhydride, 2-ethylhexanoic anhydride, nonanoic anhydride, and stearic anhydride. The acylating reagents can be added after the cellulose has been dissolved in the tetraalkylammonium alkylphosphate. If so desired, the acylating reagent can be added to the tetraalkylammonium alkylphosphate prior to dissolving the cellulose in the tetraalkylammonium alkylphosphate. In another embodiment, the tetraalkylammonium alkylphosphate and the acylating reagent can be added simultaneously to the cellulose to produce the cellulose solution.

"Haloalkyl" means an alkyl substituent where at least one hydrogen is replaced with a halogen group. The carbon units in the haloalkyl group is often included; for example halo $(C_{1-6})$alkyl. The haloalkyl group can be straight or branched. Nonlimiting examples of haloalkyl include chloromethyl, trifluoromethyl, dibromoethyl and the like.

"Alkenyl" means an alkyl group of at least two carbon units containing at least one double bond. The carbon units in the alkenyl group is often included; for example $(C_{2-6})$ alkenyl. The alkenyl group can be straight or branched. Nonlimiting examples of alkenyl include ethenyl, allyl, 1-butenyl, and the like.

"Cycloalkyl" means a cyclic alkyl group having at least three carbon units. The carbon units in the cycloalkyl group is often included; for example $(C_{3-8})$cycloalkyl. Nonlimiting examples of cycloalkyl include cyclopropyl, cyclobutyl, cyclohexyl, cycloheptyl, and the like.

"Aryl" means an aromatic carbocyclic group. The aryl group can be monocyclic or polycyclic. If one of the rings in the polycyclic ring system is aryl, then the polycyclic ring system is considered aryl. In other words, all of the carbocyclic rings in a polycyclic aryl group do not have to be aromatic. The carbon units in the aryl group is often included; for example $(C_{6-20})$aryl. Nonlimiting examples of aryl include phenyl, naphthalenyl, 1,2,3,4-tetrahydronaphthalenyl, and the like.

"Heteroaryl" means an aryl where at least one of the carbon units in the aryl ring is replaced with a heteroatom such as O, N, and S. The heteroaryl is ring can be monocyclic or polycyclic. Often the units making up the heteroaryl ring system is include; for example a 5- to 20-membered ring system. A 5-membered heteroaryl means a ring system having five atoms forming the heteroaryl ring. Nonlimiting examples of heteroaryl include pyridinyl, quinolinyl, pyrimidinyl, thiophenyl and the like.

"Alkoxy" means alkyl-O— or an alkyl group terminally attached to an oxygen group. Often the carbon units are included; for example $(C_{1-6})$alkoxy. Nonlimiting examples of alkoxy include methoxy, ethoxy, propoxy and the like.

"Haloalkoxy" means alkoxy where at least one of the hydrogens is replace with a halogent. Often the carbon units are included; for example halo$(C_{1-6})$alkoxy. Nonlimiting examples of haloalkoxy include trifluoromethoxy, bromomethoxy, 1-bromo-ethoxy and the like.

"Halo" means halogen such as fluoro, chloro, bromo, or iodo.

A "Reverse A film" is a film that satisfies the following conditions: The in-plane retardation is in the range of from about 100 nm to about 300 nm as measured at 589 nm, $R_e450/R_e550$ is less than 1, and $R_e650/R_e550$ is greater than 1, wherein $R_e450$, $R_e550$, and $R_e650$ are the in-plan retardation values of the film as measured at a wavelength of 450 nm, 550 nm and 650 nm, respectively.

A "Reverse NRZ film" is a film that satisfies the following conditions: The in-plane retardation ("$R_e$") is in the range of from about 100 nm to about 300 nm as measured at 589 nm, out-plane retardation ("$R_{th}$") is in the range of from about −50 nm to about 0 nm, $R_e450/R_e550$ is less than 1, and $R_e650/R_e550$ is greater than 1, wherein $R_e450$, $R_e550$, and $R_e650$ are the in-plan retardation values of the film as measured at a wavelength of 450 nm, 550 nm and 650 nm, respectively.

A "NRZ film" is a film that satisfies the following conditions: Using the Nz value, which is $n_z=(n_x-n_z)/(n_x-n_y)$ =0.5. Alternatively, using the $R_{th}$ value, which $R_{th}=[n_z-(n_x+n_y)/2]*d=0$. Here, $n_x$, $n_y$, and $n_z$ are refractive indexes of the film in the x, y, and z directions, respectively, and d is the film thickness.

As used herein the term "chosen from" when used with "and" or "or" have the following meanings: A variable chosen from A, B and C means that the variable can be A alone, B alone, or C alone. A variable A, B, or C means that the variable can be A alone, B alone, C alone, A and B in combination, B and C in combination, A and C in combination, or A, B, and C in combination.

The cellulose esters prepared by the methods of this invention are useful in a variety of applications. Those skilled in the art will understand that the specific application will depend upon the specific type of cellulose ester as factors such as the type of acyl substituent, DS, MW, and type of cellulose ester copolymer significantly impact cellulose ester physical properties. *Prop. Polym. Sci.* 2001, 26, 1605-1688.

In yet another embodiment of the invention, the cellulose esters are used in coating applications. Examples of coating applications include but, are not limited to, automotive, wood, plastic, or metal coatings. Examples of preferred cellulose esters for use in coating applications include cellulose acetate, cellulose propionate, cellulose butyrate, cellulose acetate propionate, cellulose acetate butyrate, or a mixture thereof.

In still another embodiment of the invention, the cellulose esters are used in applications involving solvent casting of film. Examples of these applications include photographic film and protective and compensation films for liquid crystalline displays. Examples of preferred cellulose ester for use in solvent cast film applications include cellulose triacetate, cellulose acetate, cellulose propionate, and cellulose acetate propionate.

In still another embodiment of the invention, the cellulose esters of the present invention can be used in applications involving solvent casting of film. Examples of such applications include photographic film, protective film, and compensation film for LCDs. Examples of cellulose esters suitable for use in solvent cast film applications include, but are not limited to, cellulose triacetate, cellulose acetate, cellulose propionate, and cellulose acetate propionate.

In an embodiment of the invention, films are produced comprising cellulose esters of the present invention and are used as protective and compensation films for LCD. These films can be prepared by solvent casting as described in US 2009/0096962 or by melt extrusion as described in U.S. Pat. No. 8,344,134, both of which are incorporated in their entirety in this invention to the extent they do not contradict the statements herein.

When used as a protective film, the film is typically laminated to either side of an oriented, iodinated PVOH polarizing film to protect the PVOH layer from scratching and moisture, while also increasing structural rigidity. When used as compensation films (or plates), they can be laminated with the polarizer stack or otherwise included between the polarizer and liquid crystal layers. These compensation films can improve the contrast ratio, wide viewing angle, and color shift performance of the LCD. The reason for this important function is that for a typical set of crossed polarizers used in an LCD, there is significant light leakage along the diagonals (leading to poor contrast ratio), particularly as the viewing angle is increased. It is known that various combinations of optical films can be used to correct or "compensate" for this light leakage. These compensation films must have certain well-defined retardation (or birefringence) values, which vary depending on the type of liquid crystal cell or mode used because the liquid crystal cell itself will also impart a certain degree of undesirable optical retardation that must be corrected.

Compensation films are commonly quantified in terms of birefringence, which is, in turn, related to the refractive index n. For cellulose esters, the refractive index is approximately 1.46 to 1.50. For an unoriented isotropic material, the refractive index will be the same regardless of the polarization state of the entering light wave. As the material becomes oriented, or otherwise anisotropic, the refractive index becomes dependent on material direction. For purposes of the present invention, there are three refractive indices of importance denoted $n_x$, $n_y$, and $n_z$, which correspond to the MD, the TD, and the thickness direction, respectively. As the material becomes more anisotropic (e.g. by stretching), the difference between any two refractive indices will increase. This difference in refractive index is referred to as the birefringence of the material for that particular combination of refractive indices. Because there are many combinations of material directions to choose from, there are correspondingly different values of birefringence. The two most common birefringence parameters are the planar birefringence defined as $\Delta_e = n_x - n_y$, and the thickness birefringence ($\Delta_{th}$) defined as: $\Delta_{th} = n_z - (n_x+n_y)/2$. The birefringence $\Delta_e$ is a measure of the relative in-plane orientation between the MD and TD and is dimensionless. In contrast, $\Delta_{th}$ gives a measure of the orientation of the thickness direction, relative to the average planar orientation.

Optical retardation (R) is related the birefringence by the thickness (d) of the film: $R_e = \Delta_e d = (n_x - n_y)d$; $R_{th} = \Delta_{th} d = [n_z - (n_x+n_y)/2]$. Retardation is a direct measure of the relative phase shift between the two orthogonal optical waves and is typically reported in units of nanometers (nm). Note that the definition of $R_{th}$ varies with some authors, particularly with regards to the sign (±).

Materials are also known to vary with regards to their birefringence/retardation behavior. For example, most materials when stretched will exhibit a higher refractive index along the stretch direction and a lower refractive index perpendicular to the stretch. This follows because, on a molecular level, the refractive index is typically higher along the polymer chain's axis and lower perpendicular to the chain. These materials are commonly termed "positively birefringent" and represent most standard polymers including all current conventional cellulose esters.

To avoid confusion, the birefringence behavior of the polymer molecule itself will be referred to as the "intrinsic birefringence" and is a property of the polymer. From a material optics standpoint, intrinsic birefringence is a measure of the birefringence that would occur if the material was fully stretched with all chains perfectly aligned in one direction (for most polymers this is a theoretical limit since they can never be fully aligned). For purposes of the present invention, it also provides a measure of the sensitivity of a given polymer to a given amount of chain orientation. For example, a sample with high intrinsic birefringence is going to exhibit more birefringence during film formation than a sample with low intrinsic birefringence, even though the relative stress levels in the film are approximately the same.

Polymers can have positive, negative, or zero intrinsic birefringence. Negative (intrinsic) birefringent polymers exhibit a higher refractive index perpendicular to the stretch direction (relative to the parallel direction), and consequently also have a negative intrinsic birefringence. Certain styrenics and acrylics are known to have negative intrinsic birefringent behavior due to their rather bulky side groups. Depending on composition, some cellulose esters with aromatic ring structure exhibit negative intrinsic birefringence as well. Zero intrinsic birefringence, in contrast, is a special case and represents materials that show no birefringence with stretching and thus have a zero intrinsic birefringence. Such materials are ideal for optical applications as they can be molded, stretched, or otherwise stressed during processing without showing any optical retardation or distortion.

The actual compensation film(s) that is used in an LCD can take on a variety of forms including biaxial films where all three refractive indices differ and two optical axes exist, and uniaxial films having only one optical axis where two of the three refractive indices are the same. There are also other classes of compensation films where the optical axes twist or tilt through the thickness of the film (e.g. discotic films), but these are of lesser importance to understanding the present invention. The important point is that the type of compensation film that can be made is limited by the birefringence characteristics of the polymer (i.e. positive, negative or zero intrinsic birefringence).

Compensation films or plates can take many forms depending upon the mode in which the LCD display device operates. For example, a C-plate compensation film is isotropic in the x-y plane, and the plate can be positive (+C) or negative (−C). In the case of +C plates, $n_x = n_y < n_z$. In the case of −C plates, $n_x = n_y > n_z$. Another example is A-plate compensation film which is isotropic in the y-z direction, and again, the plate can be positive (+A) or negative (−A). In the case of +A plates, $n_x > n_y = n_z$. In the case of −A plates, $n_x < n_y = n_z$.

In general, aliphatic cellulose esters provide values of $R_{th}$ ranging from about 0 to about −350 nm at a film thickness of 60 μm. The most important factors that influence the observed $R_{th}$ is type of substituent and the $DS_{OH}$. Film produced using cellulose mixed esters with very low $DS_{OH}$ had $R_{th}$ values ranging from about 0 to about −50 nm. U.S. Pat. No. 8,344,134. By significantly increasing $DS_{OH}$ of the cellulose mixed ester demonstrated that larger absolute values of $R_{th}$ ranging from about −100 to about −350 nm could be obtained. US Appln. No. 2009/0096962. Cellulose acetates typically provide $R_{th}$ values ranging from about −40 to about −90 nm depending upon $DS_{OH}$.

In order to obtain the desired $R_e$ values using the cellulose esters of the present invention, the films must be stretched. By adjusting the stretch conditions such as stretch temperature, stretch type (uniaxial or biaxial), stretch ratio, pre-heat time and temperature, and post-stretch annealing time and temperature the desired $R_e$, and $R_{th}$, can be achieved. The precise stretching conditions depend upon the specific composition of the cellulose esters, the amount and type of plasticizer, and the glass transition temperature of that specific composition. Hence, the specific stretching conditions can vary widely. The stretching temperature can range from 140° C. to 190° C. The stretch ratio can range from 1.0 to 1.3 in the machine direction (MD) and can range from 1.1 to 1.8 in the TD. The pre-heat time can range from 10 to 300 s, and the pre-heat temperature can be the same as the stretch temperature. The post-annealing time can range from 0 to 300 s, and the post-annealing temperature can range from 10° C. to 40° C. below the stretching temperature. Film thickness is depends upon the film thickness before stretching and upon the stretching conditions. After stretching, the preferred film thickness is from about 10 μm to about 200 μm. More preferred is when the film thickness is from about 20 μm to about 100 μm. Even more preferred is when the film thickness is from about 25 μm to about 70 μm.

Regioselectively Substituted Cellulose Esters

The present invention discloses a regioselectively substituted cellulose ester comprising: (i) a plurality of $R^1$—CO— substituents; and (ii) a plurality of hydroxyl substituents; wherein the degree of substitution of $R^1$—CO— at the C2 position ("C2DS$_{R1}$") is in the range of from about 0.2 to about 1.0, wherein the degree of substitution of $R^1$—CO— at the C3 position ("C3DS$_{R1}$") is in the range of from about 0.2 to about 1.0, wherein the degree of substitution of $R^1$—CO— at the C6 position ("C6DS$_{R1}$") is in the range of from about 0 to about 0.5, wherein the degree of substitution of hydroxyl is in the range of from about 0 to about 2.6, and wherein $R^1$ is chosen from $(C_{1-20})$alkyl; halo$(C_{1-20})$alkyl; $(C_{2-20})$alkenyl, $(C_{3-7})$cycloalkyl, $(C_{6-20})$aryl, wherein the aryl is unsubstituted or substituted by 1 to 6 $R^2$ groups; or a 5- to 20 membered heteroaryl containing 1 to 3 heteroatoms independently selected from oxygen, sulfur, and nitrogen, wherein the heteroaryl is unsubstituted or substituted by 1 to 6 $R^3$ groups, wherein $R^2$ is chosen from $(C_{1-6})$alkyl, halo$(C_{1-6})$alkyl, $(C_{1-6})$alkoxy, halo$(C_{1-6})$alkoxy, halo, $(C_{3-7})$cycloalkyl, $(C_{6-10})$aryl, or nitro, and wherein $R^3$ is chosen from $(C_{1-6})$alkyl, halo$(C_{1-6})$alkyl, $(C_{1-6})$alkoxy, halo$(C_{1-6})$alkoxy, halo, $(C_{3-7})$cycloalkyl, $(C_{6-10})$aryl, or nitro.

In one embodiment, wherein the degree of substitution of hydroxyl is in the range of from about 0.5 to about 2.6. In one embodiment, wherein the degree of substitution of hydroxyl is in the range of from about 0.1 to about 2.6. In one embodiment, wherein the degree of substitution of hydroxyl is in the range of from about 0.2 to about 2.6. In one embodiment, wherein the degree of substitution of hydroxyl is in the range of from about 0.3 to about 2.6. In one embodiment, wherein the degree of substitution of hydroxyl is in the range of from about 0.4 to about 2.6.

In one embodiment of the regioselectively substituted cellulose ester, the weight average molecular weight ("Mw") of the regioselectively substituted cellulose ester is in the range of from about 5,000 Da to about 250,000 Da. In one embodiment of the regioselectively substituted cellulose ester, the weight average molecular weight ("Mw") of the regioselectively substituted cellulose ester is in the range of from about 25,000 Da to about 250,000 Da. In one embodiment of the regioselectively substituted cellulose ester, the weight average molecular weight ("Mw") of the regioselectively substituted cellulose ester is in the range of from about 50,000 Da to about 250,000 Da. In one embodiment of the regioselectively substituted cellulose ester, the weight average molecular weight ("Mw") of the regioselectively substituted cellulose ester is in the range of from about 80,000 Da to about 250,000 Da. In one embodiment of the regioselectively substituted cellulose ester, the weight average molecular weight ("Mw") of the regioselectively substituted cellulose ester is in the range of from about 80,000 Da to about 150,000 Da. In one embodiment of the regioselectively substituted cellulose ester, the weight average molecular weight ("Mw") of the regioselectively substituted cellulose ester is in the range of from about 100,000 Da to about 150,000 Da.

In one embodiment of the regioselectively substituted cellulose ester, $R^1$ is chosen from a $(C_{1-20})$alkyl, halo$(C_{1-20})$alkyl, or an $(C_{6-20})$aryl, wherein the aryl is unsubstituted or substituted by 1 to 6 $R^2$ groups, and $R^2$ is chosen from $(C_{1-6})$alkyl, halo$(C_{1-6})$alkyl, $(C_{1-6})$alkoxy, halo$(C_{1-6})$alkoxy, halo, $(C_{3-7})$cycloalkyl, $(C_{6-10})$aryl, or nitro. In one class of this embodiment, the weight average molecular weight ("M$_w$") of the regioselectively substituted cellulose ester is in the range of from about 80,000 Da to about 250,000 Da. In one class of this embodiment, the weight average molecular weight ("M$_w$") of the regioselectively substituted cellulose ester is in the range of from about 80,000 Da to about 150,000 Da. In one class of this embodiment, the weight average molecular weight ("M$_w$") of the regioselectively substituted cellulose ester is in the range of from about 100,000 Da to about 150,000 Da.

In one embodiment of the regioselectively substituted cellulose ester, $R^1$ is chosen from a $(C_{1-20})$alkyl. In one class of this embodiment, the weight average molecular weight ("M$_w$") of the regioselectively substituted cellulose ester is in the range of from about 80,000 Da to about 250,000 Da. In one class of this embodiment, the weight average molecular weight ("M$_w$") of the regioselectively substituted cellulose ester is in the range of from about 80,000 Da to about 150,000 Da. In one class of this embodiment, the weight average molecular weight ("M$_w$") of the regioselectively substituted cellulose ester is in the range of from about 100,000 Da to about 150,000 Da.

In one embodiment of the regioselectively substituted cellulose ester, $R^1$ is an $(C_{6-20})$aryl, wherein the aryl is unsubstituted or substituted by 1 to 6 $R^2$ groups, and $R^2$ is chosen from $(C_{1-6})$alkyl, halo$(C_{1-6})$alkyl, $(C_{1-6})$alkoxy, halo$(C_{1-6})$alkoxy, halo, $(C_{3-7})$cycloalkyl, $(C_{6-10})$aryl, or nitro. In one class of this embodiment, the weight average molecular weight ("M$_w$") of the regioselectively substituted cellulose ester is in the range of from about 80,000 Da to about 250,000 Da. In one class of this embodiment, the weight average molecular weight ("M$_w$") of the regioselectively substituted cellulose ester is in the range of from about 80,000 Da to about 150,000 Da. In one class of this embodiment, the weight average molecular weight ("M$_w$") of the regioselectively substituted cellulose ester is in the range of from about 100,000 Da to about 150,000 Da.

In one embodiment of the regioselectively substituted cellulose ester, $R^1$ is chosen from methyl, ethyl, propyl, 1-ethyl-pentyl-, phenyl, 3,4,5-trimethoxyphenyl, 2-naphthyl, benzothiophenyl, or heptadecanyl. In one class of this embodiment, the weight average molecular weight ("M$_w$") of the regioselectively substituted cellulose ester is in the range of from about 80,000 Da to about 250,000 Da In one class of this embodiment, the weight average molecular weight ("M$_w$") of the regioselectively substituted cellulose ester is in the range of from about 80,000 Da to about 150,000 Da. In one class of this embodiment, the weight average molecular weight ("M$_w$") of the regioselectively substituted cellulose ester is in the range of from about 100,000 Da to about 150,000 Da.

In one embodiment of the regioselectively substituted cellulose ester, the degree of substitution of $R^1$—CO— at the C6 position ("C6DS$_{R1}$") is in the range of from about 0 to about 0.3. In one class of this embodiment, the weight average molecular weight ("Mw") of the regioselectively substituted cellulose ester is in the range of from about 80,000 Da to about 250,000 Da In one class of this embodiment, the weight average molecular weight ("Mw") of the regioselectively substituted cellulose ester is in the range of from about 80,000 Da to about 150,000 Da. In one class of this embodiment, the weight average molecular weight ("Mw") of the regioselectively substituted cellulose ester is in the range of from about 100,000 Da to about 150,000 Da.

In one class of this embodiment, $R^1$ is chosen from a $(C_{1-20})$alkyl, halo$(C_{1-20})$alkyl, or an $(C_{6-20})$aryl, wherein the aryl is unsubstituted or substituted by 1 to 6 $R^2$ groups, and $R^2$ is chosen from $(C_{1-6})$alkyl, halo$(C_{1-6})$alkyl, $(C_{1-6})$alkoxy, halo$(C_{1-6})$alkoxy, halo, $(C_{3-7})$cycloalkyl, $(C_{6-10})$aryl, or nitro. In one subclass of this class, the weight average molecular weight ("M$_w$") of the regioselectively substituted cellulose ester is in the range of from about 80,000 Da to about 250,000 Da. In one subclass of this class, the weight average molecular weight ("$M_w$") of the regioselectively substituted cellulose ester is in the range of from about 80,000 Da to about 150,000 Da. In one subclass of this class, the weight average molecular weight ("$M_w$") of the regioselectively substituted cellulose ester is in the range of from about 100,000 Da to about 150,000 Da.

In one class of this embodiment, $R^1$ is chosen from a $(C_{1-20})$alkyl. In one subclass of this class, the weight average molecular weight ("$M_w$") of the regioselectively substituted cellulose ester is in the range of from about 80,000 Da to about 250,000 Da. In one subclass of this class, the weight average molecular weight ("$M_w$") of the regioselectively substituted cellulose ester is in the range of from about 80,000 Da to about 150,000 Da. In one subclass of this class, the weight average molecular weight ("$M_w$") of the regioselectively substituted cellulose ester is in the range of from about 100,000 Da to about 150,000 Da.

In one class of this embodiment, $R^1$ is an $(C_{6-20})$aryl, wherein the aryl is unsubstituted or substituted by 1 to 6 $R^2$ groups, and $R^2$ is chosen from $(C_{1-6})$alkyl, halo$(C_{1-6})$alkyl, $(C_{1-6})$alkoxy, halo$(C_{1-6})$alkoxy, halo, $(C_{3-7})$cycloalkyl, $(C_{6-10})$aryl, or nitro. In one subclass of this class, the weight average molecular weight ("$M_w$") of the regioselectively substituted cellulose ester is in the range of from about 80,000 Da to about 250,000 Da. In one subclass of this class, the weight average molecular weight ("$M_w$") of the regioselectively substituted cellulose ester is in the range of from about 80,000 Da to about 150,000 Da. In one subclass of this class, the weight average molecular weight ("$M_w$") of the regioselectively substituted cellulose ester is in the range of from about 100,000 Da to about 150,000 Da.

In one class of this embodiment, $R^1$ is chosen from methyl, ethyl, propyl, 1-ethyl-pentyl-, phenyl, 3,4,5-trimethoxyphenyl, 2-naphthyl, benzothiophenyl, or heptadecanyl. In one subclass of this class, the weight average molecular weight ("$M_w$") of the regioselectively substituted cellulose ester is in the range of from about 80,000 Da to about 250,000 Da. In one subclass of this class, the weight average molecular weight ("$M_w$") of the regioselectively substituted cellulose ester is in the range of from about 80,000 Da to about 150,000 Da. In one subclass of this class, the weight average molecular weight ("$M_w$") of the regioselectively substituted cellulose ester is in the range of from about 100,000 Da to about 150,000 Da.

In one embodiment of the regioselectively substituted cellulose ester, the degree of substitution of $R^1$—CO— at the C6 position ("$C6DS_{R1}$") is in the range of from about 0 to about 0.1. In one class of this embodiment, the weight average molecular weight ("Mw") of the regioselectively substituted cellulose ester is in the range of from about 80,000 Da to about 250,000 Da. In one class of this embodiment, the weight average molecular weight ("Mw") of the regioselectively substituted cellulose ester is in the range of from about 80,000 Da to about 150,000 Da. In one class of this embodiment, the weight average molecular weight ("Mw") of the regioselectively substituted cellulose ester is in the range of from about 100,000 Da to about 150,000 Da.

In one class of this embodiment, $R^1$ is chosen from a $(C_{1-20})$alkyl, halo$(C_{1-20})$alkyl, or an $(C_{6-20})$aryl, wherein the aryl is unsubstituted or substituted by 1 to 6 $R^2$ groups, and $R^2$ is chosen from $(C_{1-6})$alkyl, halo$(C_{1-6})$alkyl, $(C_{1-6})$alkoxy, halo$(C_{1-6})$alkoxy, halo, $(C_{3-7})$cycloalkyl, $(C_{6-10})$aryl, or nitro. In one subclass of this class, the weight average molecular weight ("$M_w$") of the regioselectively substituted cellulose ester is in the range of from about 80,000 Da to about 250,000 Da. In one subclass of this class, the weight average molecular weight ("$M_w$") of the regioselectively substituted cellulose ester is in the range of from about 80,000 Da to about 150,000 Da. In one subclass of this class, the weight average molecular weight ("$M_w$") of the regioselectively substituted cellulose ester is in the range of from about 100,000 Da to about 150,000 Da.

In one class of this embodiment, $R^1$ is chosen from a $(C_{1-20})$alkyl. In one subclass of this class, the weight average molecular weight ("$M_w$") of the regioselectively substituted cellulose ester is in the range of from about 80,000 Da to about 250,000 Da. In one subclass of this class, the weight average molecular weight ("$M_w$") of the regioselectively substituted cellulose ester is in the range of from about 80,000 Da to about 150,000 Da. In one subclass of this class, the weight average molecular weight ("$M_w$") of the regioselectively substituted cellulose ester is in the range of from about 100,000 Da to about 150,000 Da.

In one class of this embodiment, $R^1$ is an $(C_{6-20})$aryl, wherein the aryl is unsubstituted or substituted by 1 to 6 $R^2$ groups, and $R^2$ is chosen from $(C_{1-6})$alkyl, halo$(C_{1-6})$alkyl, $(C_{1-6})$alkoxy, halo$(C_{1-6})$alkoxy, halo, $(C_{3-7})$cycloalkyl, $(C_{6-10})$aryl, or nitro. In one subclass of this class, the weight average molecular weight ("$M_w$") of the regioselectively substituted cellulose ester is in the range of from about 80,000 Da to about 250,000 Da. In one subclass of this class, the weight average molecular weight ("$M_w$") of the regioselectively substituted cellulose ester is in the range of from about 80,000 Da to about 150,000 Da. In one subclass of this class, the weight average molecular weight ("$M_w$") of the regioselectively substituted cellulose ester is in the range of from about 100,000 Da to about 150,000 Da.

In one class of this embodiment, $R^1$ is chosen from methyl, ethyl, propyl, 1-ethyl-pentyl-, phenyl, 3,4,5-trimethoxyphenyl, 2-naphthyl, benzothiophenyl, or heptadecanyl. In one subclass of this class, the weight average molecular weight ("$M_w$") of the regioselectively substituted cellulose ester is in the range of from about 80,000 Da to about 250,000 Da. In one subclass of this class, the weight average molecular weight ("$M_w$") of the regioselectively substituted cellulose ester is in the range of from about 80,000 Da to about 150,000 Da. In one subclass of this class, the weight average molecular weight ("$M_w$") of the regioselectively substituted cellulose ester is in the range of from about 100,000 Da to about 150,000 Da.

In one embodiment of the regioselectively substituted cellulose ester, the degree of substitution of $R^1$—CO— at the C6 position ("$C6DS_{R1}$") is in the range of from about 0 to about 0.08 In one class of this embodiment, the weight average molecular weight ("Mw") of the regioselectively substituted cellulose ester is in the range of from about 80,000 Da to about 250,000 Da. In one class of this embodiment, the weight average molecular weight ("Mw") of the regioselectively substituted cellulose ester is in the range of from about 80,000 Da to about 150,000 Da. In one class of this embodiment, the weight average molecular weight ("Mw") of the regioselectively substituted cellulose ester is in the range of from about 100,000 Da to about 150,000 Da.

In one class of this embodiment, $R^1$ is chosen from a $(C_{1-20})$alkyl, halo$(C_{1-20})$alkyl, or an $(C_{6-20})$aryl, wherein the aryl is unsubstituted or substituted by 1 to 6 $R^2$ groups, and $R^2$ is chosen from $(C_{1-6})$alkyl, halo$(C_{1-6})$alkyl, $(C_{1-6})$alkoxy, halo$(C_{1-6})$alkoxy, halo, $(C_{3-7})$cycloalkyl, $(C_{6-10})$aryl, or nitro. In one subclass of this class, the weight average molecular weight ("$M_w$") of the regioselectively substituted cellulose ester is in the range of from about 80,000 Da to about 250,000 Da. In one subclass of this class, the weight average molecular weight ("$M_w$") of the regioselectively substituted cellulose ester is in the range of from about 80,000 Da to about 150,000 Da. In one subclass of this class, the weight average molecular weight ("$M_w$") of the regioselectively substituted cellulose ester is in the range of from about 100,000 Da to about 150,000 Da.

In one class of this embodiment, $R^1$ is chosen from a ($C_{1-20}$)alkyl. In one subclass of this class, the weight average molecular weight ("$M_w$") of the regioselectively substituted cellulose ester is in the range of from about 80,000 Da to about 250,000 Da. In one subclass of this class, the weight average molecular weight ("$M_w$") of the regioselectively substituted cellulose ester is in the range of from about 80,000 Da to about 150,000 Da. In one subclass of this class, the weight average molecular weight ("$M_w$") of the regioselectively substituted cellulose ester is in the range of from about 100,000 Da to about 150,000 Da.

In one class of this embodiment, $R^1$ is an ($C_{6-20}$)aryl, wherein the aryl is unsubstituted or substituted by 1 to 6 $R^2$ groups, and $R^2$ is chosen from ($C_{1-6}$)alkyl, halo($C_{1-6}$)alkyl, ($C_{1-6}$)alkoxy, halo($C_{1-6}$)alkoxy, halo, ($C_{3-7}$)cycloalkyl, ($C_{6-10}$)aryl, or nitro. In one subclass of this class, the weight average molecular weight ("$M_w$") of the regioselectively substituted cellulose ester is in the range of from about 80,000 Da to about 250,000 Da. In one subclass of this class, the weight average molecular weight ("$M_w$") of the regioselectively substituted cellulose ester is in the range of from about 80,000 Da to about 150,000 Da. In one subclass of this class, the weight average molecular weight ("$M_w$") of the regioselectively substituted cellulose ester is in the range of from about 100,000 Da to about 150,000 Da.

In one class of this embodiment, $R^1$ is chosen from methyl, ethyl, propyl, 1-ethyl-pentyl-, phenyl, 3,4,5-trimethoxyphenyl, 2-naphthyl, benzothiophenyl, or heptadecanyl. In one subclass of this class, the weight average molecular weight ("$M_w$") of the regioselectively substituted cellulose ester is in the range of from about 80,000 Da to about 250,000 Da. In one subclass of this class, the weight average molecular weight ("$M_w$") of the regioselectively substituted cellulose ester is in the range of from about 80,000 Da to about 150,000 Da. In one subclass of this class, the weight average molecular weight ("$M_w$") of the regioselectively substituted cellulose ester is in the range of from about 100,000 Da to about 150,000 Da.

In one embodiment of the regioselectively substituted cellulose ester, the degree of substitution of $R^1$—CO— at the C6 position ("$C6DS_{R1}$") is in the range of from about 0 to about 0.06. In one class of this embodiment, the weight average molecular weight ("Mw") of the regioselectively substituted cellulose ester is in the range of from about 80,000 Da to about 250,000 Da. In one class of this embodiment, the weight average molecular weight ("Mw") of the regioselectively substituted cellulose ester is in the range of from about 80,000 Da to about 150,000 Da. In one class of this embodiment, the weight average molecular weight ("Mw") of the regioselectively substituted cellulose ester is in the range of from about 100,000 Da to about 150,000 Da.

In one class of this embodiment, $R^1$ is chosen from a ($C_{1-20}$)alkyl, halo($C_{1-20}$)alkyl, or an ($C_{6-20}$)aryl, wherein the aryl is unsubstituted or substituted by 1 to 6 $R^2$ groups, and $R^2$ is chosen from ($C_{1-6}$)alkyl, halo($C_{1-6}$)alkyl, ($C_{1-6}$)alkoxy, halo($C_{1-6}$)alkoxy, halo, ($C_{3-7}$)cycloalkyl, ($C_{6-10}$)aryl, or nitro. In one subclass of this class, the weight average molecular weight ("$M_w$") of the regioselectively substituted cellulose ester is in the range of from about 80,000 Da to about 250,000 Da. In one subclass of this class, the weight average molecular weight ("$M_w$") of the regioselectively substituted cellulose ester is in the range of from about 80,000 Da to about 150,000 Da. In one subclass of this class, the weight average molecular weight ("$M_w$") of the regioselectively substituted cellulose ester is in the range of from about 100,000 Da to about 150,000 Da.

In one class of this embodiment, $R^1$ is chosen from a ($C_{1-20}$)alkyl. In one subclass of this class, the weight average molecular weight ("$M_w$") of the regioselectively substituted cellulose ester is in the range of from about 80,000 Da to about 250,000 Da. In one subclass of this class, the weight average molecular weight ("$M_w$") of the regioselectively substituted cellulose ester is in the range of from about 80,000 Da to about 150,000 Da. In one subclass of this class, the weight average molecular weight ("$M_w$") of the regioselectively substituted cellulose ester is in the range of from about 100,000 Da to about 150,000 Da.

In one class of this embodiment, $R^1$ is an ($C_{6-20}$)aryl, wherein the aryl is unsubstituted or substituted by 1 to 6 $R^2$ groups, and $R^2$ is chosen from ($C_{1-6}$)alkyl, halo($C_{1-6}$)alkyl, ($C_{1-6}$)alkoxy, halo($C_{1-6}$)alkoxy, halo, ($C_{3-7}$)cycloalkyl, ($C_{6-10}$)aryl, or nitro. In one subclass of this class, the weight average molecular weight ("$M_w$") of the regioselectively substituted cellulose ester is in the range of from about 80,000 Da to about 250,000 Da. In one subclass of this class, the weight average molecular weight ("$M_w$") of the regioselectively substituted cellulose ester is in the range of from about 80,000 Da to about 150,000 Da. In one subclass of this class, the weight average molecular weight ("$M_w$") of the regioselectively substituted cellulose ester is in the range of from about 100,000 Da to about 150,000 Da.

In one class of this embodiment, $R^1$ is chosen from methyl, ethyl, propyl, 1-ethyl-pentyl-, phenyl, 3,4,5-trimethoxyphenyl, 2-naphthyl, benzothiophenyl, or heptadecanyl. In one subclass of this class, the weight average molecular weight ("$M_w$") of the regioselectively substituted cellulose ester is in the range of from about 80,000 Da to about 250,000 Da. In one subclass of this class, the weight average molecular weight ("$M_w$") of the regioselectively substituted cellulose ester is in the range of from about 80,000 Da to about 150,000 Da. In one subclass of this class, the weight average molecular weight ("$M_w$") of the regioselectively substituted cellulose ester is in the range of from about 100,000 Da to about 150,000 Da.

In one embodiment of the compositions of matter, the degree of substitution of $R^1$—CO— at the C6 position ("$C6DS_{R1}$") is in the range of from about 0 to about 0.04. In one class of this embodiment, the weight average molecular weight ("Mw") of the regioselectively substituted cellulose ester is in the range of from about 80,000 Da to about 250,000 Da. In one class of this embodiment, the weight average molecular weight ("Mw") of the regioselectively substituted cellulose ester is in the range of from about 80,000 Da to about 150,000 Da. In one class of this embodiment, the weight average molecular weight ("Mw") of the regioselectively substituted cellulose ester is in the range of from about 100,000 Da to about 150,000 Da.

In one class of this embodiment, $R^1$ is chosen from a ($C_{1-20}$)alkyl, halo($C_{1-20}$)alkyl, or an ($C_{6-20}$)aryl, wherein the aryl is unsubstituted or substituted by 1 to 6 $R^2$ groups, and $R^2$ is chosen from ($C_{1-6}$)alkyl, halo($C_{1-6}$)alkyl, ($C_{1-6}$)alkoxy, halo($C_{1-6}$)alkoxy, halo, ($C_{3-7}$)cycloalkyl, ($C_{6-10}$)aryl, or nitro. In one subclass of this class, the weight average molecular weight ("$M_w$") of the regioselectively substituted cellulose ester is in the range of from about 80,000 Da to about 250,000 Da. In one subclass of this class, the weight average molecular weight ("$M_w$") of the regioselectively substituted cellulose ester is in the range of from about 80,000 Da to about 150,000 Da. In one subclass of this class, the weight average molecular weight ("$M_w$") of the regioselectively substituted cellulose ester is in the range of from about 100,000 Da to about 150,000 Da.

In one class of this embodiment, $R^1$ is chosen from a ($C_{1-20}$)alkyl. In one subclass of this class, the weight average molecular weight ("$M_w$") of the regioselectively substituted cellulose ester is in the range of from about 80,000 Da to about 250,000 Da. In one subclass of this class, the weight average molecular weight ("$M_w$") of the regioselectively substituted cellulose ester is in the range of from about 80,000 Da to about 150,000 Da. In one subclass of this class, the weight average molecular weight ("$M_w$") of the regioselectively substituted cellulose ester is in the range of from about 100,000 Da to about 150,000 Da.

In one class of this embodiment, $R^1$ is an ($C_{6-20}$)aryl, wherein the aryl is unsubstituted or substituted by 1 to 6 $R^2$ groups, and $R^2$ is chosen from ($C_{1-6}$)alkyl, halo($C_{1-6}$)alkyl, ($C_{1-6}$)alkoxy, halo($C_{1-6}$)alkoxy, halo, ($C_{3-7}$)cycloalkyl, ($C_{6-10}$)aryl, or nitro. In one subclass of this class, the weight average molecular weight ("$M_w$") of the regioselectively substituted cellulose ester is in the range of from about 80,000 Da to about 250,000 Da. In one subclass of this class, the weight average molecular weight ("$M_w$") of the regioselectively substituted cellulose ester is in the range of from about 80,000 Da to about 150,000 Da. In one subclass of this class, the weight average molecular weight ("$M_w$") of the regioselectively substituted cellulose ester is in the range of from about 100,000 Da to about 150,000 Da.

In one class of this embodiment, $R^1$ is chosen from methyl, ethyl, propyl, 1-ethyl-pentyl-, phenyl, 3,4,5-trimethoxyphenyl, 2-naphthyl, benzothiophenyl, or heptadecanyl. In one subclass of this class, the weight average molecular weight ("$M_w$") of the regioselectively substituted cellulose ester is in the range of from about 80,000 Da to about 250,000 Da. In one subclass of this class, the weight average molecular weight ("$M_w$") of the regioselectively substituted cellulose ester is in the range of from about 80,000 Da to about 150,000 Da. In one subclass of this class, the weight average molecular weight ("$M_w$") of the regioselectively substituted cellulose ester is in the range of from about 100,000 Da to about 150,000 Da.

In one embodiment of the regioselectively substituted cellulose ester, $R^1$ is ($C_{1-20}$)alkyl. In one embodiment of the regioselectively substituted cellulose ester, $R^1$ is halo($C_{1-20}$)alkyl. In one embodiment of the regioselectively substituted cellulose ester, $R^1$ is ($C_{2-20}$)alkenyl. In one embodiment of the regioselectively substituted cellulose ester, $R^1$ is ($C_{3-7}$)cycloalkyl. In one embodiment of the regioselectively substituted cellulose ester, $R^1$ is ($C_{6-20}$)aryl, wherein the aryl is unsubstituted or substituted by 1 to 6 $R^2$ groups, wherein $R^2$ is chosen from ($C_{1-6}$)alkyl, halo($C_{1-6}$)alkyl, ($C_{1-6}$)alkoxy, halo($C_{1-6}$)alkoxy, halo, ($C_{3-7}$)cycloalkyl, ($C_{6-10}$)aryl, or nitro. In one embodiment of the regioselectively substituted cellulose ester, $R^1$ is a 5- to 20 membered heteroaryl containing 1 to 3 heteroatoms independently selected from oxygen, sulfur, and nitrogen, wherein the heteroaryl is unsubstituted or substituted by 1 to 6 $R^3$ groups, $R^3$ is chosen from ($C_{1-6}$)alkyl, halo($C_{1-6}$)alkyl, ($C_{1-6}$)alkoxy, halo($C_{1-6}$)alkoxy, halo, ($C_{3-7}$)cycloalkyl, ($C_{6-10}$)aryl, or nitro.

In one embodiment of the regioselectively substituted cellulose ester, $R^1$ is chosen from ($C_{1-20}$)alkyl; halo($C_{1-20}$)alkyl; ($C_{2-20}$)alkenyl, ($C_{6-20}$)aryl, wherein the aryl is unsubstituted or substituted by 1 to 6 $R^2$ groups; or a 5- to 20 membered heteroaryl containing 1 to 3 heteroatoms independently selected from oxygen, sulfur, and nitrogen, wherein the heteroaryl is unsubstituted or substituted by 1 to 6 $R^3$ groups.

In one embodiment of the regioselectively substituted cellulose ester, $R^1$ is chosen from a ($C_{1-20}$)alkyl, halo($C_{1-20}$)alkyl, or an ($C_{6-20}$)aryl, wherein the aryl is unsubstituted or substituted by 1 to 6 $R^2$ groups, and $R^2$ is chosen from ($C_{1-6}$)alkyl, halo($C_{1-6}$)alkyl, ($C_{1-6}$)alkoxy, halo($C_{1-6}$)alkoxy, halo, ($C_{3-7}$)cycloalkyl, ($C_{6-10}$)aryl, or nitro.

In one embodiment of the regioselectively substituted cellulose ester, $R^1$ is chosen from methyl, ethyl, propyl, 1-ethyl-pentyl-, phenyl, 3,4,5-trimethoxyphenyl, 2-naphthyl, benzothiophenyl, or heptadecanyl.

In one embodiment of the regioselectively substituted cellulose ester, the regioselectively substituted cellulose ester further comprises a plurality of $R^4$—CO-substituents, wherein the degree of substitution of $R^4$—CO— at the C6 position ("$C6DS_{R4}$") is in the range of from about 0.1 to about 1.0, wherein $R^4$ is chosen from ($C_{1-20}$)alkyl; halo($C_{1-5}$)alkyl; ($C_{2-20}$)alkenyl, ($C_{3-7}$)cycloalkyl, ($C_{6-20}$)aryl, wherein the aryl is unsubstituted or substituted by 1 to 6 $R^5$ groups; or monocyclic or bicyclic heteroaryl containing 1 to 3 heteroatoms independently selected from oxygen, sulfur, and nitrogen, wherein the heteroaryl is unsubstituted or substituted by 1 to 6 $R^6$ groups, $R^5$ is chosen from ($C_{1-6}$)alkyl, halo($C_{1-6}$)alkyl, ($C_{1-6}$)alkoxy, halo($C_{1-6}$)alkoxy, halo, ($C_{3-7}$)cycloalkyl, ($C_{6-10}$)aryl, or nitro, and $R^6$ is chosen from ($C_{1-6}$)alkyl, halo($C_{1-6}$)alkyl, ($C_{1-6}$)alkoxy, halo($C_{1-6}$)alkoxy, halo, ($C_{3-7}$)cycloalkyl, ($C_{6-10}$)aryl, or nitro.

In one class of this embodiment, the degree of substitution of $R^4$—CO— at the C2 position ("$C2DS_{R4}$") is in the range of from about 0 to about 0.5, wherein the degree of substitution of $R^4$—CO— at the C3 position ("$C3DS_{R4}$") is in the range of from about 0 to about 0.5. In one subclass of this class, the weight average molecular weight ("$M_w$") is in the range of from about 80,000 Da to about 250,000 Da. In one subclass of this class, the weight average molecular weight ("$M_w$") is in the range of from about 80,000 Da to about 100,000 Da. In one subclass of this class, the weight average molecular weight ("$M_w$") is in the range of from about 100,000 Da to about 250,000 Da.

In one class of this embodiment, the degree of substitution of $R^4$—CO— at the C2 position ("$C2DS_{R4}$") is in the range of from about 0 to about 0.4, wherein the degree of substitution of $R^4$—CO— at the C3 position ("$C3DS_{R4}$") is in the range of from about 0 to about 0.4. In one subclass of this class, the weight average molecular weight ("$M_w$") is in the range of from about 80,000 Da to about 250,000 Da. In one subclass of this class, the weight average molecular weight ("$M_w$") is in the range of from about 80,000 Da to about 100,000 Da. In one subclass of this class, the weight average molecular weight ("$M_w$") is in the range of from about 100,000 Da to about 250,000 Da.

In one class of this embodiment, the degree of substitution of $R^4$—CO— at the C2 position ("$C2DS_{R4}$") is in the range of from about 0 to about 0.3, wherein the degree of substitution of $R^4$—CO— at the C3 position ("$C3DS_{R4}$") is in the range of from about 0 to about 0.3. In one subclass of this class, the weight average molecular weight ("$M_w$") is in the range of from about 80,000 Da to about 250,000 Da. In one subclass of this class, the weight average molecular weight ("$M_w$") is in the range of from about 80,000 Da to about 100,000 Da. In one subclass of this class, the weight average molecular weight ("$M_w$") is in the range of from about 100,000 Da to about 250,000 Da.

In one class of this embodiment, the degree of substitution of $R^4$—CO— at the C2 position ("C2DS$_{R4}$") is in the range of from about 0 to about 0.2, wherein the degree of substitution of $R^4$—CO— at the C3 position ("C3DS$_{R4}$") is in the range of from about 0 to about 0.2. In one subclass of this class, the weight average molecular weight ("$M_w$") is in the range of from about 80,000 Da to about 250,000 Da. In one subclass of this class, the weight average molecular weight ("$M_w$") is in the range of from about 80,000 Da to about 100,000 Da. In one subclass of this class, the weight average molecular weight ("$M_w$") is in the range of from about 100,000 Da to about 250,000 Da.

In one class of this embodiment, the weight average molecular weight ("$M_w$") is in the range of from about 80,000 Da to about 250,000 Da.

In one class of this embodiment, the weight average molecular weight ("$M_w$") is in the range of from about 80,000 Da to about 100,000 Da.

In one class of this embodiment, the weight average molecular weight ("$M_w$") is in the range of from about 100,000 Da to about 250,000 Da.

In one class of this embodiment, $R^4$ is $(C_{1-20})$alkyl. In one class of this embodiment, $R^4$ is halo$(C_{1-5})$alkyl.

In one class of this embodiment, $R^4$ is $(C_{2-20})$alkenyl.

In one class of this embodiment, $R^4$ is $(C_{3-7})$cycloalkyl.

In one class of this embodiment, $R^4$ is $(C_{6-20})$aryl, wherein the aryl is unsubstituted or substituted by 1 to 6 $R^5$ groups, wherein $R^5$ is chosen from $(C_{1-6})$alkyl, halo$(C_{1-6})$alkyl, $(C_{1-6})$alkoxy, halo$(C_{1-6})$alkoxy, halo, $(C_{3-7})$cycloalkyl, $(C_{6-10})$aryl, or nitro.

In one class of this embodiment, $R^4$ is a monocyclic or bicyclic heteroaryl containing 1 to 3 heteroatoms independently selected from oxygen, sulfur, and nitrogen, wherein the heteroaryl is unsubstituted or substituted by 1 to 6 $R^6$ groups, and $R^6$ is chosen from $(C_{1-6})$alkyl, halo$(C_{1-6})$alkyl, $(C_{1-6})$alkoxy, halo$(C_{1-6})$alkoxy, halo, $(C_{3-7})$cycloalkyl, $(C_{6-10})$aryl, or nitro.

In one class of this embodiment, $R^4$ is chosen from methyl, ethyl, propyl, 1-ethyl-pentyl-, phenyl, 3,4,5-trimethoxylphenyl, 2-naphthyl, benzothiophenyl, or heptadecanyl. In one subclass of this class, $R^4$ is methyl. In one subclass of this class, $R^4$ is ethyl. In one subclass of this class, $R^4$ is propyl. In one subclass of this class, $R^4$ is 1-ethyl-pentyl-. In one subclass of this class, $R^4$ is phenyl. In one subclass of this class, $R^4$ is 3,4,5-trimethoxylphenyl. In one subclass of this class, $R^4$ is 2-naphthyl. In one subclass of this class, $R^4$ is benzothiophenyl. In one subclass of this class, $R^4$ is heptadecanyl.

In one embodiment, the C6DS$_{R1-CO-}$ is less than 0.1. In one embodiment, the C6DS$_{R1-CO-}$ is less than 0.08. In one embodiment, the C6DS$_{R1-CO-}$ is less than 0.06. In one embodiment, the C6DS$_{R1-CO-}$ is less than 0.05. In one embodiment, the C6DS$_{R1-CO-}$ is less than 0.04. In one embodiment, the C6DS$_{R1-CO-}$ is less than 0.02.

In one embodiment, $R^1$—CO— is chosen from acetyl, propionyl, butanoyl, benzoyl, naphthoyl, 3,4,5-trimethoxybenzoyl, biphenyl-CO—, benzoyl-benzoyl, or benzothiophenyl-CO—.

In one embodiment, $R^1$—CO— is propionyl. In one class of this embodiment, the degree of substitution for the propionyl (i.e., $R^1$—CO— is propionyl) is from about 1.0 to about 1.4, the degree of substitution for propionyl at the C2 position ("C2DS$_{Pr}$") is from 0.6 to 0.9, the degree of substitution for propionyl at the C3 position ("C3DS$_{Pr}$") is from about 0.3 to 0.5. In one subclass of this class, the degree of substitution for propionyl at the C6 position ("C6DS$_{Pr}$") is less than 0.05.

In one embodiment, $R^1$—CO— is a combination comprising benzoyl and naphthoyl. In one class of this embodiment, the degree of substitution of benzoyl is from about 0.2 to about 1.2, and the degree of substitution for naphthoyl is from about 0.8 to about 1.8.

In one class of this embodiment, the degree of substitution of benzoyl is from about 0.4 to about 0.8, the degree of substitution of naphthoyl is from about 1.2 to about 1.6, and the degree of substitution at the C6 position for the combined benzoyl and naphthoyl is less than 0.05.

In one embodiment, $R^1$—CO— is a combination comprising propionyl and a $(C_{6-20})$aryl. In one class of this embodiment, the degree of substitution at the C6 position for combined propionyl and a $(C_{6-20})$aryl is less than 0.1.

In one embodiment, $R^1$—CO— is a combination comprising propionyl and benzoyl. In one class of this embodiment, the degree of substitution of propionyl is from about 0.4 to about 0.7, the degree of substitution of benzoyl is from about 0.2 to about 0.5, and the degree of substitution at the C6 position for combined propionyl and benzoyl is less than 0.05.

In one class of this embodiment, the degree of substitution of propionyl is from about 1.1 to about 1.8, the degree of substitution of benzoyl is from about 0.1 to about 0.5, and the degree of substitution at the C6 position for combined propionyl and benzoyl is less than 0.05.

In one embodiment, $R^1$—CO— is a combination comprising propionyl and naphthoyl. In one class of this embodiment, the degree of substitution for propionyl is in the range of from 0.2 to 0.9, and the degree of substitution for naphthoyl is in the range of from 0.4 to 1.4.

In one embodiment, $R^1$—CO— is a combination comprising propionyl or a 5- to 20 membered heteroaryl containing 1 to 3 heteroatoms independently selected from oxygen, sulfur, and nitrogen. In one class of this embodiment, the degree of substitution for propionyl is in the range of from 0.2 to 0.4, and the degree of substitution for naphthoyl is in the range of from 0.9 to 1.1.

In one embodiment, $R^1$—CO— is a combination comprising propionyl and a $(C_{6-20})$alkyl-CO—.

In one embodiment, $R^1$—CO— is a combination comprising acetyl and a $(C_{6-20})$aryl-CO—. In one class of this embodiment, the degree of substitution of acetyl is from about 0.7 to about 0.9, the degree of substitution of $(C_{6-20})$aryl-CO— is from about 0.1 to about 0.5, and the degree of substitution at the C6 position for combined acetyl and $(C_{6-20})$aryl-CO— is less than 0.1.

In one embodiment, $R^1$—CO— is a combination comprising acetyl and a 5- to 20 membered heteroaryl containing 1 to 3 heteroatoms independently selected from oxygen, sulfur, and nitrogen. In one class of this embodiment, the degree of substitution of acetyl is from about 0.8 to about 1.1, the degree of substitution of 5- to 20 membered heteroaryl containing 1 to 3 heteroatoms independently selected from oxygen, sulfur, and nitrogen is from about 0.1 to about 0.3, and wherein the degree of substitution at the C6 position for combined acetyl and benzoyl is less than 0.1.

The present application also discloses a regioselectively substituted cellulose ester comprising: (i) a plurality of $R^1$—CO-substituents; (ii) a plurality of $R^4$—CO-substituents; (iii) a plurality of hydroxyl substituents, wherein the degree of substitution of $R^1$—CO— at the C2 position ("C2DS$_{R1}$") is in the range of from about 0.2 to about 1.0, wherein the degree of substitution of $R^1$—CO— at the C3 position ("C3DS$_{R1}$") is in the range of from about 0.2 to about 1.0, wherein the degree of substitution of $R^1$—CO— at the C6 position ("C6DS$_{R1}$") is in the range of from about 0 to about 0.5, wherein the degree of substitution of $R^4$—CO— at the C6 position ("C6DS$_{R4}$") is in the range of from about 0.1 to about 1.0, wherein the degree of substitution of hydroxyl is in the range of from about 0 to about 2.6, wherein $R^1$ is chosen from $(C_{1-20})$alkyl; halo$(C_{1-20})$ alkyl; $(C_{2-20})$alkenyl, $(C_{3-7})$cycloalkyl, $(C_{6-20})$aryl, wherein the aryl is unsubstituted or substituted by 1 to 6 $R^2$ groups; or a 5- to 20 membered heteroaryl containing 1 to 3 heteroatoms independently selected from oxygen, sulfur, and nitrogen, wherein the heteroaryl is unsubstituted or substituted by 1 to 6 $R^3$ groups, wherein $R^2$ is chosen from $(C_{1-6})$alkyl, halo$(C_{1-6})$alkyl, $(C_{1-6})$alkoxy, halo$(C_{1-6})$alkoxy, halo, $(C_{3-7})$cycloalkyl, $(C_{6-10})$aryl, or nitro, wherein $R^3$ is chosen from $(C_{1-6})$alkyl, halo$(C_{1-6})$alkyl, $(C_{1-6})$alkoxy, halo $(C_{1-6})$alkoxy, halo, $(C_{3-7})$cycloalkyl, $(C_{6-10})$aryl, or nitro; wherein $R^4$ is chosen from $(C_{1-20})$alkyl; halo$(C_{1-5})$alkyl; $(C_{2-20})$alkenyl, $(C_{3-7})$cycloalkyl, $(C_{6-20})$aryl, wherein the aryl is unsubstituted or substituted by 1 to 6 $R^5$ groups; or monocyclic or bicyclic heteroaryl containing 1 to 3 heteroatoms independently selected from oxygen, sulfur, and nitrogen, wherein the heteroaryl is unsubstituted or substituted by 1 to 6 $R^6$ groups, $R^5$ is chosen from $(C_{1-6})$alkyl, halo$(C_{1-6})$ alkyl, $(C_{1-6})$alkoxy, halo$(C_{1-6})$alkoxy, halo, $(C_{3-7})$cycloalkyl, $(C_{6-10})$aryl, or nitro, and $R^6$ is chosen from $(C_{1-6})$alkyl, halo$(C_{1-6})$alkyl, $(C_{1-6})$alkoxy, halo$(C_{1-6})$alkoxy, halo, $(C_{3-7})$ cycloalkyl, $(C_{6-10})$aryl, or nitro.

In one embodiment, wherein the degree of substitution of hydroxyl is in the range of from about 0.5 to about 2.6. In one embodiment, wherein the degree of substitution of hydroxyl is in the range of from about 0.1 to about 2.6. In one embodiment, wherein the degree of substitution of hydroxyl is in the range of from about 0.2 to about 2.6. In one embodiment, wherein the degree of substitution of hydroxyl is in the range of from about 0.3 to about 2.6. In one embodiment, wherein the degree of substitution of hydroxyl is in the range of from about 0.4 to about 2.6.

In one embodiment, $R^1$—CO— is chosen from acetyl, propionyl, butanoyl, benzoyl, naphthoyl, 3,4,5-trimethoxybenzoyl, biphenyl-CO—, benzoyl-benzoyl-, or benzothiphene-CO—; and wherein $R^4$—CO— is chosen from acetyl, propionyl, butyryl, benzoyl, acetyl, naphthoyl, 3,4,5-trimethoxybenzoyl, biphenyl-CO—, benzoyl-benzoyl-, or benzothiphene-CO—.

In one embodiment, the $C6DS_{R1-CO-}$ is less than 0.1. In one embodiment, the $C6DS_{R1-CO-}$ is less than 0.08. In one embodiment, the $C6DS_{R1-CO-}$ is less than 0.06. In one embodiment, the $C6DS_{R1-CO-}$ is less than 0.05. In one embodiment, the $C6DS_{R1-CO-}$ is less than 0.04. In one embodiment, the $C6DS_{R1-CO-}$ is less than 0.02.

In one embodiment, $R^1$—CO— is propionyl.

In one class of this embodiment, $R^4$—CO— is a $(C_{6-20})$ aryl-CO—.

In one class of this embodiment, $R^4$—CO— is a combination of pivaloyl and $(C_{6-20})$aryl-CO—. In one subclass of this class, $(C_{6-20})$aryl-CO— is chosen from benzoyl and naphthoyl. In one sub-subclass of this subclass, the degree of substitution for the pivaloyl is from 0.6 to 0.9; and the degree of substitution for the $(C_{6-20})$aryl-CO— is from 0.2 to 0.5.

In one class of this embodiment, the degree of substitution for propionyl is from about 1.0 to about 1.4, the degree of substitution at the C2 position for propionyl is from 0.6 to 0.9, the degree of substitution at the C3 for propionyl is from about 0.3 to about 0.5.

In one subclass of this class, the degree of substitution at the C6 position for propionyl is less than 0.05. In one sub-subclass of this subclass, the degree of substitution for the pivaloyl is from 0.6 to 0.9; and the degree of substitution for the $(C_{6-20})$aryl-CO— is from 0.2 to 0.5.

In one subclass of this class, $R^4$—CO— is a $(C_{6-20})$aryl-CO—.

In one subclass of this class, $R^4$—CO— is a combination of pivaloyl and $(C_{6-20})$aryl-CO—. In one sub-subclass of this subclass, $(C_{6-20})$aryl-CO— is chosen from benzoyl and naphthoyl. In one sub-sub-subclass of this sub-subclass, the degree of substitution for the pivaloyl is from 0.6 to 0.9; and the degree of substitution for the $(C_{6-20})$aryl-CO— is from 0.2 to 0.5. In one sub-sub-sub-subclass of this sub-sub-subclass, the degree of substitution at the C6 position for propionyl is less than 0.05. In one sub-sub-sub-subclass of this sub-sub-subclass, the degree of substitution for the pivaloyl is from 0.6 to 0.9; and the degree of substitution for the $(C_{6-20})$aryl-CO— is from 0.2 to 0.5.

In one embodiment, $R^1$—CO— is a combination comprising benzoyl and naphthoyl.

In one class of this embodiment, $R^4$—CO— is $(C_{1-6})$ alkyl-CO—.

In one subclass of this class, the degree of substitution of benzoyl is from about 0.2 to about 1.2, wherein the degree of substitution for naphthoyl is from about 0.8 to about 1.8, and wherein the degree of substitution for the $(C_{1-6})$alkyl-CO— is less than 0.5.

In one sub-subclass of this subclass, $R^4$—CO— is propionyl.

In one embodiment, wherein $R^1$—CO— is a combination of propionyl and benzoyl.

In one class of this embodiment, $R^4$—CO— is a combination of propionyl and benzoyl.

In one subclass of this class, the combined degree of substitution at the combined C2 and C3 positions for benzoyl is from 0.1 to 0.6, the degree of substitution at the combined C2 and C3 positions for propionyl is from 0.5 to 1.4, the degree of substitution at the C6 position for benzoyl is from 0 to 0.8, and the degree of substitution for propionyl is from 0 to 1.0.

In one sub-subclass of this subclass, the degree of substitution at the C6 for benzoyl is from 0.1 to 0.2, and wherein the C6 degree of substitution at the C6 for propionyl is from 0.4 to 0.8.

In one subclass of this class, the combined degree of substitution at the combined C2 and C3 positions for benzoyl is from 0.05 to 2.0, the degree of substitution at the combined C2 and C3 positions for propionyl is from 0.5 to 1.4, the degree of substitution at the C6 position for benzoyl is from 0 to 0.8, and the degree of substitution for propionyl is from 0 to 1.0.

In one sub-subclass of this subclass, the degree of substitution at the C6 for benzoyl is from 0.1 to 0.2, and wherein the C6 degree of substitution at the C6 for propionyl is from 0.4 to 0.8.

In one subclass of this class, the combined degree of substitution at the combined C2 and C3 positions for benzoyl is from 0.6 to 2.0, the degree of substitution at the combined C2 and C3 positions for propionyl is from 0.5 to 1.4, the degree of substitution at the C6 position for benzoyl is from 0 to 0.8, and the degree of substitution for propionyl is from 0 to 1.0.

In one sub-subclass of this subclass, the degree of substitution at the C6 for benzoyl is from 0.1 to 0.2, and wherein the C6 degree of substitution at the C6 for propionyl is from 0.4 to 0.8.

The present application also discloses a regioselectively substituted trifluoroacetyl cellulose ester comprising:
(i) a plurality of trifluoracetyl substituents,
wherein the degree of substitution at the C2 position ("C2DS$_{TFA}$") is from about 0 to about 0.1,
wherein the degree of substitution at the C3 position ("C3DS$_{TFA}$") is from about 0 to about 0.1,
wherein the degree of substitution at the C6 position ("C6DS$_{TFA}$") is from about 0.9 to about 1.0,
wherein the regioselectively substituted trifluoroacetyl cellulose ester has a weight average molecular weight ("M$_w$") in the range of from about 50,000 Da to about 600,000 Da.

In one class of the embodiment, the C2DS$_{TFA}$ is from about 0 to about 0.05, and the C3DS$_{TFA}$ is from ab out 0 to about 0.05. In one class of the embodiment, the C2DS$_{TFA}$ is from about 0 to about 0.02, and the C3DS$_{TFA}$ is from about 0 to about 0.02. In one class of the embodiment, the C2DS$_{TFA}$ is from about 0 to about 0.01, and the C3DS$_{TFA}$ is from about 0 to about 0.02.

In one class of this embodiment, the regioselectively substituted cellulose ester has a weight average molecular weight ("M$_w$") in the range of from about 50,000 Da to about 250,000 Da. In one class of this embodiment, the regioselectively substituted cellulose ester has a weight average molecular weight ("M$_w$") in the range of from about 50,000 Da to about 150,000 Da.

Film

The present application discloses a film comprising a cellulose ester comprising: (i) a plurality of R$^1$—CO-substituents; (ii) a plurality of R$^4$—CO-substituents; (iii) a plurality of hydroxyl substituents, wherein the degree of substitution of R$^1$—CO— at the C2 position ("C2DS$_{R1}$") is in the range of from about 0.2 to about 1.0, wherein the degree of substitution of R$^1$—CO— at the C3 position ("C3DS$_{R1}$") is in the range of from about 0.2 to about 1.0, wherein the degree of substitution of R$^1$—CO— at the C6 position ("C6DS$_{R1}$") is in the range of from about 0 to about 0.5, wherein the degree of substitution of R$^4$—CO— at the C6 position ("C6DS$_{R4}$") is in the range of from about 0.1 to about 1.0, wherein the degree of substitution of hydroxyl is in the range of from about 0 to about 2.6, wherein R$^1$ is chosen from (C$_{1-20}$)alkyl; halo(C$_{1-20}$)alkyl; (C$_{2-20}$)alkenyl, (C$_{3-7}$)cycloalkyl, (C$_{6-20}$)aryl, wherein the aryl is unsubstituted or substituted by 1 to 6 R$^2$ groups; or a 5- to 20 membered heteroaryl containing 1 to 3 heteroatoms independently selected from oxygen, sulfur, and nitrogen, wherein the heteroaryl is unsubstituted or substituted by 1 to 6 R$^3$ groups, wherein R$^2$ is chosen from (C$_{1-6}$)alkyl, halo(C$_{1-6}$)alkyl, (C$_{1-6}$)alkoxy, halo(C$_{1-6}$)alkoxy, halo, (C$_{3-7}$)cycloalkyl, (C$_{6-10}$)aryl, or nitro, wherein R$^3$ is chosen from (C$_{1-6}$)alkyl, halo(C$_{1-6}$)alkyl, (C$_{1-6}$)alkoxy, halo(C$_{1-6}$)alkoxy, halo, (C$_{3-7}$)cycloalkyl, (C$_{6-10}$)aryl, or nitro; wherein R$^4$ is chosen from (C$_{1-20}$)alkyl; halo(C$_{1-5}$)alkyl; (C$_{2-20}$)alkenyl, (C$_{3-7}$)cycloalkyl, (C$_{6-20}$)aryl, wherein the aryl is unsubstituted or substituted by 1 to 6 R$^5$ groups; or monocyclic or bicyclic heteroaryl containing 1 to 3 heteroatoms independently selected from oxygen, sulfur, and nitrogen, wherein the heteroaryl is unsubstituted or substituted by 1 to 6 R$^6$ groups, R$^5$ is chosen from (C$_{1-6}$)alkyl, halo(C$_{1-6}$)alkyl, (C$_{1-6}$)alkoxy, halo(C$_{1-6}$)alkoxy, halo, (C$_{3-7}$)cycloalkyl, (C$_{6-10}$)aryl, or nitro, and R$^6$ is chosen from (C$_{1-6}$)alkyl, halo(C$_{1-6}$)alkyl, (C$_{1-6}$)alkoxy, halo(C$_{1-6}$)alkoxy, halo, (C$_{3-7}$)cycloalkyl, (C$_{6-10}$)aryl, or nitro.

In one embodiment, wherein the degree of substitution of hydroxyl is in the range of from about 0.5 to about 2.6. In one embodiment, wherein the degree of substitution of hydroxyl is in the range of from about 0.1 to about 2.6. In one embodiment, wherein the degree of substitution of hydroxyl is in the range of from about 0.2 to about 2.6. In one embodiment, wherein the degree of substitution of hydroxyl is in the range of from about 0.3 to about 2.6. In one embodiment, wherein the degree of substitution of hydroxyl is in the range of from about 0.4 to about 2.6.

In one embodiment of the regioselective cellulose ester, the weight average molecular weight ("Mw") of the regioselectively substituted cellulose ester is in the range of from about 5,000 Da to about 250,000 Da. In one embodiment of the regioselective cellulose ester, the weight average molecular weight ("Mw") of the regioselectively substituted cellulose ester is in the range of from about 25,000 Da to about 250,000 Da. In one embodiment of the regioselective cellulose ester, the weight average molecular weight ("Mw") of the regioselectively substituted cellulose ester is in the range of from about 50,000 Da to about 250,000 Da. In one embodiment of the regioselective cellulose ester, the weight average molecular weight ("Mw") of the regioselectively substituted cellulose ester is in the range of from about 80,000 Da to about 250,000 Da. In one embodiment of the regioselective cellulose ester, the weight average molecular weight ("Mw") of the regioselectively substituted cellulose ester is in the range of from about 80,000 Da to about 150,000 Da. In one embodiment of the regioselective cellulose ester, the weight average molecular weight ("Mw") of the regioselectively substituted cellulose ester is in the range of from about 100,000 Da to about 150,000 Da.

In one embodiment of the regioselective cellulose ester, R$^1$ is chosen from a (C$_{1-20}$)alkyl, halo(C$_{1-20}$)alkyl, or an (C$_{6-20}$)aryl, wherein the aryl is unsubstituted or substituted by 1 to 6 R$^2$ groups, and R$^2$ is chosen from (C$_{1-6}$)alkyl, halo(C$_{1-6}$)alkyl, (C$_{1-6}$)alkoxy, halo(C$_{1-6}$)alkoxy, halo, (C$_{3-7}$)cycloalkyl, (C$_{6-10}$)aryl, or nitro. In one class of this embodiment, the weight average molecular weight ("M$_w$") of the regioselectively substituted cellulose ester is in the range of from about 80,000 Da to about 250,000 Da. In one class of this embodiment, the weight average molecular weight ("M$_w$") of the regioselectively substituted cellulose ester is in the range of from about 80,000 Da to about 150,000 Da In one class of this embodiment, the weight average molecular weight ("M$_w$") of the regioselectively substituted cellulose ester is in the range of from about 100,000 Da to about 150,000 Da.

In one embodiment of the regioselective cellulose ester, R$^1$ is chosen from a (C$_{1-20}$)alkyl. In one class of this embodiment, the weight average molecular weight ("M$_w$") of the regioselectively substituted cellulose ester is in the range of from about 80,000 Da to about 250,000 Da. In one class of this embodiment, the weight average molecular weight ("M$_w$") of the regioselectively substituted cellulose ester is in the range of from about 80,000 Da to about 150,000 Da. In one class of this embodiment, the weight average molecular weight ("M$_w$") of the regioselectively substituted cellulose ester is in the range of from about 100,000 Da to about 150,000 Da.

In one embodiment of the regioselective cellulose ester, R$^1$ is an (C$_{6-20}$)aryl, wherein the aryl is unsubstituted or substituted by 1 to 6 R$^2$ groups, and R$^2$ is chosen from (C$_{1-6}$)alkyl, halo(C$_{1-6}$)alkyl, (C$_{1-6}$)alkoxy, halo(C$_{1-6}$)alkoxy, halo, (C$_{3-7}$)cycloalkyl, (C$_{6-10}$)aryl, or nitro. In one class of this embodiment, the weight average molecular weight ("M$_w$") of the regioselectively substituted cellulose ester is in the range of from about 80,000 Da to about 250,000 Da. In one class of this embodiment, the weight average molecular weight ("M$_w$") of the regioselectively substituted cellulose ester is in the range of from about 80,000 Da to about 150,000 Da. In one class of this embodiment, the weight average molecular weight ("$M_w$") of the regioselectively substituted cellulose ester is in the range of from about 100,000 Da to about 150,000 Da.

In one embodiment of the regioselective cellulose ester, $R^1$ is chosen from methyl, ethyl, propyl, 1-ethyl-pentyl-, phenyl, 3,4,5-trimethoxylphenyl, 2-naphthyl, benzothiophenyl, or heptadecanyl. In one class of this embodiment, the weight average molecular weight ("$M_w$") of the regioselectively substituted cellulose ester is in the range of from about 80,000 Da to about 250,000 Da. In one class of this embodiment, the weight average molecular weight ("$M_w$") of the regioselectively substituted cellulose ester is in the range of from about 80,000 Da to about 150,000 Da. In one class of this embodiment, the weight average molecular weight ("$M_w$") of the regioselectively substituted cellulose ester is in the range of from about 100,000 Da to about 150,000 Da.

In one embodiment of the film, the degree of substitution of $R^1$—CO— at the C6 position ("C6DS$_{R1}$") is in the range of from about 0 to about 0.3. In one class of this embodiment, the weight average molecular weight ("Mw") of the regioselectively substituted cellulose ester is in the range of from about 80,000 Da to about 250,000 Da. In one class of this embodiment, the weight average molecular weight ("$M_w$") of the regioselectively substituted cellulose ester is in the range of from about 80,000 Da to about 150,000 Da. In one class of this embodiment, the weight average molecular weight ("Mw") of the regioselectively substituted cellulose ester is in the range of from about 100,000 Da to about 150,000 Da.

In one class of this embodiment, $R^1$ is chosen from a ($C_{1-20}$)alkyl, halo($C_{1-20}$)alkyl, or an ($C_{6-20}$)aryl, wherein the aryl is unsubstituted or substituted by 1 to 6 $R^2$ groups, and $R^2$ is chosen from ($C_{1-6}$)alkyl, halo($C_{1-6}$)alkyl, ($C_{1-6}$)alkoxy, halo($C_{1-6}$)alkoxy, halo, ($C_{3-7}$)cycloalkyl, ($C_{6-10}$)aryl, or nitro. In one subclass of this class, the weight average molecular weight ("$M_w$") of the regioselectively substituted cellulose ester is in the range of from about 80,000 Da to about 250,000 Da. In one subclass of this class, the weight average molecular weight ("$M_w$") of the regioselectively substituted cellulose ester is in the range of from about 80,000 Da to about 150,000 Da. In one subclass of this class, the weight average molecular weight ("$M_w$") of the regioselectively substituted cellulose ester is in the range of from about 100,000 Da to about 150,000 Da.

In one class of this embodiment, $R^1$ is chosen from a ($C_{1-20}$)alkyl. In one subclass of this class, the weight average molecular weight ("$M_w$") of the regioselectively substituted cellulose ester is in the range of from about 80,000 Da to about 250,000 Da. In one subclass of this class, the weight average molecular weight ("$M_w$") of the regioselectively substituted cellulose ester is in the range of from about 80,000 Da to about 150,000 Da. In one subclass of this class, the weight average molecular weight ("$M_w$") of the regioselectively substituted cellulose ester is in the range of from about 100,000 Da to about 150,000 Da.

In one class of this embodiment, $R^1$ is an ($C_{6-20}$)aryl, wherein the aryl is unsubstituted or substituted by 1 to 6 $R^2$ groups, and $R^2$ is chosen from ($C_{1-6}$)alkyl, halo($C_{1-6}$)alkyl, ($C_{1-6}$)alkoxy, halo($C_{1-6}$)alkoxy, halo, ($C_{3-7}$)cycloalkyl, ($C_{6-10}$)aryl, or nitro. In one subclass of this class, the weight average molecular weight ("$M_w$") of the regioselectively substituted cellulose ester is in the range of from about 80,000 Da to about 250,000 Da. In one subclass of this class, the weight average molecular weight ("$M_w$") of the regioselectively substituted cellulose ester is in the range of from about 80,000 Da to about 150,000 Da. In one subclass of this class, the weight average molecular weight ("$M_w$") of the regioselectively substituted cellulose ester is in the range of from about 100,000 Da to about 150,000 Da.

In one embodiment of the film, the degree of substitution of $R^1$—CO— at the C6 position ("C6DS$_{R1}$") is in the range of from about 0 to about 0.1. In one class of this embodiment, the weight average molecular weight ("Mw") of the regioselectively substituted cellulose ester is in the range of from about 80,000 Da to about 250,000 Da. In one class of this embodiment, the weight average molecular weight ("Mw") of the regioselectively substituted cellulose ester is in the range of from about 80,000 Da to about 150,000 Da. In one class of this embodiment, the weight average molecular weight ("Mw") of the regioselectively substituted cellulose ester is in the range of from about 100,000 Da to about 150,000 Da.

In one class of this embodiment, $R^1$ is chosen from a ($C_{1-20}$)alkyl, halo($C_{1-20}$)alkyl, or an ($C_{6-20}$)aryl, wherein the aryl is unsubstituted or substituted by 1 to 6 $R^2$ groups, and $R^2$ is chosen from ($C_{1-6}$)alkyl, halo($C_{1-6}$)alkyl, ($C_{1-6}$)alkoxy, halo($C_{1-6}$)alkoxy, halo, ($C_{3-7}$)cycloalkyl, ($C_{6-10}$)aryl, or nitro. In one subclass of this class, the weight average molecular weight ("$M_w$") of the regioselectively substituted cellulose ester is in the range of from about 80,000 Da to about 250,000 Da. In one subclass of this class, the weight average molecular weight ("$M_w$") of the regioselectively substituted cellulose ester is in the range of from about 80,000 Da to about 150,000 Da. In one subclass of this class, the weight average molecular weight ("$M_w$") of the regioselectively substituted cellulose ester is in the range of from about 100,000 Da to about 150,000 Da.

In one class of this embodiment, $R^1$ is chosen from a ($C_{1-20}$)alkyl. In one subclass of this class, the weight average molecular weight ("$M_w$") of the regioselectively substituted cellulose ester is in the range of from about 80,000 Da to about 250,000 Da. In one subclass of this class, the weight average molecular weight ("$M_w$") of the regioselectively substituted cellulose ester is in the range of from about 80,000 Da to about 150,000 Da. In one subclass of this class, the weight average molecular weight ("$M_w$") of the regioselectively substituted cellulose ester is in the range of from about 100,000 Da to about 150,000 Da.

In one class of this embodiment, $R^1$ is an ($C_{6-20}$)aryl, wherein the aryl is unsubstituted or substituted by 1 to 6 $R^2$ groups, and $R^2$ is chosen from ($C_{1-6}$)alkyl, halo($C_{1-6}$)alkyl, ($C_{1-6}$)alkoxy, halo($C_{1-6}$)alkoxy, halo, ($C_{3-7}$)cycloalkyl, ($C_{6-10}$)aryl, or nitro. In one subclass of this class, the weight average molecular weight ("$M_w$") of the regioselectively substituted cellulose ester is in the range of from about 80,000 Da to about 250,000 Da. In one subclass of this class, the weight average molecular weight ("$M_w$") of the regioselectively substituted cellulose ester is in the range of from about 80,000 Da to about 150,000 Da. In one subclass of this class, the weight average molecular weight ("$M_w$") of the regioselectively substituted cellulose ester is in the range of from about 100,000 Da to about 150,000 Da.

In one class of this embodiment, $R^1$ is chosen from methyl, ethyl, propyl, 1-ethyl-pentyl-, phenyl, 3,4,5-trimethoxylphenyl, 2-naphthyl, benzothiophenyl, or heptadecanyl. In one subclass of this class, the weight average molecular weight ("$M_w$") of the regioselectively substituted cellulose ester is in the range of from about 80,000 Da to about 250,000 Da. In one subclass of this class, the weight average molecular weight ("$M_w$") of the regioselectively substituted cellulose ester is in the range of from about 80,000 Da to about 150,000 Da. In one subclass of this class, the weight average molecular weight ("$M_w$") of the regioselectively substituted cellulose ester is in the range of from about 100,000 Da to about 150,000 Da.

In one embodiment of the film, the degree of substitution of $R^1$—CO— at the C6 position ("$C6DS_{R1}$") is in the range of from about 0 to about 0.08. In one class of this embodiment, the weight average molecular weight ("Mw") of the regioselectively substituted cellulose ester is in the range of from about 80,000 Da to about 250,000 Da. In one class of this embodiment, the weight average molecular weight ("Mw") of the regioselectively substituted cellulose ester is in the range of from about 80,000 Da to about 150,000 Da. In one class of this embodiment, the weight average molecular weight ("Mw") of the regioselectively substituted cellulose ester is in the range of from about 100,000 Da to about 150,000 Da.

In one class of this embodiment, $R^1$ is chosen from a ($C_{1-20}$)alkyl, halo($C_{1-20}$)alkyl, or an ($C_{6-20}$)aryl, wherein the aryl is unsubstituted or substituted by 1 to 6 $R^2$ groups, and $R^2$ is chosen from ($C_{1-6}$)alkyl, halo($C_{1-6}$)alkyl, ($C_{1-6}$)alkoxy, halo($C_{1-6}$)alkoxy, halo, ($C_{3-7}$)cycloalkyl, ($C_{6-10}$)aryl, or nitro. In one subclass of this class, the weight average molecular weight ("$M_w$") of the regioselectively substituted cellulose ester is in the range of from about 80,000 Da to about 250,000 Da. In one subclass of this class, the weight average molecular weight ("$M_w$") of the regioselectively substituted cellulose ester is in the range of from about 80,000 Da to about 150,000 Da. In one subclass of this class, the weight average molecular weight ("$M_w$") of the regioselectively substituted cellulose ester is in the range of from about 100,000 Da to about 150,000 Da.

In one class of this embodiment, $R^1$ is chosen from a ($C_{1-20}$)alkyl. In one subclass of this class, the weight average molecular weight ("$M_w$") of the regioselectively substituted cellulose ester is in the range of from about 80,000 Da to about 250,000 Da. In one subclass of this class, the weight average molecular weight ("$M_w$") of the regioselectively substituted cellulose ester is in the range of from about 80,000 Da to about 150,000 Da. In one subclass of this class, the weight average molecular weight ("$M_w$") of the regioselectively substituted cellulose ester is in the range of from about 100,000 Da to about 150,000 Da.

In one class of this embodiment, $R^1$ is an ($C_{6-20}$)aryl, wherein the aryl is unsubstituted or substituted by 1 to 6 $R^2$ groups, and $R^2$ is chosen from ($C_{1-6}$)alkyl, halo($C_{1-6}$)alkyl, ($C_{1-6}$)alkoxy, halo($C_{1-6}$)alkoxy, halo, ($C_{3-7}$)cycloalkyl, ($C_{6-10}$)aryl, or nitro. In one subclass of this class, the weight average molecular weight ("$M_w$") of the regioselectively substituted cellulose ester is in the range of from about 80,000 Da to about 250,000 Da. In one subclass of this class, the weight average molecular weight ("$M_w$") of the regioselectively substituted cellulose ester is in the range of from about 80,000 Da to about 150,000 Da. In one subclass of this class, the weight average molecular weight ("$M_w$") of the regioselectively substituted cellulose ester is in the range of from about 100,000 Da to about 150,000 Da.

In one class of this embodiment, $R^1$ is chosen from methyl, ethyl, propyl, 1-ethyl-pentyl-, phenyl, 3,4,5-trimethoxylphenyl, 2-naphthyl, benzothiophenyl, or heptadecanyl. In one subclass of this class, the weight average molecular weight ("$M_w$") of the regioselectively substituted cellulose ester is in the range of from about 80,000 Da to about 250,000 Da. In one subclass of this class, the weight average molecular weight ("$M_w$") of the regioselectively substituted cellulose ester is in the range of from about 80,000 Da to about 150,000 Da. In one subclass of this class, the weight average molecular weight ("$M_w$") of the regioselectively substituted cellulose ester is in the range of from about 100,000 Da to about 150,000 Da.

In one embodiment of the film, the degree of substitution of $R^1$—CO— at the C6 position ("$C6DS_{R1}$") is in the range of from about 0 to about 0.06. In one class of this embodiment, the weight average molecular weight ("Mw") of the regioselectively substituted cellulose ester is in the range of from about 80,000 Da to about 250,000 Da. In one class of this embodiment, the weight average molecular weight ("Mw") of the regioselectively substituted cellulose ester is in the range of from about 80,000 Da to about 150,000 Da. In one class of this embodiment, the weight average molecular weight ("Mw") of the regioselectively substituted cellulose ester is in the range of from about 100,000 Da to about 150,000 Da.

In one class of this embodiment, $R^1$ is chosen from a ($C_{1-20}$)alkyl, halo($C_{1-20}$)alkyl, or an ($C_{6-20}$)aryl, wherein the aryl is unsubstituted or substituted by 1 to 6 $R^2$ groups, and $R^2$ is chosen from ($C_{1-6}$)alkyl, halo($C_{1-6}$)alkyl, ($C_{1-6}$)alkoxy, halo($C_{1-6}$)alkoxy, halo, ($C_{3-7}$)cycloalkyl, ($C_{6-10}$)aryl, or nitro. In one subclass of this class, the weight average molecular weight ("$M_w$") of the regioselectively substituted cellulose ester is in the range of from about 80,000 Da to about 250,000 Da. In one subclass of this class, the weight average molecular weight ("$M_w$") of the regioselectively substituted cellulose ester is in the range of from about 80,000 Da to about 150,000 Da. In one subclass of this class, the weight average molecular weight ("$M_w$") of the regioselectively substituted cellulose ester is in the range of from about 100,000 Da to about 150,000 Da.

In one class of this embodiment, $R^1$ is chosen from a ($C_{1-20}$)alkyl. In one subclass of this class, the weight average molecular weight ("$M_w$") of the regioselectively substituted cellulose ester is in the range of from about 80,000 Da to about 250,000 Da. In one subclass of this class, the weight average molecular weight ("$M_w$") of the regioselectively substituted cellulose ester is in the range of from about 80,000 Da to about 150,000 Da. In one subclass of this class, the weight average molecular weight ("$M_w$") of the regioselectively substituted cellulose ester is in the range of from about 100,000 Da to about 150,000 Da.

In one class of this embodiment, $R^1$ is an ($C_{6-20}$)aryl, wherein the aryl is unsubstituted or substituted by 1 to 6 $R^2$ groups, and $R^2$ is chosen from ($C_{1-6}$)alkyl, halo($C_{1-6}$)alkyl, ($C_{1-6}$)alkoxy, halo($C_{1-6}$)alkoxy, halo, ($C_{3-7}$)cycloalkyl, ($C_{6-10}$)aryl, or nitro. In one subclass of this class, the weight average molecular weight ("$M_w$") of the regioselectively substituted cellulose ester is in the range of from about 80,000 Da to about 250,000 Da. In one subclass of this class, the weight average molecular weight ("$M_w$") of the regioselectively substituted cellulose ester is in the range of from about 80,000 Da to about 150,000 Da. In one subclass of this class, the weight average molecular weight ("$M_w$") of the regioselectively substituted cellulose ester is in the range of from about 100,000 Da to about 150,000 Da.

In one class of this embodiment, $R^1$ is chosen from methyl, ethyl, propyl, 1-ethyl-pentyl-, phenyl, 3,4,5-trimethoxylphenyl, 2-naphthyl, benzothiophenyl, or heptadecanyl. In one subclass of this class, the weight average molecular weight ("$M_w$") of the regioselectively substituted cellulose ester is in the range of from about 80,000 Da to about 250,000 Da. In one subclass of this class, the weight average molecular weight ("$M_w$") of the regioselectively substituted cellulose ester is in the range of from about 80,000 Da to about 150,000 Da. In one subclass of this class, the weight average molecular weight ("$M_w$") of the regioselectively substituted cellulose ester is in the range of from about 100,000 Da to about 150,000 Da.

In one embodiment of the film, the degree of substitution of $R^1$—CO— at the C6 position ("C6DS$_{R1}$") is in the range of from about 0 to about 0.04. In one class of this embodiment, the weight average molecular weight ("Mw") of the regioselectively substituted cellulose ester is in the range of from about 80,000 Da to about 250,000 Da. In one class of this embodiment, the weight average molecular weight ("Mw") of the regioselectively substituted cellulose ester is in the range of from about 80,000 Da to about 150,000 Da. In one class of this embodiment, the weight average molecular weight ("Mw") of the regioselectively substituted cellulose ester is in the range of from about 100,000 Da to about 150,000 Da.

In one class of this embodiment, $R^1$ is chosen from a $(C_{1-20})$alkyl, halo$(C_{1-20})$alkyl, or an $(C_{6-20})$aryl, wherein the aryl is unsubstituted or substituted by 1 to 6 $R^2$ groups, and $R^2$ is chosen from $(C_{1-6})$alkyl, halo$(C_{1-6})$alkyl, $(C_{1-6})$alkoxy, halo$(C_{1-6})$alkoxy, halo, $(C_{3-7})$cycloalkyl, $(C_{6-10})$aryl, or nitro. In one subclass of this class, the weight average molecular weight ("$M_w$") of the regioselectively substituted cellulose ester is in the range of from about 80,000 Da to about 250,000 Da. In one subclass of this class, the weight average molecular weight ("$M_w$") of the regioselectively substituted cellulose ester is in the range of from about 80,000 Da to about 150,000 Da. In one subclass of this class, the weight average molecular weight ("$M_w$") of the regioselectively substituted cellulose ester is in the range of from about 100,000 Da to about 150,000 Da.

In one class of this embodiment, $R^1$ is chosen from a $(C_{1-20})$alkyl. In one subclass of this class, the weight average molecular weight ("$M_w$") of the regioselectively substituted cellulose ester is in the range of from about 80,000 Da to about 250,000 Da. In one subclass of this class, the weight average molecular weight ("$M_w$") of the regioselectively substituted cellulose ester is in the range of from about 80,000 Da to about 150,000 Da. In one subclass of this class, the weight average molecular weight ("$M_w$") of the regioselectively substituted cellulose ester is in the range of from about 100,000 Da to about 150,000 Da.

In one class of this embodiment, $R^1$ is an $(C_{6-20})$aryl, wherein the aryl is unsubstituted or substituted by 1 to 6 $R^2$ groups, and $R^2$ is chosen from $(C_{1-6})$alkyl, halo$(C_{1-6})$alkyl, $(C_{1-6})$alkoxy, halo$(C_{1-6})$alkoxy, halo, $(C_{3-7})$cycloalkyl, $(C_{6-10})$aryl, or nitro. In one subclass of this class, the weight average molecular weight ("$M_w$") of the regioselectively substituted cellulose ester is in the range of from about 80,000 Da to about 250,000 Da. In one subclass of this class, the weight average molecular weight ("$M_w$") of the regioselectively substituted cellulose ester is in the range of from about 80,000 Da to about 150,000 Da. In one subclass of this class, the weight average molecular weight ("$M_w$") of the regioselectively substituted cellulose ester is in the range of from about 100,000 Da to about 150,000 Da.

In one class of this embodiment, $R^1$ is chosen from methyl, ethyl, propyl, 1-ethyl-pentyl-, phenyl, 3,4,5-trimethoxylphenyl, 2-naphthyl, benzothiophenyl, or heptadecanyl. In one subclass of this class, the weight average molecular weight ("$M_w$") of the regioselectively substituted cellulose ester is in the range of from about 80,000 Da to about 250,000 Da. In one subclass of this class, the weight average molecular weight ("$M_w$") of the regioselectively substituted cellulose ester is in the range of from about 80,000 Da to about 150,000 Da. In one subclass of this class, the weight average molecular weight ("$M_w$") of the regioselectively substituted cellulose ester is in the range of from about 100,000 Da to about 150,000 Da.

In one embodiment of the film, $R^1$ is $(C_{1-20})$alkyl. In one embodiment of the compositions of matter, $R^1$ is halo$(C_{1-20})$alkyl. In one embodiment of the composition, $R^1$ is $(C_{2-20})$alkenyl. In one embodiment of the compositions of matter, $R^1$ is $(C_{3-7})$cycloalkyl. In one embodiment of the compositions of matter, $R^1$ is $(C_{6-20})$aryl, wherein the aryl is unsubstituted or substituted by 1 to 6 $R^2$ groups, wherein $R^2$ is chosen from $(C_{1-6})$alkyl, halo$(C_{1-6})$alkyl, $(C_{1-6})$alkoxy, halo$(C_{1-6})$alkoxy, halo, $(C_{3-7})$cycloalkyl, $(C_{6-10})$aryl, or nitro. In one embodiment of the compositions of matter, $R^1$ is a 5- to 20 membered heteroaryl containing 1 to 3 heteroatoms independently selected from oxygen, sulfur, and nitrogen, wherein the heteroaryl is unsubstituted or substituted by 1 to 6 $R^3$ groups, $R^3$ is chosen from $(C_{1-6})$alkyl, halo$(C_{1-6})$alkyl, $(C_{1-6})$alkoxy, halo$(C_{1-6})$alkoxy, halo, $(C_{3-7})$cycloalkyl, $(C_{6-10})$aryl, or nitro.

In one embodiment of the film, $R^1$ is chosen from $(C_{1-20})$alkyl; halo$(C_{1-20})$alkyl; $(C_{2-20})$alkenyl, $(C_{6-20})$aryl, wherein the aryl is unsubstituted or substituted by 1 to 6 $R^2$ groups; or a 5- to 20 membered heteroaryl containing 1 to 3 heteroatoms independently selected from oxygen, sulfur, and nitrogen, wherein the heteroaryl is unsubstituted or substituted by 1 to 6 $R^3$ groups.

In one embodiment of the film, $R^1$ is chosen from a $(C_{1-20})$alkyl, halo$(C_{1-20})$alkyl, or an $(C_{6-20})$aryl, wherein the aryl is unsubstituted or substituted by 1 to 6 $R^2$ groups, and $R^2$ is chosen from $(C_{1-6})$alkyl, halo$(C_{1-6})$alkyl, $(C_{1-6})$alkoxy, halo$(C_{1-6})$alkoxy, halo, $(C_{3-7})$cycloalkyl, $(C_{6-10})$aryl, or nitro.

In one embodiment of the film, $R^1$ is chosen from methyl, ethyl, propyl, 1-ethyl-pentyl-, phenyl, 3,4,5-trimethoxylphenyl, 2-naphthyl, benzothiophenyl, or heptadecanyl.

In one embodiment of the film, the regioselectively substituted cellulose ester further comprises a plurality of $R^4$—CO-substituents, wherein the degree of substitution of $R^4$—CO— at the C6 position ("C6DS$_{R4}$") is in the range of from about 0.1 to about 1.0, wherein $R^4$ is chosen from $(C_{1-20})$alkyl; halo$(C_{1-5})$alkyl; $(C_{2-20})$alkenyl, $(C_{3-7})$cycloalkyl, $(C_{6-20})$aryl, wherein the aryl is unsubstituted or substituted by 1 to 6 $R^5$ groups; or monocyclic or bicyclic heteroaryl containing 1 to 3 heteroatoms independently selected from oxygen, sulfur, and nitrogen, wherein the heteroaryl is unsubstituted or substituted by 1 to 6 $R^6$ groups, $R^5$ is chosen from $(C_{1-6})$alkyl, halo$(C_{1-6})$alkyl, $(C_{1-6})$alkoxy, halo$(C_{1-6})$alkoxy, halo, $(C_{3-7})$cycloalkyl, $(C_{6-10})$aryl, or nitro, and $R^6$ is chosen from $(C_{1-6})$alkyl, halo$(C_{1-6})$alkyl, $(C_{1-6})$alkoxy, halo$(C_{1-6})$alkoxy, halo, $(C_{3-7})$cycloalkyl, $(C_{6-10})$aryl, or nitro.

In one class of this embodiment, the degree of substitution of $R^4$—CO— at the C2 position ("C2DS$_{R4}$") is in the range of from about 0 to about 0.5, wherein the degree of substitution of $R^4$—CO— at the C3 position ("C3DS$_{R4}$") is in the range of from about 0 to about 0.5. In one subclass of this class, the weight average molecular weight ("$M_w$") is in the range of from about 80,000 Da to about 250,000 Da. In one subclass of this class, the weight average molecular weight ("$M_w$") is in the range of from about 80,000 Da to about 100,000 Da. In one subclass of this class, the weight average molecular weight ("$M_w$") is in the range of from about 100,000 Da to about 250,000 Da.

In one class of this embodiment, the degree of substitution of $R^4$—CO— at the C2 position ("$C2DS_{R4}$") is in the range of from about 0 to about 0.4, wherein the degree of substitution of $R^4$—CO— at the C3 position ("$C3DS_{R4}$") is in the range of from about 0 to about 0.4. In one subclass of this class, the weight average molecular weight ("$M_w$") is in the range of from about 80,000 Da to about 250,000 Da. In one subclass of this class, the weight average molecular weight ("$M_w$") is in the range of from about 80,000 Da to about 100,000 Da. In one subclass of this class, the weight average molecular weight ("$M_w$") is in the range of from about 100,000 Da to about 250,000 Da.

In one class of this embodiment, the degree of substitution of $R^4$—CO— at the C2 position ("$C2DS_{R4}$") is in the range of from about 0 to about 0.3, wherein the degree of substitution of $R^4$—CO— at the C3 position ("$C3DS_{R4}$") is in the range of from about 0 to about 0.3. In one subclass of this class, the weight average molecular weight ("$M_w$") is in the range of from about 80,000 Da to about 250,000 Da. In one subclass of this class, the weight average molecular weight ("$M_w$") is in the range of from about 80,000 Da to about 100,000 Da. In one subclass of this class, the weight average molecular weight ("$M_w$") is in the range of from about 100,000 Da to about 250,000 Da.

In one class of this embodiment, the degree of substitution of $R^4$—CO— at the C2 position ("$C2DS_{R4}$") is in the range of from about 0 to about 0.2, wherein the degree of substitution of $R^4$—CO— at the C3 position ("$C3DS_{R4}$") is in the range of from about 0 to about 0.2. In one subclass of this class, the weight average molecular weight ("$M_w$") is in the range of from about 80,000 Da to about 250,000 Da. In one subclass of this class, the weight average molecular weight ("$M_w$") is in the range of from about 80,000 Da to about 100,000 Da. In one subclass of this class, the weight average molecular weight ("$M_w$") is in the range of from about 100,000 Da to about 250,000 Da.

In one class of this embodiment, the weight average molecular weight ("$M_w$") is in the range of from about 80,000 Da to about 250,000 Da.

In one class of this embodiment, the weight average molecular weight ("$M_w$") is in the range of from about 80,000 Da to about 100,000 Da.

In one class of this embodiment, the weight average molecular weight ("$M_w$") is in the range of from about 100,000 Da to about 250,000 Da.

In one class of this embodiment, $R^4$ is $(C_{1-20})$alkyl. In one class of this embodiment, $R^4$ is halo$(C_{1-5})$alkyl.

In one class of this embodiment, $R^4$ is $(C_{2-20})$alkenyl.

In one class of this embodiment, $R^4$ is $(C_{3-7})$cycloalkyl.

In one class of this embodiment, $R^4$ is $(C_{6-20})$aryl, wherein the aryl is unsubstituted or substituted by 1 to 6 $R^5$ groups, wherein $R^5$ is chosen from $(C_{1-6})$alkyl, halo$(C_{1-6})$alkyl, $(C_{1-6})$alkoxy, halo$(C_{1-6})$alkoxy, halo, $(C_{3-7})$cycloalkyl, $(C_{6-10})$aryl, or nitro.

In one class of this embodiment, $R^4$ is a monocyclic or bicyclic heteroaryl containing 1 to 3 heteroatoms independently selected from oxygen, sulfur, and nitrogen, wherein the heteroaryl is unsubstituted or substituted by 1 to 6 $R^6$ groups, and $R^6$ is chosen from $(C_{1-6})$alkyl, halo$(C_{1-6})$alkyl, $(C_{1-6})$alkoxy, halo$(C_{1-6})$alkoxy, halo, $(C_{3-7})$cycloalkyl, $(C_{6-10})$aryl, or nitro.

In one class of this embodiment, $R^4$ is chosen from methyl, ethyl, propyl, 1-ethyl-pentyl-, phenyl, 3,4,5-trimethoxylphenyl, 2-naphthyl, benzothiophenyl, or heptadecanyl. In one subclass of this class, $R^4$ is methyl. In one subclass of this class, $R^4$ is ethyl. In one subclass of this class, $R^4$ is propyl. In one subclass of this class, $R^4$ is 1-ethyl-pentyl-. In one subclass of this class, $R^4$ is phenyl. In one subclass of this class, $R^4$ is 3,4,5-trimethoxylphenyl. In one subclass of this class, $R^4$ is 2-naphthyl. In one subclass of this class, $R^4$ is benzothiophenyl. In one subclass of this class, $R^4$ is heptadecanyl.

In one embodiment of the film, the film is a uniaxial or biaxial optical film. In one class of this embodiment, the film is a uniaxial optical film. In one class of this embodiment, the film is a biaxial optical film.

In one embodiment, the film has a birefringence ("$\Delta n$") between about 0.007 to about 0.010 as measured at a wavelength of 589 nm. In one embodiment, the film has a $\Delta n$ between about 0.008 to about 0.010 as measured at a wavelength of 589 nm. In one embodiment, the film has a $\Delta n$ between about 0.009 to about 0.010 as measured at a wavelength of 589 nm.

In one embodiment, the film has a percent haze of less than about 0.9. In one embodiment, the film has a percent haze of less than about 0.8. In one embodiment, the film has a percent haze of less than about 0.7. In one embodiment, the film has a percent haze of less than about 0.6. In one embodiment, the film has a percent haze of less than about 0.5. In one embodiment, the film has a percent haze of less than 0.4. In one embodiment, the film has a percent haze of less than about 0.3. In one embodiment, the film has a percent haze of less than about 0.2.

In one embodiment, the film is a C+ film, C− film, an A+ film, or a A− film. In one class of this embodiment, the film is a C+ film. In one class of this embodiment, the film is a C− film. In one class of this embodiment, the film is an A+ film. In one class of this embodiment, the film is an A− film. In one class of this embodiment, the film is an A− film.

In one embodiment, the film is a C+ film, a C− film, a reverse A film, or a NRZ film.

In one class of this embodiment, is a C+ film. In one subclass of this class, the film has an out-of-plane retardation ("$R_{th}$") as measured at a wavelength of 589 nm divided by the thickness of the film ("d") is in the range of from 0 to about 20. In one sub-subclass of this subclass, the film is uniaxially, biaxially, or 45 degree stretched.

In one class of this embodiment, the film is a C− film. In one subclass of this class, the film has an of the out-of-plane retardation ("$R_{th}$") as measured at a wavelength of 589 nm divided by the thickness of the film ("d") is in the range of from 0 to about −12. In one sub-subclass of this subclass, the film is uniaxially, biaxially, or 45 degree stretched. In one subclass of this class, the film has an of the out-of-plane retardation ("$R_{th}$") as measured at a wavelength of 589 nm divided by the thickness of the film ("d") is in the range of from 0 to about −17. In one sub-subclass of this subclass, the film is uniaxially, biaxially, or 45 degree stretched. In one subclass of this class, the film has an of the out-of-plane retardation ("$R_{th}$") as measured at a wavelength of 589 nm divided by the thickness of the film ("d") is in the range of from −2 to about −17. In one sub-subclass of this subclass, the film is uniaxially, biaxially, or 45 degree stretched. In one subclass of this class, the film has an of the out-of-plane retardation ("$R_{th}$") as measured at a wavelength of 589 nm divided by the thickness of the film ("d") is in the range of from −5 to about −17. In one sub-subclass of this subclass, the film is uniaxially, biaxially, or 45 degree stretched.

In one class of this embodiment, the film is a reverse A film. In one subclass of this class, the film satisfies the relations of $R_e450/R_e550<1$ and $R_e650/R_e550>1$, wherein $R_e450$, $R_e550$, and $R_e650$ are the in-plane retardations as measured at the wavelengths of 450 nm, 550 nm, and 650 nm, respectively. In one sub-subclass of this subclass, the film the in-plane retardation ("$R_e$") of the film as measured at the wavelength of 589 nm is in the range of from about 100 nm to about 300 nm. In one sub-sub-subclass of this sub-subclass, the film is uniaxially, biaxially, or 45 degree stretched.

In one class of this embodiment, the film is a NRZ film. In one subclass of this class, the film satisfies the relations of $R_e450/R_e550<1$ and $R_e650/R_e550>1$, wherein $R_e450$, $R_e550$, and $R_e650$ are the in-plane retardations as measured at the wavelengths of 450 nm, 550 nm, and 650 nm, respectively. In one sub-subclass of this subclass, the film the in-plane retardation ("$R_e$") of the film as measured at the wavelength of 589 nm is in the range of from about 100 nm to about 300 nm. In one sub-sub-subclass of this sub-subclass, the out-of-plane retardation ("$R_e$") of the film is in the range of from about 0 nm to about −50 nm as measured at the wavelength of 589 nm. In one sub-sub-sub-subclass of this sub-sub-subclass, the film is uniaxially, biaxially, or 45 degree stretched.

In one embodiment, the previously disclosed films have an $R_{th}$ as measured at a wavelength of 589 nm divided by the thickness of the film ("d") in the range of from −50 to 50. In one embodiment, the previously disclosed films have an $R_{th}$ as measured at a wavelength of 589 nm divided by the thickness of the film ("d") in the range of from −50 to 0. In one embodiment, the previously disclosed films have an $R_{th}$ as measured at a wavelength of 589 nm divided by the thickness of the film ("d") in the range of from 0 to 50. In one embodiment, the previously disclosed films have an $R_{th}$ as measured at a wavelength of 589 nm divided by the thickness of the film ("d") in the range of from −20 to 20. In one embodiment, the previously disclosed films have an $R_{th}$ as measured at a wavelength of 589 nm divided by the thickness of the film ("d") in the range of from −20 to 0. In one embodiment, the previously disclosed films have an $R_{th}$ as measured at a wavelength of 589 nm divided by the thickness of the film ("d") in the range of from 0 to 20. In one embodiment, the previously disclosed films have an $R_{th}$ as measured at a wavelength of 589 nm divided by the thickness of the film ("d") in the range of from −15 to 15. In one embodiment, the previously disclosed films have an $R_{th}$ as measured at a wavelength of 589 nm divided by the thickness of the film ("d") in the range of from −15 to 0. In one embodiment, the previously disclosed films have an $R_{th}$ as measured at a wavelength of 589 nm divided by the thickness of the film ("d") in the range of from 0 to 15. In one embodiment, the previously disclosed films have an $R_{th}$ as measured at a wavelength of 589 nm divided by the thickness of the film ("d") in the range of from −10 to 10. In one embodiment, the previously disclosed films have an $R_{th}$ as measured at a wavelength of 589 nm divided by the thickness of the film ("d") in the range of from −10 to 0. In one embodiment, the previously disclosed films have an $R^{th}$ as measured at a wavelength of 589 nm divided by the thickness of the film ("d") in the range of from 0 to 10. In one embodiment, the previously disclosed films have an $R_{th}$ nm in the range of from −5 to 0. In one embodiment, the previously disclosed films have an $R_{th}$ nm in the range of from −5 to 0. In one embodiment, the previously disclosed films have an $R_{th}$ as measured at a wavelength of 589 nm divided by the thickness of the film ("d") in the range of from 0 to 5. In one embodiment, the previously disclosed films have an $R_{th}$ as measured at a wavelength of 589 nm divided by the thickness of the film ("d") in the range of from −3 to 3. In one embodiment, the previously disclosed films have an $R_{th}$ as measured at a wavelength of 589 nm divided by the thickness of the film ("d") in the range of from −3 to 0. In one embodiment, the previously disclosed films have an $R_{th}$ as measured at a wavelength of 589 nm divided by the thickness of the film ("d") in the range of from 0 to 3. In one embodiment, the previously disclosed films have an $R_{th}$ as measured at a wavelength of 589 nm divided by the thickness of the film ("d") in the range of from −1 to 1. In one embodiment, the previously disclosed films have an $R_{th}$ as measured at a wavelength of 589 nm divided by the thickness of the film ("d") in the range of from −1 to 0. In one embodiment, the previously disclosed films have an $R_{th}$ as measured at a wavelength of 589 nm divided by the thickness of the film ("d") in the range of from 0 to 1. In one embodiment, the previously disclosed films have an $R_{th}$ as measured at a wavelength of 589 nm divided by the thickness of the film ("d") in the range of from −0.5 to 0.5. In one embodiment, the previously disclosed films have an $R_{th}$ as measured at a wavelength of 589 nm divided by the thickness of the film ("d") in the range of from −0.5 to 0. In one embodiment, the previously disclosed films have an $R_{th}$ as measured at a wavelength of 589 nm divided by the thickness of the film ("d") in the range of from 0 to 0.5.

Any of the above-described films can have a thickness in the range of from about 40 to about 120 μm, in the range of from about 40 to about 70 μm, or in the range of from about 5 to about 20 μm. Thickness and average thickness are used interchangeably in this application. As used herein, "average thickness" shall denote an average of at least three evenly-spaced measurements of the optical film's thickness.

In various embodiments, additives such as plasticizers, stabilizers, UV absorbers, antiblocks, slip agents, lubricants, dyes, pigments, retardation modifiers, etc. may be mixed with the regioselectively substituted cellulose esters used in preparing the above-described optical films. Examples of these additives can be found, for example, in U.S. Patent Application Publication Nos. US 2009/0050842, US 2009/0054638, and US 2009/0096962, the contents of which are incorporated herein by reference.

Any of the above-described optical films can be made by solvent casting, melt extrusion, lamination, or a coating process. These procedures are generally known in the art. Examples of solvent casting, melt extrusion, lamination, and coating methods can be found, for example, in U.S. Patent Application Publication Nos. US 2009/0050842, US 2009/0054638, and US 2009/0096962, the contents of which are incorporated herein by reference. Further examples of solvent casting, melt extrusion, lamination, and coating methods to form films can be found, for example, in U.S. Pat. Nos. 4,592,885 and 7,172,713, and U.S. Patent Application Publication Nos. US 2005/0133953 and US 2010/0055356, the contents of which are incorporated herein by reference.

In order to assist in obtaining the desired $R_e$ and $R_{th}$ values using the regioselectively substituted cellulose esters described herein, the films can be stretched. By adjusting the stretch conditions, such as stretch temperature, stretch type (uniaxial or biaxial), stretch ratio, pre-heat time and temperature, and post-stretch annealing time and temperature, the desired $R_e$, and $R_{th}$, can be achieved. The precise stretching conditions may depend upon the specific composition of the regioselectively substituted cellulose ester, the amount and type of plasticizer, and the glass transition temperature of that specific composition. Hence, the specific stretching conditions can vary widely. In various embodiments, the stretching temperature can be in the range of from about 160 to about 210° C. Additionally, the stretch ratio based on 1.0 in the machine direction ("MD") can range from about 1.3 to about 2.0 in the transverse direction ("TD"). The pre-heat time can be in the range of from about 10 to about 300 seconds, and the pre-heat temperature can be the same as the stretch temperature. The post-annealing time can range from about 0 to about 300 seconds, and the post-annealing temperature can range from about 10 to about 40° C. below the stretching temperature. Film thickness may depend upon the film thickness before stretching and upon the stretching conditions. After stretching, the film thickness can be from about 1 µm to about 500 µm, from about 5 µm to about 200 µm, or from about 10 µm to about 120 µm.

In addition to the optical properties, the films prepared from the regioselectively substituted cellulose esters described herein have other valuable features. Many conventional cellulose esters used in LCD displays have relatively high moisture uptake which affects dimensional stability and results in changing optical values of the film. Films prepared from the regioselectively substituted cellulose esters described herein have low moisture uptake, and the optical values of the film change very little at high humidity and temperature. Thus, in various embodiments, the regioselectively substituted cellulose esters can contain less than 2 weight percent moisture, less than 1 weight percent moisture, or less than 0.5 weight percent moisture. In other various embodiments, the change in $R_e$ for the cellulose ester film can be less than 4 percent, less than 1 percent, or less than 0.5 percent when stored at 60° C., 100 percent relative humidity for 240 hours.

The regioselectively substituted cellulose esters described herein are surprisingly thermally stable which makes them very useful in melt extrusion of film. Thus, one aspect of the present invention relates to regioselectively substituted cellulose esters that have less than 10 percent weight loss by thermogravimetric analysis at 330° C., 340° C., or 350° C.

As noted above, the optical films described herein can be employed in LCDs. Particularly, the above-described optical films can be employed as part or all of a compensation film in the polarizer stack of an LCD. As described above, polarizer stacks generally include two crossed polarizers disposed on either side of a liquid crystal layer. Compensation films can be disposed between the liquid crystal layer and one of the polarizers. In one or more embodiments, the above-described single layer optical film can be employed by itself as a compensation film (i.e., a waveplate) in an LCD. In such an embodiment, the single layer optical film can be disposed between the liquid crystal layer and one of the polarizing filters of the LCD. In other embodiments, the above-described −A optical film can be employed in a compensation film (i.e., a waveplate) in an LCD. In such embodiments, the −A optical film can be disposed adjacent to at least one additional optical film, where such additional optical film can be a −C optical film. In still other embodiments, the above-described +C optical film can be employed in a compensation film (i.e., a waveplate) in an LCD. In such embodiments, the +C optical film can be disposed adjacent to at least one additional optical film, where such additional optical film can be a +A optical film. In any of the foregoing embodiments, LCDs prepared comprising the optical films described herein can operate in in-plane-switching ("IPS") mode.

The optical compensation film described herein can also be employed in OLED. For example, a QWP combined with a linear polarizer to form a circular polarizer. When the circular polarizer is put in front of an OLED device, it can reduce the ambient light reflected from OLED metal electrodes to improved viewing quality, such as high contrast ratio and less color shift, especially when the QWP has a reverse dispersion close to ideal.

The optical films described herein can also be employed in circular polarizers. Particularly, a single quarter waveplate can be prepared comprising one or more of the above-described optical films of the present invention, which can be used to convert linear polarized light to circular polarized light. This aspect may be particularly valuable for use in circular-polarized 3-dimensional ("3-D") glasses and/or 3-D media displays, such as televisions ("3-D TV"). Accordingly, in one or more embodiments, a single quarter waveplate can be prepared comprising the above-described single layer optical film. In other various embodiments, a single quarter waveplate can be prepared comprising the above-described −A optical film. Such quarter waveplates can be applied to the glass of a 3-D TV, such as above the polarizing stack. Additionally, such quarter waveplates can be applied to the glass of 3-D glasses. In the case of 3-D glasses, the optical film can be applied so that the optical axis in one lens is perpendicular or substantially perpendicular to the optical axis of the other lens. The result in 3-D glasses is that certain observed polarization is blocked in one lens but will pass through the other lens leading to the observed 3-D optical effect. In various embodiments, a quarter waveplate comprising one or more of the above-described optical films can be employed in conjunction with at least one additional polarizer, which can be a linear polarizer.

Any of the disclosed films can be incorporated into a multilayer film. The present application also relates to a multilayer film comprising any of the disclosed films of the present application.

Processes

The present application discloses a process for the preparation of a regioselectively substituted cellulose ester having a combined C2 and C3 degree of substitution ("(C2+C3) DS") in the range of from about 0 to about 2.0, and a C6 degree of substitution ("C6DS") of from about 0 to about 0.6, comprising:

(1) contacting a cellulose with about 1.4 eq to about 1.8 eq of trifluoroacetic anhydride ("TFAA") and about 0.1 eq to about 0.8 eq of one or more of a first carboxylic acid in a reaction medium in a suitable solvent, wherein the equivalents of the TFAA and the first carboxylic acid are based on the sum total of anhydroglucosyl units of the cellulose.

A suitable solvent for this process is any solvent that can dissolve or partially dissolve the starting cellulose or the formed cellulose esters in reaction to lead to the desired product. In one embodiment of this process, the suitable solvent is trifluoroacetic acid.

The acyl substituent contributing to the (C2+C3)DS and the C6DS is an acyl substituent derived from the first carboxylic acid or any acylating compound.

In one embodiment of this process, the C6DS is less than 0.4. In one embodiment of this process, the C6DS is less than 0.2. In one embodiment of this process, the C6DS is less than 0.1. In one embodiment of this process, the C6DS is less than 0.08. In one embodiment of this process, the C6DS is less than 0.06. In one embodiment of this process, the C6DS is less than 0.04. In one embodiment of this process, the C6DS is less than 0.02.

In one embodiment of this process, further comprising (2) adding 0.1 to 2.0 eq of one or more of an acyl donor, wherein the equivalents of the acyl donor is based on the sum total of anhydroglucosyl units of the cellulose. In one class of this embodiment, the acyl donor is chosen from a second carboxylic acid or an anhydride. In one subclass of this class, the acyl donor is a second carboxylic acid. In one subclass of this class, the acyl donor is an anhydride.

In one class of this embodiment, the acyl donor is added after at least 50% of the first carboxylic acid is consumed. In one subclass of this class, the acyl donor is chosen from a second carboxylic acid or an anhydride. In one sub-subclass of this subclass, the acyl donor is a second carboxylic acid. In one sub-subclass of this subclass, the acyl donor is an anhydride.

In one class of this embodiment, the acyl donor is added after at least 80% of the first carboxylic acid is consumed. In one subclass of this class, the acyl donor is chosen from a second carboxylic acid or an anhydride. In one sub-subclass of this subclass, the acyl donor is a second carboxylic acid. In one sub-subclass of this subclass, the acyl donor is an anhydride.

In one class of this embodiment, the acyl donor is added after at least 90% of the first carboxylic acid is consumed. In one subclass of this class, the acyl donor is chosen from a second carboxylic acid or an anhydride. In one sub-subclass of this subclass, the acyl donor is a second carboxylic acid. In one sub-subclass of this subclass, the acyl donor is an anhydride.

In one embodiment of this process, the regioselectively substituted cellulose ester has a weight average molecular weight ("$M_w$") in the range of from about 5,000 Da to about 250,000 Da. In one embodiment of this process, the regioselectively substituted cellulose ester has a weight average molecular weight ("$M_w$") in the range of from about 25,000 Da to about 250,000 Da. In one embodiment of this process, the regioselectively substituted cellulose ester has a weight average molecular weight ("$M_w$") in the range of from about 50,000 Da to about 250,000 Da. In one embodiment of this process, the regioselectively substituted cellulose ester has a weight average molecular weight ("$M_w$") in the range of from about 80,000 Da to about 250,000 Da. In one embodiment of this process, the regioselectively substituted cellulose ester has a weight average molecular weight ("$M_w$") in the range of from about 100,000 Da to about 250,000 Da.

In one embodiment of this process, the first carboxylic acid is $R^1$—COOH, wherein $R^1$ is chosen from $(C_{1-20})$alkyl; halo$(C_{1-20})$alkyl; $(C_{2-20})$alkenyl, $(C_{3-7})$cycloalkyl, $(C_{6-20})$aryl, wherein the aryl is unsubstituted or substituted by 1 to 6 $R^2$ groups; or a 5- to 20 membered heteroaryl containing 1 to 3 heteroatoms independently selected from oxygen, sulfur, and nitrogen, wherein the heteroaryl is unsubstituted or substituted by 1 to 6 $R^3$ groups, wherein $R^2$ is chosen from $(C_{1-6})$alkyl, halo$(C_{1-6})$alkyl, $(C_{1-6})$alkoxy, halo$(C_{1-6})$alkoxy, halo, $(C_{3-7})$cycloalkyl, $(C_{6-10})$aryl, or nitro, and wherein $R^3$ is chosen from $(C_{1-6})$alkyl, halo$(C_{1-6})$alkyl, $(C_{1-6})$alkoxy, halo$(C_{1-6})$alkoxy, halo, $(C_{3-7})$cycloalkyl, $(C_{6-10})$aryl, or nitro.

In one embodiment of this process, the second carboxylic acid is $R^1$—COOH, wherein $R^1$ is chosen from $(C_{1-20})$alkyl; halo$(C_{1-20})$alkyl; $(C_{2-20})$alkenyl, $(C_{3-7})$cycloalkyl, $(C_{6-20})$aryl, wherein the aryl is unsubstituted or substituted by 1 to 6 $R^2$ groups; or a 5- to 20 membered heteroaryl containing 1 to 3 heteroatoms independently selected from oxygen, sulfur, and nitrogen, wherein the heteroaryl is unsubstituted or substituted by 1 to 6 $R^3$ groups, wherein $R^2$ is chosen from $(C_{1-6})$alkyl, halo$(C_{1-6})$alkyl, $(C_{1-6})$alkoxy, halo$(C_{1-6})$alkoxy, halo, $(C_{3-7})$cycloalkyl, $(C_{6-10})$aryl, or nitro, and wherein $R^3$ is chosen from $(C_{1-6})$alkyl, halo$(C_{1-6})$alkyl, $(C_{1-6})$alkoxy, halo$(C_{1-6})$alkoxy, halo, $(C_{3-7})$cycloalkyl, $(C_{6-10})$aryl, or nitro.

In one embodiment of this process, the cellulose is a softwood cellulose, a hardwood cellulose, cotton linter cellulose or a microcrystalline cellulose. In one embodiment of this process, the cellulose is Placetate F cellulose.

In one embodiment of this process, the reaction medium is set at a temperature in the range of from about 20° C. to about 80° C. In one class of this embodiment, the reaction medium is set at a temperature in the range of from about 35° C. to about 75° C. In one class of this embodiment, the reaction medium is set at a temperature in the range of from about 0° C. to about 20° C. In one class of this embodiment, the reaction medium is set at a temperature in the range of from about 30° C. to about 50° C. In one class of this embodiment, the reaction medium is set at a temperature in the range of from about 50° C. to about 80° C.

The present application discloses a process for the preparation of a regioselectively substituted cellulose ester having a C2 degree of substitution ("C2DS") of from 0.01 to 1, a C3 degree of substitution ("C3DS") of from 0.01 to 1, and a C6 degree of substitution ("C6DS") of from about 0 to about 0.1, comprising:

(1) contacting a cellulose with about 0.5 to about 5.0 eq of trifluoroacetic anhydride ("TFAA") and 0.1 to 2.0 eq of one or more of a first acylating agent ("FAA") in a reaction medium with a suitable solvent to esterify at least a portion of the cellulose thereby producing the regioselectively substituted cellulose ester, wherein the equivalents of the TFAA and the FAA are based on the sum total of anhydroglucosyl units of the cellulose.

The acyl substituent contributing to the (C2+C3)DS and the C6DS is an acyl substituent derived from the FAA or any other acylating compound added to the reaction medium.

A suitable solvent for this process is any solvent that can dissolve or partially dissolve the starting cellulose or the formed cellulose esters in reaction to lead to the desired product. In one embodiment of this process, the suitable solvent is trifluoroacetic acid.

In one embodiment of this process, the C6DS is less than 0.4. In one embodiment of this process, the C6DS is less than 0.2. In one embodiment of this process, the C6DS is less than 0.1. In one embodiment of this process, the C6DS is less than 0.08. In one embodiment of this process, the C6DS is less than 0.06. In one embodiment of this process, the C6DS is less than 0.04. In one embodiment of this process, the C6DS is less than 0.02.

In one embodiment of this process, the TFAA is present at 0.5 eq to about 5.0 eq. In one embodiment of this process, the TFAA is present at 0.5 eq to about 3.0 eq. In one embodiment of this process, the TFAA is present at 0.5 eq to about 2.0 eq. In one embodiment of this process, the TFAA is present at 1.0 eq to about 2.0 eq.

In one embodiment of this process, the one or more FAA is introduced after the introduction of the TFAA. In one class of this embodiment, the one or more FAA and the TFAA are added while dissolved in a suitable solvent. In one subclass of this class, the suitable solvent is trifluoroacetic acid. In one embodiment of this process, the one or more FAA is introduced before the introduction of the TFAA. In one class of this embodiment, the one or more FAA and the TFAA are added while dissolved in a suitable solvent. In one subclass of this class, the suitable solvent is trifluoroacetic acid. In one embodiment of this process, the one or more FAA and the TFAA are introduced at the same time. In one class of this embodiment, the one or more FAA and the TFAA are added while dissolved in a suitable solvent. In one subclass of this class, the suitable solvent is trifluoroacetic acid.

In one embodiment of this process, the FAA is chosen from an anhydride or an acid halide. In one embodiment of this process, the FAA is chosen from a symmetrical anhydride or a mixed anhydride. In a class of this embodiment, the mixed anhydride is generated in the reaction medium by the addition of a carboxylic acid. In one embodiment of this process, the FAA is an acid halide.

In one embodiment, the FAA is $R^{1a}$—C(O)OC(O)—$R^{1b}$, wherein $R^{1a}$ and $R^{1b}$ are independently chosen from $(C_{1-20})$alkyl; halo$(C_{1-20})$alkyl; $(C_{2-20})$alkenyl, $(C_{3-7})$cycloalkyl, $(C_{6-20})$aryl, wherein the aryl is unsubstituted or substituted by 1 to 6 $R^2$ groups; or a 5- to 20 membered heteroaryl containing 1 to 3 heteroatoms independently selected from oxygen, sulfur, and nitrogen, wherein the heteroaryl is unsubstituted or substituted by 1 to 6 $R^3$ groups, wherein each $R^2$ is chosen from $(C_{1-6})$alkyl, halo$(C_{1-6})$alkyl, $(C_{1-6})$alkoxy, halo$(C_{1-6})$alkoxy, halo, $(C_{3-7})$cycloalkyl, $(C_{6-10})$aryl, or nitro, and wherein each $R^3$ is chosen from $(C_{1-6})$alkyl, halo$(C_{1-6})$alkyl, $(C_{1-6})$alkoxy, halo$(C_{1-6})$alkoxy, halo, $(C_{3-7})$cycloalkyl, $(C_{6-10})$aryl, or nitro.

In one embodiment, the FAA is $R^{1a}$—C(O)X, wherein $R^1$ is chosen from $(C_{1-20})$alkyl; halo$(C_{1-20})$alkyl; $(C_{2-20})$alkenyl, $(C_{3-7})$cycloalkyl, $(C_{6-20})$aryl, wherein the aryl is unsubstituted or substituted by 1 to 6 $R^2$ groups; or a 5- to 20 membered heteroaryl containing 1 to 3 heteroatoms independently selected from oxygen, sulfur, and nitrogen, wherein the heteroaryl is unsubstituted or substituted by 1 to 6 $R^3$ groups, wherein each $R^2$ is chosen from $(C_{1-6})$alkyl, halo$(C_{1-6})$alkyl, $(C_{1-6})$alkoxy, halo$(C_{1-6})$alkoxy, halo, $(C_{3-7})$cycloalkyl, $(C_{6-10})$aryl, or nitro, wherein each $R^3$ is chosen from $(C_{1-6})$alkyl, halo$(C_{1-6})$alkyl, $(C_{1-6})$alkoxy, halo$(C_{1-6})$alkoxy, halo, $(C_{3-7})$cycloalkyl, $(C_{6-10})$aryl, or nitro, and X is chloro, bromo, or iodo.

In one embodiment of this process, the cellulose is a hardwood cellulose, a softwood cellulose, cotton linter cellulose or a microcrystalline cellulose. In one embodiment of this process, the cellulose is Placetate F cellulose.

In one embodiment of this process, the reaction medium is set at a temperature in the range of from about 20° C. to about 80° C. In one class of this embodiment, the reaction medium is set at a temperature in the range of from about 35° C. to about 75° C. In one class of this embodiment, the reaction medium is set at a temperature in the range of from about 0° C. to about 20° C. In one class of this embodiment, the reaction medium is set at a temperature in the range of from about 30° C. to about 50° C. In one class of this embodiment, the reaction medium is set at a temperature in the range of from about 50° C. to about 80° C.

The present application discloses a process for the preparation of a regioselectively substituted cellulose ester, comprising:

(1) contacting a cellulose with 0.5 to 5.0 eq of trifluoroacetic anhydride ("TFAA") and 0.1 to 2.0 eq of one or more of a first acylating agent ("FAA") in a first reaction medium with a first suitable solvent to esterify at least a portion of the cellulose thereby producing an intermediate regioselectively substituted cellulose ester having a C2 degree of substitution ("C2DS") of from 0.01 to 1, a C3 degree of substitution ("C3DS") of from 0.01 to 1, and a C6 degree of substitution ("C6DS") of from 0 to about 0.1, wherein the equivalents of the TFAA and the FAA are based on the sum total of anhydroglucosyl units of the cellulose, (2) isolating the intermediate regioselectively substituted cellulose ester ("IRSCE"), and (3) contacting the intermediate regioselectively substituted cellulose ester with 0.1 to 2.0 eq of one or more of a second acylating agent ("SAA") in a second reaction medium with a second suitable solvent, wherein the equivalents of the SAA are based on the sum total of anhydroglucosyl units of the IRSCE.

The acyl substituent contributing to the (C2+C3)DS and the C6DS is an acyl substituent derived from the FAA or any acylating compound added to the first reaction medium.

The first suitable solvent for this process is any solvent that can dissolve or partially dissolve the starting cellulose or the formed cellulose esters in reaction to lead to the desired product. In one embodiment of this process, the first suitable solvent is trifluoroacetic acid.

The second suitable solvent for this process is any solvent that can dissolve or partially dissolve the starting cellulose or the formed cellulose esters in reaction and is inert to the reaction. In one embodiment of this process, the second suitable solvent is chosen from methyl ethyl ketone, tetrahydrofuran, dimethyl sulfoxide, 1,3 dimethyl-2-imidazolidinone, dimethylacetamide, dioxane, dimethylformamide, ethyl acetate, butyl acetate, trichloromethane, pryridine, or dichloromethane.

In one embodiment of this process, the first suitable solvent is trifluoroacetic acid, and the second suitable solvent is chosen from methyl ethyl ketone, tetrahydrofuran, dimethyl sulfoxide, 1,3 dimethyl-2-imidazolidinone, dimethylacetamide, dioxane, dimethylformamide, ethyl acetate, butyl acetate, trichloromethane, pyridine, or dichloromethane.

In one embodiment of this process, the C6DS is less than 0.08. In one embodiment of this process, the C6DS is less than 0.06. In one embodiment of this process, the C6DS is less than 0.04. In one embodiment of this process, the C6DS is less than 0.02.

In one embodiment of this process, the TFAA is present at 0.5 eq to about 8.0 eq. In one embodiment of this process, the TFAA is present at 0.5 eq to about 6.0 eq. In one embodiment of this process, the TFAA is present at 0.5 eq to about 4.0 eq. In one embodiment of this process, the TFAA is present at 0.5 eq to about 3.0 eq. In one embodiment, the TFAA is present at 0.5 eq to about 2.0 eq. In one embodiment of this process, the TFAA is present at 1.0 eq to about 2.0 eq.

In one embodiment of this process, the one or more FAA is introduced after the introduction of the TFAA in TFA. In one embodiment of this process, the one or more FAA is introduced before the introduction of the TFAA in TFA. In one embodiment of this process, the one or more FAA and the TFAA in TFA are introduced at the same time.

In one embodiment of this process, the FAA is chosen from a symmetrical anhydride or a mixed anhydride. In one embodiment of this process, the FAA is an acid halide.

In one embodiment of this process, the cellulose is a hardwood cellulose, a softwood cellulose, cotton linter cellulose or a microcrystalline cellulose. In one embodiment of this process, the cellulose is Placetate F cellulose.

In one embodiment of this process, the first reaction medium is set at a temperature in the range of from about 20° C. to about 80° C. In one class of this embodiment, the first reaction medium is set at a temperature in the range of from about 35° C. to about 75° C. In one class of this embodiment, the first reaction medium is set at a temperature in the range of from about 0° C. to about 20° C. In one class of this embodiment, the first reaction medium is set at a temperature in the range of from about 30° C. to about 50° C. In one class of this embodiment, the first reaction medium is set at a temperature in the range of from about 50° C. to about 80° C.

In one embodiment of this process, the second reaction medium is set at a temperature in the range of from about 20° C. to about 80° C. In one class of this embodiment, the second reaction medium is set at a temperature in the range of from about 35° C. to about 75° C. In one class of this embodiment, the second reaction medium is set at a temperature in the range of from about 0° C. to about 20° C. In one class of this embodiment, the second reaction medium is set at a temperature in the range of from about 30° C. to about 50° C. In one class of this embodiment, the second reaction medium is set at a temperature in the range of from about 50° C. to about 80° C.

Embodiments

Embodiment 1. A regioselectively substituted cellulose ester comprising:
(i) a plurality of $R^1$—CO-substituents;
(ii) a plurality of $R^4$—CO-substituents;
(iii) a plurality of hydroxyl substituents,
wherein the degree of substitution of $R^1$—CO— at the C2 position ("C2DS$_{R1}$") is in the range of from about 0.2 to about 1.0,
wherein the degree of substitution of $R^1$—CO— at the C3 position ("C3DS$_{R1}$") is in the range of from about 0.2 to about 1.0,
wherein the degree of substitution of $R^1$—CO— at the C6 position ("C6DS$_{R1}$") is in the range of from about 0 to about 0.5,
wherein the degree of substitution of $R^4$—CO— at the C6 position ("C6DS$_{R4}$") is in the range of from about 0.1 to about 1.0,
wherein the degree of substitution of hydroxyl is in the range of from about 0 to about 2.6,
wherein $R^1$ is chosen from $(C_{1-20})$alkyl; halo$(C_{1-20})$alkyl; $(C_{2-20})$alkenyl, $(C_{3-7})$cycloalkyl, $(C_{6-20})$aryl, wherein the aryl is unsubstituted or substituted by 1 to 6 $R^2$ groups; or a 5- to 20 membered heteroaryl containing 1 to 3 heteroatoms independently selected from oxygen, sulfur, and nitrogen, wherein the heteroaryl is unsubstituted or substituted by 1 to 6 $R^3$ groups,
wherein $R^2$ is chosen from $(C_{1-6})$alkyl, halo$(C_{1-6})$alkyl, $(C_{1-6})$alkoxy, halo$(C_{1-6})$alkoxy, halo, $(C_{3-7})$cycloalkyl, $(C_{6-10})$aryl, or nitro, wherein $R^3$ is chosen from $(C_{1-6})$alkyl, halo$(C_{1-6})$alkyl, $(C_{1-6})$alkoxy, halo$(C_{1-6})$alkoxy, halo, $(C_{3-7})$cycloalkyl, $(C_{6-10})$aryl, or nitro;
wherein $R^4$ is chosen from $(C_{1-20})$alkyl; halo$(C_{1-5})$alkyl; $(C_{2-20})$alkenyl, $(C_{3-7})$cycloalkyl, $(C_{6-20})$aryl, wherein the aryl is unsubstituted or substituted by 1 to 6 $R^5$ groups; or monocyclic or bicyclic heteroaryl containing 1 to 3 heteroatoms independently selected from oxygen, sulfur, and nitrogen, wherein the heteroaryl is unsubstituted or substituted by 1 to 6 $R^6$ groups,
$R^5$ is chosen from $(C_{1-6})$alkyl, halo$(C_{1-6})$alkyl, $(C_{1-6})$alkoxy, halo$(C_{1-6})$alkoxy, halo, $(C_{3-7})$cycloalkyl, $(C_{6-10})$aryl, or nitro, and
$R^6$ is chosen from $(C_{1-6})$alkyl, halo$(C_{1-6})$alkyl, $(C_{1-6})$alkoxy, halo$(C_{1-6})$alkoxy, halo, $(C_{3-7})$cycloalkyl, $(C_{6-10})$aryl, or nitro.

Embodiment 2. The regioselectively substituted cellulose ester of Embodiment 1, wherein $R^1$—CO— is chosen from acetyl, propionyl, butanoyl, benzoyl, naphthoyl, 3,4,5-trimethoxybenzoyl, biphenyl-CO—, benzoyl-benzoyl-, or benzothiphene-CO—; and wherein $R^4$—CO— is chosen from acetyl, propionyl, butyryl, benzoyl, acetyl, naphthoyl, 3,4,5-trimethoxybenzoyl, biphenyl-CO—, benzoyl-benzoyl-, or benzothiphene-CO—.

Embodiment 3. The regioselectively substituted cellulose ester of any one of Embodiments 1 or 2, wherein C6DS$_{R1-CO-}$ is less than 0.1.

Embodiment 4. The regioselectively substituted cellulose ester of any one of Embodiments 1-3, wherein $R^1$—CO— is propionyl.

Embodiment 5. The regioselectively substituted cellulose ester of Embodiment 4, wherein the degree of substitution for propionyl is from about 1.0 to about 1.4, the C2 degree of substitution for propionyl is from 0.6 to 0.9, the C3 degree of substitution for propionyl is from about 0.3 to about 0.5.

Embodiment 6. The regioselectively substituted cellulose ester of Embodiment 5, wherein the degree of substitution at the C6 position for propionyl is less than 0.05.

Embodiment 7. The regioselectively substituted cellulose ester of any one of Embodiments 4-6, wherein $R^4$—CO— is a $(C_{6-20})$aryl-CO—.

Embodiment 8. The regioselectively substituted cellulose ester of any one of Embodiments 4-6, wherein $R^4$—CO— is a combination of pivaloyl and $(C_{6-20})$aryl-CO—.

Embodiment 9. The regioselectively substituted cellulose ester of Embodiment 8, wherein $(C_{6-20})$aryl-CO— is chosen from benzoyl and naphthoyl.

Embodiment 10. The regioselectively substituted cellulose ester of any one of Embodiments 8-9, wherein the degree of substitution for the pivaloyl is from 0.6 to 0.9; and the degree of substitution for the $(C_{6-20})$aryl-CO— is from 0.2 to 0.5.

Embodiment 11. The regioselectively substituted cellulose ester of Embodiments 1-3, wherein $R^1$—CO— is a combination comprising benzoyl and naphthoyl.

Embodiment 12. The regioselectively substituted cellulose ester of Embodiment 11, wherein $R^4$—CO— is $(C_{1-6})$alkyl-CO—.

Embodiment 13. The regioselectively substituted cellulose ester of Embodiment 12, wherein the degree of substitution of benzoyl is from about 0.2 to about 1.2, wherein the degree of substitution for naphthoyl is from about 0.8 to about 1.8, and wherein the degree of substitution for the $(C_{1-6})$alkyl-CO— is less than 0.5.

Embodiment 14. The regioselectively substituted cellulose ester of Embodiment 13, wherein $R^4$—CO— is propionyl.

Embodiment 15. The regioselectively substituted cellulose ester of any one of Embodiments 1-3, wherein $R^1$—CO— is a combination of propionyl and benzoyl.

Embodiment 16. The regioselectively substituted cellulose ester of Embodiment 15, wherein $R^4$—CO— is a combination of propionyl and benzoyl.

Embodiment 17. The regioselectively substituted cellulose ester of Embodiment 16, wherein the combined C2 and C3 degree of substitution for benzoyl is from 0.1 to 0.6, wherein the combined C2 and C3 degree of substitution for propionyl is from 0.5 to 1.4, wherein the C6 degree of substitution for benzoyl is from 0 to 0.8, and wherein the C6 degree of substitution for propionyl is from 0 to 1.0.

Embodiment 18. The regioselectively substituted cellulose ester of Embodiment 17, wherein the C6 degree of substitution for benzoyl is from 0.1 to 0.15, and wherein the C6 degree of substitution for propionyl is from 0.4 to 0.8.

Embodiment 19. The regioselectively substituted cellulose ester of any one of Embodiments 1-18, wherein the weight average molecular weight ("$M_w$") is in the range from about 50,000 Da to about 500,000 Da.

Experimental

Abbreviations

AcOH is acetic acid; $Ac_2O$ is acetic anhydride; AcCl is acetyl chloride; aq. is aqueous; $Bu_2O$ is butanoic anhydride; BzOH is benzoic acid; $Bz_2O$ is benzoic anhydride; Bzt is benzothiephenylC-CO—; BztOH is benzothiephenyl-COOH; BztCl is benzothiephenylCO-Cl; ° C. is degree Celsius; C2DS is degree of substitution of the 2 position of the anydroglucose residue; C3DS is degree of substitution of the 3 position of the anhydroglucose residue; C6DS is the degree of substitution of the 6 position of the anydroglucose residue; ClC is combustion ion chromatography; d is deuterated or deuterium; Da is dalton; DCE is dichloroethane; DCM is dichloromethane; DEP is diethyl phthalate; DMAc is N,N-dimethylacetamide; DMAP is 4-dimethylaminopyridine; DMSO-d6 is hexadeuterated dimethyl sulfoxide; min is minute; equiv or eq. is equivalent; $Et_2O$ is ethyl ether; Ex is example; g is gram; GPC is gel permeation chromatography; h is hour; Int is intermediate; KOAc is potassium acetate; min is minute; $M_w$ is weight average molecular weight; M is molar; MEK is methyl ethyl ketone; MeOH is methanol; mg is milligram; MHz is megahertz; MIPK is methyl isopropyl ketone; mL or ml is milliliter; μL is microliter; mm is millimeter; mmHg is millimeters mercury; $N_2$ is nitrogen; NMR is nuclear magnetic resonance; Np is naphthyl; NpOH is 2-naphthoic acid; NpOH is 2-naphthoic acid; $Np_2O$ is 2-naphthoic anhydride; ppm is parts per million; Pr is propionyl; $^iPrOH$ is isopropyl alcohol; PrOH is propionic acid; $Pr_2O$ is propionic anhydride; RDS is relative degree of substitution; rt is room temperature; SM is starting material; TFA is trifluoroacetic acid; TFAA is trifluoroacetic anhydride; $T_g$ is glass transition temperature; TMBz is 2,3,4-trimethoxybenzoyl; TMBzOH is 2,3,4-trimethoxybenzoic acid; TMBzCl is 2,3,5-trimethoxybenzoyl chloride; TPP is triphenyl phosphate; wt % is weight percent;

Materials and Methods

NMR Characterization

NMR Characterization: Proton NMR data were obtained on a JEOL Model Eclipse-600 NMR spectrometer operating at 600 MHz. The sample tube size was 5 mm, and the sample concentrations were ca. 20 mg/mL DMSO-$d_6$. Each spectrum was recorded at 80° C. using 64 scans and a 15 second pulse delay. One to two drops of trifluoroacetic acid-d were added to each sample to shift residual water from the spectral region of interest. Chemical shifts are reported in ppm from tetramethylsilane with the center peak of DMSO-$d_6$ as an internal reference (2.49 ppm).

Quantitative $^{13}C$ NMR data were obtained on a JEOL Model GX-400 NMR spectrometer operating at 100 MHz. The sample tube size was 10 mm, and the sample concentrations were ca. 100 mg/mL DMSO-$d_6$. Chromium(III) acetylacetonate was added to each sample at 5 mg/100 mg cellulose ester as a relaxation agent. Each spectrum was typically recorded at 80° C. using 10000 scans and a 1 second pulse delay. Chemical shifts are reported in ppm from tetramethylsilane with the center peak of DMSO-$d_6$ as an internal reference (39.5 ppm).

The proton and carbon NMR assignments, the degree of substitution and the RDS of the various acyl groups of the cellulose esters were determined by adapting the procedures disclosed in US 2012/0262650. The C2, C3, and C6 DS were determined by $^{13}C$ NMR. The total DS for any substituent is determined by $^1H$ NMR.

Molecular Weight Determination

For cellulose esters described in this report, Gel permeation chromatography analysis was performed in N-Methylpyrrolidinone containing 1% glacial acetic acid by weight. The instrumentation consisted of an Agilent series 1100 liquid chromatography system. The system components comprised a degasser, an isocratic pump with a flow rate set at 0.8 ml/min, an auto-sampler with an injection volume of 50 microliters, and a column oven set at 40° C. and a refractive index detector set at 40° C. The column set consisted of an Agilent PLgel 10 micron guard (7.5×50 mm) and a Mixed-B (7.5×300 mm) column in series. Samples were prepared by weighing 25 mg into a 2 dram screw cap vial and dissolving in 10 ml of the solvent. 10 microliters of toluene were added as a flow rate marker. The instrument was calibrated with a series of 14 narrow molecular weight polystyrene standards ranging from 580 to 3,750,000 in molecular weight. Instrument control and data collection/processing were carried out using Agilent GPC software version 1.2 build 3182.29519. For cellulose samples described in this report, Gel permeation chromatography analysis was performed in 70:30 N-methylpyrrolidinone/tributylmethylammonium dimethylphosphate by weight. The instrumentation consisted of an Agilent series 1100 liquid chromatography system. The system components comprised a degasser, an isocratic pump with a flow rate set at 0.5 ml/min, an auto-sampler with an injection volume of 50 microliters, and a column oven set at 60° C. and a refractive index detector set at 40° C. The column set consisted of an Agilent PLgel 10 micron guard (7.5×50 mm) and a Mixed-B (7.5×300 mm) column in series. Samples were prepared by weighing 12.5 mg into a 2 dram screw cap vial and dissolving in 10 ml of the solvent. 10 μL of toluene were added as a flow rate marker. The instrument was calibrated with a series of 14 narrow molecular weight polystyrene standards ranging from 580 to 3,750,000 in molecular weight. Instrument control and data collection/ processing were carried out using Agilent GPC software version 1.2 build 3182.29519.

Dope Preparations

The solutions of the cellulose esters for preparation of the films and the film preparation were made by adapting the procedures disclosed in US 2012/0262650.

General Procedure for Film Casting and Optical Film Analysis

A solvent (DCM, 10% MeOH in DCM, 10% Acetone in DCM, 10% DCE in DCM, MEK, or MIPK) and the regioselective cellulose ester (8 to 12 wt %) and optionally a plasticizer (10 wt %, DEP or TPP) were mixed to make a dope. Then, films were cast onto glass using a knife applicator and dried either at room temperature, in the case of a DCM based dope or at 85° C. in a forced air oven for 10 min. for dopes made from MEK and MIPK based dopes. The cast films were annealed at 100° C. and 120° C. in a forced air oven for 10 min each to remove the residual solvents. The thickness of the films was measured using a Metricon Prism Coupler 2010 (Metricon Corp.) or PosiTector 6000. The birefringence, optical dispersion and retardations were measured using a M-2000V Ellipsometer (J. A. Woollam Co.).

EXAMPLES

Example 1

6-Trifluoroacetyl Substituted Cellulose

A 1000 mL jacketed reaction kettle was fitted with a 4-neck removable top. To the top was affixed an overhead stirring shaft, a temperature probe, a reflux condenser, and a ground glass stopper. The reaction was connected via a rubber tubing to a Thermo Neslab RTE-7 temperature controller, and the set-point was set to 25° C. The reactor was charged with Placetate F cellulose pulp (20 g, 5 wt. %). To a separate 500 mL graduated cylinder was added TFA (337 g) followed by TFAA (41.9 g). The resulting solution was then slowly poured into the reactor. The temperature controller was set to 60° C., and the material was mixed via overhead stirring for ~75 min. The temperature controller was set to 50° C., and the reaction mixture was stirred for 35 min. The reaction mixture was poured into a beaker containing 2000 mL anhydrous diethyl ether to precipitate the crude product. The precipitate was dispersed to a uniform particle size using a homogenizer, and the resulting solids were collected by vacuum filtration. The solids were rinsed on the filter with diethyl ether (2×200 mL) and subsequently dried under vacuum at room temperature to afford the title product. Analysis: Total DS: 1.1, C2DS: 0.03, C3DS: 0.1, C6DS: 1.0, and $M_w$: 497,487.

Comparative Example 1

Cellulose-6-Trifluoroacetate Made According to Liebert Using Microcrystalline Cellulose A 1000 mL jacketed reaction kettle was fitted with a 4-neck removable top. To the top was affixed an overhead stirring shaft. The reaction was connected via a rubber tubing to a Thermo Neslab RTE-7 temperature controller, and the setpoint was set to 25° C. The reactor was charged with Alfa Aesar A17730 microcrystalline cellulose (10 g, 2.2 wt. %). To a separate 500 mL graduated cylinder was added TFA (297 g) followed by TFAA (149 g). The resulting solution was then slowly poured into the reactor. The material was mixed via overhead stirring at rt. After ~2-3 hours, the cellulose had fully dissolved, forming a clear, viscous solution. The solution was allowed to mix for 1 hour whereupon the solution was poured into a beaker containing 1500 mL anhydrous $Et_2O$. The precipitate was dispersed to a uniform particle size using a homogenizer, and the solids were collected using vacuum filtration. The solids were rinsed on the filter with diethyl ether (2×200 mL) and subsequently dried in vacuo at rt to afford the title compound. Analysis: Total DS: 1.2; C2DS 0.08; C3DS: 0.09; C6DS: 1.0; $M_w$: 220,902.

Comparative Ex 1 shows that the Liebert procedure produces a cellulose ester with less selectivity at the C2 position, but more selectivity for the C3 position. Additionally, the $M_w$ of the final product is less than half that for Ex 1.

Comparative Example 2

Cellulose-6-Trifluoroacetate Made According to Liebert Using Placetate F Cellulose Pulp A 1000 mL jacketed reaction kettle was fitted with a 4-neck removable top. To the top was affixed an overhead stirring shaft. The reaction was connected via a rubber tubing to a Thermo Neslab RTE-7 temperature controller, and the setpoint was set to 25° C. The reactor was charged with Placetate F Cellulose Pulp (10 g, 2.2 wt. %). To a separate 500 mL graduated cylinder was added TFA (297 g) followed by TFAA (149 g). The resulting solution was then slowly poured into the reactor. The material was mixed via overhead stirring at rt. After 3 h, the cellulose was not fully dissolved, instead giving viscous, heterogeneous clumps. This mixture was allowed to mix further for 1 h before being transferred to a beaker containing anhydrous $Et_2O$ (1.5 L). The material was dispersed to a uniform particle size using a homogenizer, and the solids were collected using vacuum filtration. The solids were rinsed on the filter with diethyl ether (2×200 mL) and subsequently dried in vacuo at rt to afford the title compound. Analysis: Total DS 1.4; C2DS: 0.1; C3DS: 0.7; C6DS: 0.7; $M_w$: 1,322,504.

Comparative Ex 2 illustrates that the Liebert procedure is ineffective in producing cellulose 6-trifluoroacetate from unmodified softwood pulps. Additionally, significant molecular weight degradation is not observed under these conditions.

Determination of Optimal TFAA Concentration for Acylation of Cellulose

The general procedure for determining the TFAA concentration is as follows. To a reaction vessel containing cellulose was added TFA and TFAA at rt, and the reaction was allowed to warm to 60° C. The mixture was stirred until complete dissolution of the cellulose occurred, and the temperature was lowered to 50° C. whereupon 2.00 equiv $Ac_2O$ (per anhydroglucose unit of cellulose) was added, and the mixture was allowed to stir overnight. Precipitation and polymer isolation gave the resulting cellulose acetates.

These preliminary studies are outlined in Table 1. When 0.6 equiv of TFAA were added, we saw a total $DS_{Ac}$ of 1.36 with a small amount of esterification at $C_6$. This result indicated selective trifluoroacetylation at $C_6$, although the acylation was not complete. We were pleased to find, however, that when 1.6 equiv TFAA were used, we saw good acetylation at $C_2$ and $C_3$ with virtually no substitution at $C_6$. We then examined the effect of additional charges of TFAA to determine if trifluoroacetylation was also selective for $C_2$ or $C_3$, although the addition of 2.6 and 3.6 equiv TFAA gave no promise for this added selectivity. We finally determined that 1.65 equiv TFAA was the ideal stoichiometry for selective trifluoroacetylation at $C_6$ while also leaving $C_2$ and $C_3$ open for further functionalization.

TABLE 1

| Trial # | Stoichiometry of TFAA | Total $DS_{Ac}$ | DS $C_2$ | DS $C_3$ | DS $C_6$ |
|---|---|---|---|---|---|
| 1 | 0.6 | 1.4 | 0.7 | 0.4 | 0.1 |
| 2 | 1.6 | 1.7 | 0.8 | 0.8 | 0.05 |
| 3 | 2.6 | 1.6 | 0.6 | 0.7 | 0.03 |
| 4 | 3.6 | 1.6 | 0.7 | 0.7 | 0.04 |
| 5 | 1.6 | 1.7 | 0.8 | 0.8 | 0.00 |

The results compare favorably with known methods for acetylation of cellulose pulps (Table 2). The heterogeneous preparation of a cellulose acetate such as Eastman™ CA-320s affords a randomly-substituted copolymer with the acetyl groups distributed amongst $C_2$, $C_3$, and $C_6$. Cellulose acetate prepared via the formate protocol developed by Buchanan (Example 13 of US9243072) affords a CA bearing significantly less substitution at $C_6$ (DS $C_6$=0.3). By contrast, polymers isolated via the TFA/TFAA protocol contain virtually no substitution at $C_6$. For example, cellulose acetate of Ex 2 contains DS=0.05 while the remaining functionality is exclusively populated on C2 and C3. Notably, Ex 2 may be prepared in a significantly higher molecular weight than Eastman™ CA 320S or Ex 13 of Buchanan. These data illustrate the improved qualities for cellulose esterification using the TFA/TFAA process.

TABLE 2

| Ex # | Total $DS_{Ac}$ | C2DS | C3DS | C6DS | GPC $M_w$ |
|---|---|---|---|---|---|
| EASTMAN™ CA 320S | 1.8 | 0.6 | 0.6 | 0.6 | 50,450 |
| EX 13 OF BUCHANAN | 1.8 | 0.7 | 0.8 | 0.3 | 43,719 |
| 2 | 1.9 | 0.9 | 0.9 | 0.05 | 118,627 |

Example 2

Cellulose 2,3-Acetate

A 1000 mL jacketed reaction kettle was fitted with a 4-neck removable top. To the top was affixed an overhead stirring shaft, a temperature probe, a reflux condenser, and a ground glass stopper. The reaction was connected via a rubber tubing to a Thermo Neslab RTE-7 temperature controller, and the setpoint was set to 25° C. The reactor was charged with Placetate F cellulose pulp (20 g, 5 wt. %). To a separate 500 mL graduated cylinder was added TFA (337 g) followed by TFAA (41.9 g). The resulting solution was then slowly poured into the reactor. The temperature controller was set to 60° C., and the material was mixed via overhead stirring for ~75 min. Then the temperature controller was set to 50° C., and the reaction mixture was stirred for 35 min. Following, $Ac_2O$ was (25.1 g, 2.00 equiv) added to the reaction mixture via an overhead addition funnel over 10 min. The resulting mixture was stirred for 12 h. The dope was then precipitated by pouring into 3000 mL deionized water to afford the crude product. The crude product was broken down to a uniform particle size via homogenization. The crude product were collected by filtration on a frit. The crude product was then suspended in 2000 mL of 5 M $KOAc_{(aq)}$ and slurried for 36 h. The crude product was collected by filtration on a frit and washed continuously with deionized water for 8 h. The title compound was then dried in a ceramic dish in vacuo at 60° C. for 12 h. Analysis: Total $DB_{Ac}$: 1.9, $C2DS_{Ac}$: 0.9, $C3DS_{Ac}$: 0.9, $C6DS_{Ac}$: 0.05, Mw: 118,627 Da By adapting the synthetic procedure for the synthesis of Ex 2, Ex 3-5 were synthesized.

TABLE 3

| Ex # | Anhydride (eq) | Total DS | C2DS | C3DS | C6DS | $M_w$ (Da) |
|---|---|---|---|---|---|---|
| 3 | $Pr_2O$ (2.0) | 2.00 | 0.9 | 0.9 | 0.01 | 154,987 |
| 4 | $Bu_2O$ (2.0) | 2.00 | 0.9 | 0.9 | 0.02 | 140,588 |
| 5 | $Bz_2O$ (2.0) | 1.9 | 0.9 | 0.9 | 0.02 | 161,381 |

Example 6

Cellulose-2,3-Propionate

A 1000 mL jacketed reaction kettle was fitted with a 4-neck removable top. To the top was affixed an overhead stirring shaft, a temperature probe, a reflux condenser, and a ground glass stopper. The reactor was connected via rubber tubing to a Thermo Neslab RTE-7 temperature controller, and the set-point was set to 25° C. The reactor was charged with Placetate F cellulose pulp (20 g, 5 wt. %). A TFA/TFAA solution was prepared by adding TFAA (42.7 g) to TFA (337 g). The TFA/TFAA solution was then slowly poured into the reactor. The temperature controller was set to 60° C., and the reaction mixture was mixed via overhead stirring (75 min). The set-point was then set to 50° C. In a separate flask, PrOH (18.26 g, 2.0 equiv) and TFA (30 mL) were stirred under a $N_2$ atmosphere. To the PrOH/TFA solution was added TFAA (51.8 g, 2.0 eq), and the solution was stirred (45 min) to prepare a mixed anhydride mixture. The mixed anhydride mixture was added over 10 min via an overhead addition funnel, and the resulting reaction mixture was stirred for 12 h. The dope was then precipitated by pouring into deionized water (3000 mL) to afford the crude product. The crude product was broken down to a uniform particle size via homogenization. The crude product was collected by filtration on a frit, and the crude product was then suspended in 5 M $KOAchd_{(aq.)}$ (2000 mL) and slurried for 36 h. The crude product were collected by filtration on a frit and washed continuously with deionized water for 8 h. The title compound was obtained after drying the material in vacuo (60° C.) for 12. Analysis: $DS_{Pr}$: 2.0, $C2DS_{Pr}$: 0.8, $C3DS_{Pr}$: 0.9, $C6DS_{Pr}$: 0.03, Mw: 163,340 Da.

By adapting the procedure for the synthesis of Ex 6, Ex 7-12, and Ex 58-61 were synthesized.

TABLE 4

| Ex # | Acid (Eq.) | Total DS | C2DS | C3DS | C6DS | $M_w$ (Da) |
|---|---|---|---|---|---|---|
| 7 | AcOH (2.0) | 1.7 | 0.8 | 0.8 | 0.06 | 182,827 |
| 8 | PrOH (2.0) | 2.0 | 0.8 | 0.9 | 0.03 | 163,340 |
| 9 | BuOH (2.0) | 2.1 | 0.8 | 0.9 | 0.05 | 223,652 |
| 10 | BzOH (2.0) | 1.6 | 0.9 | 0.9 | 0.00 | 227,721 |
| 11 | NpOH (2.0) | 2.1 | 1.0 | 1.0 | 0.00 | N/A |
| 12 | TMBzOH (1.4) | 1.4 | 0.8 | 0.4 | 0.05 | 150,756 |
| 58 | BzOH (1.5) | 1.7 | 0.8 | 0.7 | 0.04 | 124,496 |
| 59 | PrOH (1.3) | 1.2 | 0.8 | 0.4 | 0.01 | 103,946 |
| 60 | PrOH (1.2) | 1.1 | 0.7 | 0.4 | 0.01 | 98,185 |
| 61 | PrOH (1.2) | 1.2 | 0.8 | 0.4 | 0.03 | — |
| 89 | PrOH (1.2) | 1.15 | 0.66 | 0.36 | 0.03 | — |

TABLE 4-continued

| Ex # | Acid (Eq.) | Total DS | C2DS | C3DS | C6DS | $M_w$ (Da) |
|---|---|---|---|---|---|---|
| 90 | PrOH (1.44) | 1.51 | 0.80 | 0.56 | 0.03 | — |
| 91 | PrOH (1.3) | 1.37 | 0.77 | 0.46 | 0.02 | — |
| 92 | PrOH (1.2) | 1.20 | 0.77 | 0.34 | 0.06 | — |
| 93 | PrOH (1.3) | 1.17 | 0.78 | 0.35 | 0.03 | — |
| 94 | BuOH (1.3) | 1.4 | 0.85 | 0.4 | 0.07 | — |
| 95 | PrOH (1.7) | 1.8 | 0.9 | 0.8 | 0.06 | — |
| 96 | PrOH (1.5) | 1.6 | 0.85 | 0.6 | 0.06 | — |
| 97 | PrOH (1.7) | 1.7 | 0.9 | 0.8 | 0.03 | — |

Example 13

Cellulose 2,3 Benzoate Propionate

A 1000 mL jacketed reaction kettle was fitted with a 4-neck removable top. To the top was affixed an overhead stirring shaft, a temperature probe, a reflux condenser, and a ground glass stopper. The reaction vessel was connected via a rubber tubing to a Thermo Neslab RTE-7 temperature controller, and the set-point was set to 25° C. The reactor was charged with Placetate F cellulose pulp (20 g, 5 wt %). A solution of TFA/TFFA was prepared by adding TFAA (41.9 g) to TFA (337 g). The TFA/TFAA solution was then slowly poured into the reactor. The temperature controller was set to 60° C., and the reaction mixture was stirred via overhead stirring for ~75 min. The temperature controller was set to 50° C., and the reaction mixture was stirred for 35 min. $Pr_2O$ (8.02 g. 0.5 eq) was slowly added to the reaction mixture via an overhead addition funnel. During the addition of the $Pr_2O$, $Bz_2O$ (41.9 g, 1.50 eq) was added to the reaction mixture portion-wise via a solids addition funnel. Both additions were complete after 10 min. The reaction mixture was stirred for 12 h. The dope was then precipitated by pouring into deionized water (3000 mL) to afford the crude product. The crude product was broken down to a uniform particle size via homogenization. The crude product was collected by filtration on a frit. The solids were then re-suspended in $^i$PrOH and slurried for 30 min. The crude product was collected by filtration on a frit. The crude product was then suspended in 5 M $KOAc_{(aq.)}$ (2000 mL) and stirred (36 h). The crude product was collected by filtration on a frit and washed continuously with deionized water for 8 h. The title compound was obtained after drying in vacuo (60° C.) for 12 h. Analysis: $DS_{Bz}$: 0.9, $DS_{Pr}$: 1.0, C2DS: 0.9, C3DS: 1.0: C6DS: 0.0, $M_w$: 132,072 Da.

By adapting the procedure for the synthesis of Ex 13, Ex 14-16 were synthesized.

TABLE 5

| Ex # | Eq $Bz_2O$ | Eq $Pr_2O$ |
|---|---|---|
| 14 | 1.0 | 1.0 |
| 15 | 0.5 | 1.5 |
| 16 | 1.2 | 0.8 |

Table 6 provides the degree of substitution for Ex 14-16.

TABLE 6

| Ex # | $DS_{Bz}$ | $DS_{Pr}$ | C2DS | C3DS | C6DS | $M_w$ (Da) |
|---|---|---|---|---|---|---|
| 14 | 1.9 | 0.2 | 1.0 | 1.0 | 0.0 | 174,466 |
| 15 | 1.9 | 0.05 | 0.9 | 0.9 | 0.0 | ND |
| 16 | 0.5 | 1.5 | 0.9 | 1.0 | 0.0 | 146,421 |

Example 17

Cellulose 2,3-(2-Naphthoate) Propionate

A 1000 mL jacketed reaction kettle was fitted with a 4-neck removable top. To the top was affixed an overhead stirring shaft, a temperature probe, a reflux condenser, and a ground glass stopper. The reaction was connected via a rubber tubing to a Thermo Neslab RTE-7 temperature controller, and the set-point was set to 25° C. The reactor was charged with Placetate F cellulose pulp (20 g, 5 wt. %). To a separate 500 mL graduated cylinder was added TFA (337 g) followed by TFAA (41.9 g). The resulting solution was then slowly poured into the reactor. The temperature controller was set to 60° C., and the material was mixed via overhead stirring. After ~75 min, the mixture had formed a dark orange solution, at which point the temperature controller was set to 50° C. While this process was taking place, a separate oven-dried 250 mL round bottomed flask was charged with 2-NpOH (21.2 g, 1.0 eq) and TFA (60 mL) with magnetic stirring under an atmosphere of nitrogen. To this solution was slowly added TFAA (25.9 g, 1.0 eq), and the solution was allowed to stir for 45 min whereupon the slurry became homogeneous. The reaction kettle was then fitted with two separate liquids addition funnels. One funnel was charged with the freshly-prepared solution of the NpOH/TFAA, while the second funnel was charged with $Pr_2O$ (4.8 g, 0.3 eq). The stopcocks for each funnel were opened, and the liquids were added over a period of ~10 min. The resulting mixture was stirred for 12 h. The dope was then precipitated by pouring into deionized water (3000 mL) to afford the product as a white solid. The solids were broken down to a uniform particle size via homogenization. The solids were collected by filtration on a frit. The crude product were then transferred to a cellulose thimble and extracted with MeOH for 7 h using a Soxhlet apparatus. The crude product were then collected and suspended in 5 M $KOAc_{(aq.)}$ (2000 mL) and slurried for 36 h. The crude product were collected by filtration on a frit and washed continuously with deionized water for 8 h. The title compound was obtained after drying in vacuo (60° C.) for 12 h. Analysis: $DS_{Np}$: 0.7, $DS_{Pr}$: 0.6, C2DS: 0.7, C3DS: 0.4, C6DS: 0.07, Mw: 90,003 Da.

By adapting the procedure for the synthesis of Ex 17, Ex 18-20 were prepared.

TABLE 7

| Ex # | Eq NpOH/TFAA | Eq $Pr_2O$ |
|---|---|---|
| 18 | 1.0 | 0.3 |
| 19 | 1.2 | 0.1 |
| 20 | 0.8 | 0.5 |

Table 8 provides the degree of substitution and molecular weight information for Ex 18-20.

TABLE 8

| Ex # | $DS_{Np}$ | $DS_{Pr}$ | C2DS | C3DS | C6DS | $M_w$ (Da) |
|---|---|---|---|---|---|---|
| 18 | 0.7 | 0.6 | 0.7 | 0.4 | 0.07 | 90,003 |
| 19 | 1.4 | 0.2 | 0.8 | 0.6 | 0.02 | 140,686 |
| 20 | 0.4 | 0.9 | 0.8 | 0.5 | 0.01 | 124,096 |

Example 21

Cellulose 2,3-(2-Naphthoate) Propionate

A 1000 mL jacketed reaction kettle was fitted with a 4-neck removable top. To the top was affixed an overhead stirring shaft, a temperature probe, a reflux condenser, and a ground glass stopper. The reaction was connected via a rubber tubing to a Thermo Neslab RTE-7 temperature controller, and the setpoint was set to 25° C. The reactor was charged with Placetate F cellulose pulp (20 g, 5 wt. %). To a separate 500 mL graduated cylinder was added TFA (337 g) followed by TFAA (42.7 g). The resulting solution was then slowly poured into the reactor. The temperature controller was set to 60° C., and the material was mixed via overhead stirring. After ~75 min, the mixture had formed a dark orange solution, at which point the temperature controller was set to 50° C. While this process was taking place, a separate oven-dried 250 mL round bottomed flask was charged with 2-NpOH (25.5 g, 1.2 eq), PrOH (2.74 g, 0.3 eq), and TFA (60 mL) with magnetic stirring under a $N_2$ atmosphere. To this solution was slowly added TFAA (38.87 g, 1.5 eq), and the solution was allowed to stir for 45 min whereupon the slurry became homogeneous. The reaction kettle was then fitted with a liquids addition funnel. The funnel was then charged with the previously prepared mixture of anhydrides. The funnel was opened, and the anhydride solution was added to the cellulose dope such that the addition was complete within 10 min. The resulting mixture was allowed to stir for 12 h. The dope poured over deionized water (3000 mL) to afford the crude product. The crude product was broken down to a uniform particle size via homogenization. The crude product was collected by filtration on a frit. The crude product was then transferred to a cellulose thimble and washed with MeOH for 7 h using a Soxhlet apparatus. The crude product was then collected and suspended in 5 M $KOAc_{(aq.)}$ (2000 mL) and slurried for 36 h. The solids were collected by filtration on a frit and washed continuously with deionized water for 8 h. The title compound was obtained after drying in vacuo (60° C.) for 12 h. Analysis: $DSN_p$: 1.3, $DS_{Pr}$: 0.3, C2DS: 0.9, C3DS: 0.6, Mw: 124,916 Da By adapting the procedure for the synthesis of Ex 21, the examples in Table 9 were prepared.

TABLE 9

| Ex # | Acid 1 (eq) | Acid 2 (eq) | Acid 3 (eq) |
|---|---|---|---|
| 22 | PrOH (0.3) | BztOH (1.1) | — |
| 23 | PrOH (1.0) | BuOH (1.0) | — |
| 24 | PrOH (1.0) | BzOH (1.0) | — |
| 25 | PrOH (0.6) | BuOH (0.6) | Benzoate (0.6) |
| 26 | PrOH (0.6) | NpOH (0.6) | Benzoate (0.6) |
| 27 | PrOH (1.0) | 2-ethylhexanoic Acid (1.0) | — |
| 28 | PrOH (1.0) | Stearatic Acid (1.0) | — |
| 29 | PrOH (1.0) | Crotonic Acid (1.0) | — |
| 62 | PrOH (1.2) | BzOH (0.45) | — |
| 63 | PrOH (1.2) | BzOH (0.32) | — |
| 64 | PrOH (1.4) | BzOH (0.32) | — |
| 65 | PrOH (1.2) | BzOH (0.25) | — |
| 76 | AcOH (0.8) | BzOH (0.2) | N/A |
| 77 | AcOH (0.8) | BzOH (0.2) | N/A |
| 78 | AcOH (1.3) | N/A | N/A |
| 79 | AcOH (0.8) | BzOH (0.2) | N/A |
| 80 | AcOH (0.5) | BzOH (0.2) | N/A |
| 81 | AcOH (1.0) | BztOH (0.2) | N/A |
| 110 | PrOH (0.6) | BzOH (0.35) | N/A |
| 111 | PrOH (0.5) | BzOH (0.35) | N/A |

Table 10 provides the degree of substitution and molecular weight information for Ex 22-29, 62-65 and 76-81. Acyl 1, Acyl 2, and Acyl 3 are the acyl substituents from acid 1, acid 2, and acid 3, respectively.

TABLE 10

| Ex # | DS Acyl 1 | DS Acyl 2 | DS Acyl 3 | C2DS | C3DS | C6DS | $M_w$ (Da) |
|---|---|---|---|---|---|---|---|
| 22 | 0.3 | 1.0 | — | 0.7 | 0.5 | 0.02 | 168,587 |
| 23 | 1.0 | 1.1 | — | 0.8 | 0.9 | 0.03 | 193,570 |
| 24 | 1.2 | 0.8 | — | 0.9 | 0.9 | 0.03 | 164,411 |
| 25 | 0.7 | 0.7 | 0.6 | 0.9 | 0.8 | 0.03 | 166,560 |
| 26 | 0.7 | 0.7 | 0.6 | 0.9 | 0.8 | 0.03 | 109,183 |
| 27 | 1.0 | 1.0 | — | 0.9 | 0.9 | 0.03 | 186,928 |
| 28 | 0.9 | 1.1 | — | — | — | — | 102,968 |
| 29 | 1.0 | 0.9 | — | 0.9 | 0.8 | 0.04 | 129,012 |
| 62 | 1.3 | 0.2 | — | 0.8 | 0.4 | 0 | 105,134 |
| 63 | 1.3 | 0.4 | — | 0.8 | 0.7 | 0 | 94,974 |
| 64 | 1.6 | 0.3 | — | 0.8 | 0.8 | 0 | 109,951 |
| 65 | 1.2 | 0.2 | — | 0.8 | 0.5 | 0 | 111281 |
| 76 | 0.86 | 0.23 | N/A | 0.64 | 0.27 | 0.01 | 105464 |
| 77 | 0.81 | 0.23 | N/A | 0.59 | 0.33 | 0.04 | 113371 |
| 78 | 1.3 | N/A | N/A | 0.51 | 0.51 | 0.15 | 104824 |
| 79 | 0.83 | 0.19 | N/A | 0.54 | 0.38 | 0.04 | 128046 |
| 80 | 0.5 | 0.33 | N/A | 0.35 | 0.24 | 0.1 | 117467 |
| 81 | 1.08 | 0.18 | N/A | 0.71 | 0.43 | 0.04 | 93378 |
| 110 | 0.61 | 0.38 | N/A | 0.56 | 0.33 | 0.04 | 109739 |
| 111 | 0.51 | 0.39 | N/A | 0.48 | 0.34 | 0.01 | 105400 |

Example 30

Procedure for Regioselective C6 Propionylation of 2,3-Substituted Cellulose Esters An oven-dried 500 mL jacketed round bottomed flask was charged with a freshly dried (22 mmHg, 50° C., 12 h) Ex 58 (50 g, 8.9 wt % solids) under an atmosphere of nitrogen with mechanical stirring. The reaction vessel was connected via a rubber tubing to a Thermo Neslab RTE-7 temperature controller, and the setpoint was set to 25° C. To the flask was added DMAc (448 g), pyridine (61.6 g, 5.00 eq), and DMAP (1.90 g, 0.1 eq). The temperature controller was set to 50° C. and the mixture was stirred until the solids dissolved (~1-2 h), and the reaction mixture was cooled to rt. Then $Pr_2O$ (27.3 g, 1.35 eq) was added via liquids addition funnel (2 min). The mixture was allowed to stir 12 h at rt, and the mixture was diluted with acetone (150 mL). The resulting mixture was poured over deionized water (3000 mL). The precipitated crude product was broken down to a uniform size via homogenization, and the crude product was collected via vacuum filtration on a coarse frit. The crude product was washed on the filter with MeOH (200 mL). The crude product was then washed continuously with rt deionized water for 8 h. The title compound was obtained after drying in vacuo (60° C.) for 12 h. Analysis: $DS_{Pr}$: 1.4; $DS_{Bz}$: 1.5; C2DS: 0.9; C3DS: 0.9; C6DS: 1.0; $M_w$: 120,125 Da.

Example 31

Regioselectively 2,3-Substituted Benzoate/2-Naphthoate Propionate Cellulose

A 1000 mL jacketed reaction kettle was fitted with a 4-neck removable top. To the top was affixed an overhead stirring shaft, a temperature probe, a reflux condenser, and a ground glass stopper. The reaction was connected via a rubber tubing to a Thermo Neslab RTE-7 temperature controller, and the set-point was set to 25° C. The reactor was charged with Placetate F cellulose pulp (20 g, 5 wt %). To a separate 500 mL graduated cylinder was added TFA (337 g) followed by TFAA (41.9 g). The resulting solution was then slowly poured into the reactor. The temperature controller was set to 60° C., and the material was mixed via overhead stirring. After ~75 min, the mixture had formed a dark orange solution, at which point the temperature controller was set to 50° C. The glass stopper on the reaction kettle was replaced with a plastic funnel, and a mixture of $Bz_2O$ (27.8 g, 1.00 eq) and 2-$Np_2O$ (40.1 g, 1.00 eq) was added portion-wise. The reaction was allowed to stir for 12 h whereupon the dope was then precipitated by pouring into 3000 mL deionized water to afford the product as a white solid. The solids were broken down to a uniform particle size via homogenization. The solids were collected by filtration on a frit. The solids were then transferred to a cellulose thimble and extracted with MeOH for 24 h using a Soxhlet apparatus. The solids were then collected and suspended in 5 M $KOAc_{(aq.)}$ (2000 mL) and stirred for 36 h. The solids were collected by filtration on a frit and washed continuously with deionized water for 8 h. The solids were then dried in vacuo (60° C.) for 12 h. Analysis: $DSN_p$: 1.4; $DS_{Bz}$: 0.6; C2DS: 0.9; C3DS is 0.9; C6DS is 0.01; Mw is 157,907 Da.

By adapting the procedure for the synthesis of Ex 31, the examples in Table 11 were prepared.

TABLE 11

| Ex # | $Bz_2O$ (eq) | $Np_2O$ (eq) | $DS_{Bz}$ | $DS_{Np}$ | C2DS | C3DS | C6DS | GPC Mw |
|---|---|---|---|---|---|---|---|---|
| 74 | 1.5 | 0.5 | 1.1 | 0.8 | 0.9 | 0.9 | 0.05 | 156,992 |
| 75 | 0.5 | 1.5 | 0.2 | 1.8 | 0.9 | 0.9 | 0.01 | 136,457 |

Example 32

An oven-dried 500 mL jacketed round bottomed flask was charged with a freshly dried (50° C., 22.5 mmHg, 12 h) Ex 31 (10 g, 8.9 wt % solids) under an $N_2$ atmosphere with mechanical stirring. The reaction vessel was connected via a rubber tubing to a Thermo Neslab RTE-7 temperature controller, and the set-point was set to 25° C. To the flask was added DMAc (93 g), pyridine (9.4 g, 5.00 eq), and DMAP (0.29 g, 0.1 eq), and the temperature controller was set to 50° C. to facilitate dissolution of the starting material. Once complete dissolution of the cellulose ester was observed, the reaction was allowed to cool to room temperature, whereupon $Pr_2O$ (0.93 g, 0.3 eq) was added via dropwise syringe addition over a duration of approximately 2 min. The mixture was allowed to stir 12 h at rt whereupon the reaction mixture was diluted with 100 mL acetone. The resulting mixture was poured into water (2000 mL) to precipitate the crude product. The solids were broken down to a uniform size via homogenization, and the solids were collected via vacuum filtration on a coarse frit. The solids were washed on the filter with 200 mL MeOH (200 mL) and washed continuously with water for 8 h. The solids were then dried in vacuo (60° C.) for 12 h. Analysis: $DSN_p$: 1.4; $DS_{Bz}$: 0.6; $DS_{Pr}$: 0.3; C2DS: 0.9; C3DS: 0.9; C6DS: 0.3; $M_w$ is 166,868 Da.

By adapting the procedure for the preparation of Ex 32, the examples in Table 12 were prepared.

TABLE 12

| Ex # | Starting CE (Ex #) | Acylating Agent/Eq |
|---|---|---|
| 33 | 31 | $Pr_2O$ (0.5) |
| 34 | 31 | $Pr_2O$ (0.7) |
| 36 | 74 | $Pr_2O$ (0.3) |
| 37 | 74 | $Pr_2O$ (0.5) |
| 38 | 74 | $Pr_2O$ (0.7) |
| 39 | 75 | $Pr_2O$ (0.3) |
| 40 | 75 | $Pr_2O$ (0.5) |
| 41 | 75 | $Pr_2O$ (0.7) |

Table 13 provides the degree of substitution and molecular weight information for Ex 33-41.

TABLE 13

| Ex # | $DS_{Pr}$ | $DS_{Np}$ | $DS_{Bz}$ | C2DS | C3DS | C6DS | $M_w$ (Da) |
|---|---|---|---|---|---|---|---|
| 33 | 0.6 | 1.4 | 0.5 | 1.0 | 0.9 | 0.5 | 161,816 |
| 34 | 0.7 | 1.4 | 0.5 | 1.0 | 1.0 | 0.6 | 152,283 |
| 36 | 0.4 | 0.8 | 1.1 | 0.9 | 0.9 | 0.3 | 156,943 |
| 37 | 0.5 | 0.8 | 1.1 | 0.9 | 1.0 | 0.4 | N/A |
| 38 | 0.7 | 0.8 | 1.1 | 1.0 | 0.9 | 0.6 | 156,091 |
| 39 | 0.3 | 1.8 | 0.2 | 0.9 | 1.0 | 0.3 | 164,366 |
| 40 | 0.6 | 1.8 | 0.2 | 1.0 | 1.0 | 0.5 | 159,715 |
| 41 | 0.7 | 1.8 | 0.2 | 1.0 | 1.0 | 0.6 | 153,615 |

Example 42

Cellulose 2,3-Benzoate

A 1000 mL jacketed reaction kettle was fitted with a 4-neck removable top. To the top was affixed an overhead stirring shaft, a temperature probe, a reflux condenser, and a ground glass stopper. The reaction was connected via a rubber tubing to a Thermo Neslab RTE-7 temperature controller, and the setpoint was set to 25° C. The reactor was charged with Placetate F cellulose pulp (50 g, 5 wt. %). To a separate 500 mL graduated cylinder was added TFA (843 g) followed by TFAA (112 g). The resulting solution was then slowly poured into the reactor. The temperature controller was set to 60° C., and the material was mixed via overhead stirring. After ~75 min, the mixture had formed a dark orange solution, at which point the temperature controller was set to 50° C. The glass stopper on the reaction kettle was replaced with a plastic funnel, and $Bz_2O$ (125 g, 1.00 eq) was added portion-wise. The reaction was allowed to stir for 12 h whereupon the dope was then precipitated by pouring into deionized water (3000 mL) to afford the product as a white solid. The solids were broken down to a uniform particle size via homogenization. The solids were collected by filtration on a frit. The solids were then transferred to a beaker containing $^iPrOH$ (3000 mL) and slurried for 30 min. The solids were then collected by filtration on a coarse frit. The solids were then collected and suspended in 5 M $KOAc_{(aq.)}$ (2000 mL) and the mixture was stirred for 36 h. The solids were collected by filtration on a frit and washed continuously with water for 8 h. The solids were then dried in vacuo (60° C.) for 12 h. Analysis: $DS_{Pr}$: 0.0; $DS_{Bz}$: 1.3 (appears lower due to poor resolution in the NMR solvent); C2DS: 0.8; C3DS: 0.9; C6DS: 0.02; $M_w$: 129,434 Da.

Example 43

Cellulose 2,3-Benzoate-6-Propionate

A 1000 mL jacketed round bottomed flask was charged with a freshly vacuum dried (22.5 mmHg, 50° C., 12 h) Ex 42 (50 g, 8.9 wt % solids) under a $N_2$ atmosphere with mechanical stirring. The reaction vessel was connected via a rubber tubing to a Thermo Neslab RTE-7 temperature controller, and the set-point was set to 25° C. To the flask was added DMAc (443 g), pyridine (55.9 g, 5.00 eq), and DMAP (1.73 g, 0.1 eq), and the temperature controller was set to 50° C. The mixture was stirred until dissolution of the solids (~1-2 h). The reaction mixture was allowed to cool to rt and $Pr_2O$ (18.38 g, 1.0 eq) was added drop-wise (2 min). The mixture was allowed to stir 12 h at rt, and the reaction mixture was diluted with acetone (200 mL). The resulting mixture was poured into deionized water (3000 mL). The precipitated crude product was broken down to a uniform size via homogenization, and the crude product was collected via vacuum filtration on a coarse frit. The crude product was washed on the filter with MeOH (200 mL) and then a continuous stream of water at rt for 8 h. The title compound was obtained after drying (22.5 mmHg, 60° C., 12 h). Analysis: $DS_{Pr}$: 1.1; $DS_{Bz}$: 2.1; C2DS: 1.0; C3DS: 1.0; C6DS: 0.8; $M_w$: 139,604 Da; $T_g$: 171.2° C.

Using the procedure for the preparation of Ex 43, the examples in Table 14 were prepared.

TABLE 14

| Ex # | SM | Acylating Agent (eq) |
|---|---|---|
| 44 | 13 | $Pr_2O$ (5.0) |
| 45 | 13 | $Pr_2O$ (5.0) |
| 46 | 13 | $Pr_2O$ (1.3) |
| 47 | 58 | $Pr_2O$ (1.35) |
| 48 | 42 | $Pr_2O$ (1) |
| 49 | 13 | $Pr_2O$ (1.3) |
| 50 | 13 | $Pr_2O$ (1.4) |
| 51 | 13 | $Pr_2O$ (5.0) |
| 52 | 13 | $Pr_2O$ (1) |
| 53 | 13 | $Pr_2O$ (2) |
| 54 | 13 | $Pr_2O$ (1.33) |
| 55 | 5 | $Pr_2O$ (0.3) |
| 56 | 5 | $Pr_2O$ (0.5) |
| 57 | 13 | $Pr_2O$ (0.7) |

Table 15 provides the degree of substitution information, molecular weight and glass transition temperature information for Ex 44-57.

TABLE 15

| Ex # | $DS_{Pr}$ | $DS_{Bz}$ | C2DS | C3DS | C6DS | $M_w$ | $T_g$ (° C.) |
|---|---|---|---|---|---|---|---|
| 44 | 2.2 | 0.9 | 1.0 | 1.0 | 1.0 | 138,053 | 134.8 |
| 45 | 1.2 | 2.0 | 1.0 | 1.0 | 1.0 | 146,246 | 146.2 |
| 46 | 1.3 | 1.3 | 0.9 | 0.8 | 0.9 | 116,036 | 167.7 |
| 47 | 1.4 | 1.5 | 0.9 | 0.9 | 1.0 | 120,125 | 146.6 |
| 48 | 1.1 | 2.1 | 1.0 | 1.0 | 0.8 | 139,604 | 171.2 |
| 49 | 1.8 | 1.1 | 1.0 | 0.9 | 1.0 | 131,067 | 143.8 |
| 50 | 1.4 | 1.4 | 1.0 | 0.9 | 1.0 | 126,285 | 150.7 |
| 51 | 1.2 | 1.9 | 1 | 1 | 1 | 129,911 | 151.2 |
| 52 | 1.0 | 1.7 | 0.9 | 0.9 | 0.8 | 123,319 | 180.8 |
| 53 | 1.6 | 1.5 | 1.0 | 1.0 | 1 | 137,023 | 144.3 |
| 54 | 1.1 | 1.8 | 1.0 | 0.8 | 1.0 | 141,888 | 148.7 |
| 55 | 0.3 | 2.2 | 0.9 | 0.9 | 0.3 | 159,457 | 150.0 |
| 56 | 0.5 | 2.1 | 0.9 | 0.9 | 0.4 | 148,598 | 180.8 |
| 57 | 0.7 | 2.0 | 0.9 | 0.9 | 0.6 | 152,743 | 181.4 |

Example 67

Synthesis of Cellulose 2,3-propionate-6-naphthoate pivalate

An oven-dried 500 mL jacketed round bottomed flask was charged with freshly dried (22 mmHg, 50° C., 12 h) Ex 60 (20 g, 8.3 wt % solids) under an atmosphere of nitrogen with mechanical stirring. The reaction vessel was connected via rubber tubing to a Thermo Neslab RTE-7 temperature controller, and the setpoint was set to 25° C. To the flask was added DMAc (97 g) and pyridine (122 g). The temperature controller was set to 50° C. and the mixture was stirred until the solids dissolved completely (~1-2 h). The reaction mixture was then cooled to 20° C. In a separate vessel, 2-naphthyl chloride (6.55 g, 0.4 equiv) was taken up into 15-20 mL DMAc with magnetic stirring. Once the 2-naphthyl chloride was completely dissolved, the solution was added to the dissolved cellulose over a period of ~2 minutes with vigorous stirring. The reaction mixture was allowed to stir at 20° C. for 3-4 hours. After this time period had passed, the reaction mixture was charged with pivaloyl chloride (9.31 g, 0.9 equiv) over a period of 2 minutes with vigorous stirring. Once the addition was complete, the temperature controller was set to 35° C., and the resulting solution was allowed to stir for at least 12 hours. The reaction was then diluted with acetone (150 mL). The resulting mixture was poured over deionized water (3000 mL), and the precipitated crude product was broken down to a uniform size via homogenization. The resultant solids were collected via vacuum filtration on a coarse frit. The crude product was washed on the filter with two portions of $^i$PrOH (2×200 mL) The crude product was then washed continuously with rt deionized water for 8 h. The title compound was obtained after drying in vacuo (60° C.) for 12 h.

The examples in Table 16 were prepared by adapting the procedure for the preparation of Ex 67.

TABLE 16

| Ex # | SM | Acyl1 Donor (eq) | Acyl2 Donor (eq) |
|---|---|---|---|
| 66 | 59 | $Bz_2O$ (0.4) | PivCl (0.9) |
| 67 | 60 | $Np_2O$ (0.4) | PivCl (0.9) |
| 68 | 61 | $Bz_2O$ (0.6) | — |
| 69 | 62 | $Bz_2O$ (0.4) | PivCl (0.9) |
| 70 | 63 | TMBzCl (0.6) | PivCl (0.75) |
| 71 | 64 | TMBzCl (0.6) | PivCl (0.75) |
| 72 | 63 | $Np_2O$ (0.6) | PivCl (0.75) |
| 73 | 65 | $Bz_2O$ (0.4) | PivCl (0.9) |
| 82 | 76 | BzCl (0.4) | PivCl (0.9) |
| 83 | 76 | PivCl (1.3) | N/A |
| 84 | 77 | PivCl (0.9) | N/A |
| 85 | 78 | $Ac_2O$ (0.7) | BzCl (0.7) |
| 86 | 79 | BzCl (0.4) | PivCl (0.9) |
| 87 | 80 | BzCl (0.6) | $Ac_2O$ (0.9) |
| 88 | 81 | $Ac_2O$ (0.9) | N/A |

TABLE 16-continued

| Ex # | SM | Acyl1 Donor (eq) | Acyl2 Donor (eq) |
|---|---|---|---|
| 112 | 110 | BzCl (0.25) | Pr$_2$O (0.9) |
| 113 | 110 | BzCl (0.35) | Pr$_2$O (0.8) |
| 114 | 111 | BzCl (0.45) | Pr2O (0.7) |
| 115 | 111 | BzCl (0.45) | Pr2O (0.9) |

Table 17 provides degree of substitution, and molecular weight information for Ex 66-73, and 82-88.

TABLE 17

| Ex # | DS$_{Pr}$ | DS$_{Pv}$ | DS$_{Acyl1}$ | DS$_{Acyl2}$ | C2DS | C3DS | C6DS | GPC M$_w$ |
|---|---|---|---|---|---|---|---|---|
| 66 | 1.3 | 0.8 | Acyl1 = Bz, 0.3 | N/A | 0.8 | 0.5 | 1.0 | 103,666 |
| 67 | 1.2 | 0.7 | Acyl1 = Np, 0.4 | N/A | 0.8 | 0.5 | 1.0 | 107,643 |
| 68 | 1.3 | 0 | Acyl1 = Bz, 0.6 | N/A | 0.8 | 0.5 | 0.5 | 102,971 |
| 69 | 1.3 | 0.6 | Acyl1 = Bz, 0.6 | N/A | 0.9 | 0.5 | 1.0 | 98,052 |
| 70 | 1.3 | 0.6 | Acyl1 = TMBz, 0.5 | Acyl2 = Bz, 0.4 | 0.9 | 0.7 | 1.0 | 115,286 |
| 71 | 1.5 | 0.5 | Acyl1 = TMBz, 0.5 | Acyl2 = Bz, 0.3 | 0.9 | 0.9 | 1.0 | 131,278 |
| 72 | 1.3 | 0.5 | Acyl1 = Bz, 0.4 | Acyl2 = Np, 0.6 | 0.9 | 0.8 | 1.0 | 106,659 |
| 73 | 1.2 | 0.7 | Acyl1 = Bz, 0.6 | Acyl2 = Pv, 0.7 | 0.9 | 0.6 | 1.0 | 118,396 |
| 82 | 0.83 | 0.70 | Acyl1 = Bz, 0.62 | N/A | 0.78 | 0.38 | 0.97 | 112095 |
| 83 | 0.83 | 1.07 | N/A | N/A | 0.72 | 0.37 | 0.97 | 109607 |
| 84 | 0.77 | 0.34 | N/A | N/A | 0.60 | 0.37 | 0.73 | 159187 |
| 85 | 2.58 | 0 | N/A | 0.1 | 0.92 | 0.67 | 0.98 | 93970 |
| 86 | 0.80 | 0.76 | Acyl1 = Bz, 0.64 | N/A | 0.67 | 0.48 | 0.97 | 134357 |
| 87 | 1.44 | 0 | Acyl1 = Bz, 0.8 | N/A | 0.77 | 0.43 | 0.93 | 138436 |
| 88 | 1.94 | N/A | N/A | N/A | 0.83 | 0.54 | 0.63 | 99169 |
| 112 | 1.48 | N/A | Acyl1 = Bz, 0.61 | N/A | 0.61 | 0.74 | 0.45 | 123212 |
| 113 | 1.38 | N/A | Acyl1 = Bz, 0.70 | N/A | 0.73 | 0.48 | 0.82 | 119919 |
| 114 | 1.19 | N/A | Acyl1 = Bz, 0.81 | N/A | 0.69 | 0.43 | 0.82 | 112167 |
| 115 | 1.36 | N/A | Acyl1 = Bz, 0.80 | N/A | 0.75 | 0.44 | 0.91 | 107455 |

Preparation of Example 98

An oven-dried 500-mL jacketed 3-neck round-bottomed flask was transferred to the fume hood and affixed to the hood scaffolding. The flask was then allowed to purge under an atmosphere of nitrogen while cooling. The flask was then fitted with a mechanical stirrer and adapter along with a positive pressure of nitrogen. The flask was then charged with Ex 89 (20 grams) using a solids addition funnel. DMAc (50 mL) was added to the flask followed by pyridine (150 mL). The reaction temperature was adjusted to 50° C., and the mixture was allowed to stir until complete dissolution of the cellulose ester was observed. The reaction temperature was adjusted to 25° C., and 2-benzothiophene carbony chloride (10.3 g, 0.6 equiv) was added over the course of about 2 minutes. The reaction mixture was then allowed to hold for 3 hours, whereupon pivaloyl chloride (8.1 g, 0.77 equiv) was added dropwise over the course of 2 minutes. The reaction mixture was then warmed to 40° C. and allowed to stir for at least 12 hours. The resulting mixture was then diluted with 100 mL acetone and poured into a beaker containing 2000 mL deionized water, causing a white solid to precipitate. The solids were broken down to a uniform size via homogenization, and the solids were collected via vacuum filtration on a coarse frit. The solids were washed on the filter twice with 200 mL $^i$PrOH. The solids were then washed continuously with room temperature deionized water for 8 hours. The solids were then dried in vacuo in a ceramic dish (22.5 mm Hg, 60° C.) for 12 hours. The product was analyzed by $^1$H NMR, $^{13}$C NMR, GPC, and CIC. DSBz=0.29, DSC2=0.83, DSC3=0.52, DSC6=0.96.

By adapting general procedure B, the following cellulose esters were prepared

TABLE 18

| Ex # | SM (Ex #) | Aryl Acylating Agent, eq | Piv (Piv eq) |
|---|---|---|---|
| 99 | 59 | BzCl, 0.4 | 0.8 |
| 100 | 59 | NpCl, 0.4 | 0.9 |
| 101 | 90 | BzCl, 0.6 | 0 |
| 102 | 89 | TMBzCl, 0.6 | 0.75 |
| 103 | 91 | BzCl, 0.8 | 0 |
| 104 | 92 | NpCl, 0.6 | 0.75 |
| 105 | 93 | NpCl, 0.6 | 0.4[1] |
| 106 | 93 | BztCl, 0.6 | 0.75 |
| 107 | 61 | NpCl, 0.6 | 0.5 |
| 108 | 61 | BzBzCl, 0.6 | 0.4 |
| 109 | 4 | BiphCl, 0.8 | 0 |

[1] Propionic anhydride is used instead of pivaloyl chloride.

Table 19 provides the degrees of substitution for cellulose esters provided in Table 18.

TABLE 19

| Ex # | $DS_{Ar}$ | $Ds_{Pv}$ | DS $C_2$ | DS $C_3$ | DS $C_6$ | $DS_{OH}$ |
|---|---|---|---|---|---|---|
| 99 | Ar = Bz, 0.29 | 0.79 | 0.83 | 0.52 | 0.96 | 0.69 |
| 100 | Ar = Np, 0.40 | 0.71 | 0.84 | 0.52 | 0.95 | 0.69 |
| 101 | Ar = Bz, 0.61 | 0 | 0.83 | 0.61 | 0.52 | 1.04 |
| 102 | Ar = TMBz, 0.24 | 0.85 | 0.72 | 0.49 | 0.91 | 0.88 |
| 103 | Ar = Bz, 0.57 | 0 | 0.81 | 0.50 | 0.47 | 1.12 |
| 104 | Ar = Np, 0.53 | 0.45 | 0.83 | 0.39 | 0.89 | 0.89 |
| 105 | Ar = Np, 0.11 | 1.57[2] | 0.79 | 0.41 | 0.44 | 1.36 |
| 106 | Ar = Bzt, 0.52 | 0.44 | 0.81 | 0.42 | 0.85 | 0.92 |
| 107 | Ar = Np, 0.76 | 0.27[3] | 0.87 | 0.44 | 0.92 | 0.77 |
| 108 | Ar = BzBz, 0.59 | 0.10 | 0.95 | 0.48 | 0.95 | 0.62 |
| 109 | Ar = Biph, 0.80 | 0 | 0.95 | 0.75 | 0.72 | 0.58 |

[2]This value is $DS_{Pr}$ not $DS_{Pv}$.
[3]This value is higher than the theoretical due to overlap of NMR peaks.

Table 20 provides additional degree of substation information for Ex 98-103.

TABLE 20

| EX # | $C_2/C_3$ Aliphatic Group $(C_2/C_3 DS_{Ak})$ | $C_6$ Aromatic acyl Group $(C_6 DS_{Ar})$ | $C_6$ Residual Hydroxyl |
|---|---|---|---|
| 98 | Pr (1.18) | Bzt (0.59) | 0 |
| 99 | Pr (1.33) | Bz (0.29) | 0 |
| 100 | Pr (1.33) | Np (0.40) | 0 |
| 101 | Pr (1.50) | Bz (0.61) | 0.39 |
| 102 | Pr (1.15) | TMBz (0.24) | 0 |
| 103 | Pr (1.37) | Bz (0.57) | 0.43 |

Table 21 provides degree of substitution information for Ex 104-109.

TABLE 21

| EX # | $C_2/C_3$ Aliphatic Group $(C_2/C_3 DS_{Ak})$ | $C_6$ Aromatic Group $(C_6 DS_{Ar})$ | $C_2/C_3$ Residual Hydroxyl | $C_6$ Residual Hydroxyl |
|---|---|---|---|---|
| 104 | Pr (1.21) | Np (0.53) | 0.79 | 0.11 |
| 105 | Pr (1.57) | Np (0.11) | 0.43 | 0.89 |
| 106 | Pr (1.17) | Bzt (0.52) | 0.83 | 0.04 |
| 107 | Pr (1.27) | Np (0.76) | 0.73 | 0 |
| 108 | Pr (1.80) | BzBz (0.59) | 0.20 | 0.31 |
| 109 | Pr (1.79) | Biph (0.80) | 0.2 | 0.2 |

Films

Table 22 provides the films prepared using the general procedure for the preparation of the films.

TABLE 22

Unstretched Films

| Film # | CE Ex # | Solvent | d (μm) | Re (589 nm) | $R_{th}$ (589 nm) | $R_{th}/d$ | Film Color | Film Haze |
|---|---|---|---|---|---|---|---|---|
| 33.1 | 33 | MEK | 9.3 | 0.1 | 83.2 | 9.0 | — | — |
| 34.1 | 34 | MEK | 10.2 | 0.2 | 67.7 | 6.7 | — | — |
| 35.1 | 35 | DCM | 8.9 | 0.5 | 166.8 | 18.8 | — | — |
| 36.1 | 36 | Cyclopentanone | 18.9 | 1.3 | 230.6 | 12.2 | — | — |
| 37.1 | 37 | Cyclopentanone | 16.2 | 3.9 | 181.0 | 11.2 | — | — |
| 38.1 | 38 | MEK | 6.4 | 1.0 | 75.5 | 11.7 | — | — |
| 39.1 | 39 | DCM | 8.6 | 3.4 | 6.4 | 0.7 | — | — |
| 40.1 | 40 | DCM | 9.0 | 3.1 | −12.5 | −1.4 | — | — |
| 41.1 | 41 | DCM | 10.4 | 4.6 | −12.0 | −1.2 | — | — |
| 44.1 | 44 | MEK | 34.0 | 2.8 | 282.5 | 8.3 | 0.8 | 2.4 |
| 45.1 | 45 | MEK | 36.7 | 9.1 | 28.8 | 0.7 | 1.6 | 33.6 |
| 46.1 | 46 | MEK | 14.7 | 0.8 | 77.7 | 5.3 | 0.3 | 2.1 |
| 47.1 | 47 | MEK | 58.0 | 13.2 | 289.7 | 5.0 | 1.3 | 7.5 |
| 48.1 | 48 | MEK | 10.9 | 2.0 | 114.5 | 10.5 | 0.5 | 1.2 |
| 49.1 | 49 | MEK | 14.2 | 1.4 | 91.6 | 6.4 | 0.4 | 2.6 |
| 50.1 | 50 | MEK | 13.9 | 2.0 | 119.5 | 8.4 | 0.3 | 1.8 |
| 51.1 | 51 | MEK | 13.19 | 0.7 | 92.7 | 7.0 | 1.0 | 18.3 |
| 52.1 | 52 | MEK | 6.5 | 0.7 | 49.7 | 7.7 | 0.3 | 0.6 |
| 53.1 | 53 | MEK | 18.7 | 2.7 | 109.1 | 6.8 | 0.4 | 0.5 |
| 54.1 | 54 | MEK | 13.3 | 0.6 | 57.6 | 4.3 | 0.3 | 1.3 |
| 55.1 | 55 | Insoluble | — | — | — | — | — | — |
| 56.1 | 56 | Cyclopentanone | 12.5 | −0.1 | 89.0 | 7.1 | 0.4 | 1.58 |
| 57.1 | 57 | MEK | 6.5 | 0.2 | 54.7 | 8.6 | 0.3 | 0.19 |

The following films shown in Table 23 were prepared by adapting the previously disclosed procedures. The films were prepared from the solvent, MEK.

TABLE 23

| Film # | CE Ex # | Stretch Ratio | Temp | d (μm) |
|---|---|---|---|---|
| 30.1 | 30 | None | NA | 42.0 |
| 30.2 | 30 | 1 × 1.4 | 190 | 43.0 |
| 30.3 | 30 | 1 × 1.4 | 180 | 39.0 |
| 43.1 | 43 | None | | 10.9 |
| 43.2 | 43 | 1 × 1.2 | 185 | 50.0 |
| 43.3 | 43 | 1 × 1.2 | 175 | 47.0 |
| 43.4 | 43 | 1 × 1.1 | 195 | 52.0 |
| 46.2 | 46 | None | | 92.0 |
| 46.3 | 46 | 1.12 | 185 | 90.0 |
| 46.4 | 46 | 1.14 | 185 | 82.0 |
| 46.5 | 46 | 1.1 | 185 | 90.0 |
| 50.2 | 50 | None | | 87.0 |
| 50.3 | 50 | 1 × 1.2 | 175 | 60.0 |
| 54.2 | 54 | None | | 58.0 |
| 54.3 | 54 | 1.14 | 180 | 36.0 |
| 54.4 | 54 | 1.4 × 1.4 | 200 | 21.0 |
| 54.5 | 54 | 1 × 1.4 | 190 | 29.0 |
| 57.2 | 57 | None | | 61.0 |
| 57.3 | 57 | 1 × 1.4 | 195 | 56.0 |
| 57.4 | 57 | 1 × 1.2 | 195 | 58.0 |
| 57.5 | 57 | 1 × 1.1 | 195 | 60.0 |
| 57.6 | 57 | 1 × 1.05 | 195 | 66.0 |
| 57.7 | 57 | 1 × 1.07 | 195 | 62.0 |
| 57.8 | 57 | 1 × 1.02 | 195 | 62.0 |
| 52.2 | 52 | None | NA | 41.0 |
| 52.3 | 52 | None | NA | 40.0 |
| 52.4 | 52 | 1.4 × 1.4 | 190 | 41.0 |
| 52.5 | 52 | 1 × 1.4 | 180 | 48.0 |
| 53.2 | 53 | None | NA | 48.0 |
| 53.3 | 53 | 1.4 × 1.4 | 200 | 52.0 |
| 53.4 | 53 | 1 × 1.4 | 190 | 49.0 |
| 53.5 | 53 | 1 × 1.4 | 180 | 54.0 |
| 69.1 | 69 | 1 × 1.4 | 150 | 58.0 |
| 69.2 | 69 | 1 × 1.4 | 150 | 52.0 |
| 69.3 | 69 | 1 × 1.4 | 160 | 68.0 |
| 69.4 | 69 | 1 × 1.2 | 160 | 66.0 |
| 69.5 | 69 | 1 × 1.6 | 160 | 64.0 |
| 70.1 | 70 | 1 × 1.1 | 135 | 46.0 |
| 70.2 | 70 | 1 × 1.2 | 135 | 52.0 |

TABLE 23-continued

| Film # | CE Ex # | Stretch Ratio | Temp | d (μm) |
|---|---|---|---|---|
| 70.3 | 70 | 1 × 1.4 | 135 | 42.0 |
| 70.4 | 70 | 1 × 1.5 | 135 | 42.0 |
| 70.5 | 70 | 1 × 1.6 | 135 | 40.0 |
| 71.1 | 71 | 1 × 1.2 | 135 | 52.0 |
| 71.2 | 71 | 1 × 1.4 | 135 | 46.0 |
| 71.3 | 71 | 1 × 1.5 | 135 | 48.0 |
| 71.4 | 71 | 1 × 1.6 | 135 | 41.0 |
| 71.5 | 71 | 1 × 1.8 | 135 | 34.0 |
| 71.6 | 71 | 1 × 2 | 135 | 41.0 |
| 72.1 | 72 | 1 × 1.1 | 135 | 56.0 |
| 72.2 | 72 | 1 × 1.2 | 135 | 54.0 |
| 72.3 | 72 | 1 × 1.3 | 135 | 52.0 |
| 72.4 | 72 | 1 × 1.4 | 135 | 60.0 |
| 72.5 | 72 | 1 × 1.6 | 135 | 48.0 |
| 73.1 | 73 | 1 × 1.2 | 160 | 46.0 |
| 73.2 | 73 | 1 × 1.4 | 160 | 54.0 |
| 73.3 | 73 | 1 × 1.6 | 160 | 48.0 |
| 73.4 | 73 | 1 × 1.8 | 160 | 43.0 |
| 73.5 | 73 | 1 × 1.8 | 165 | 41.0 |
| 73.6 | 73 | 1 × 1.2 | 175 | 56.0 |
| 73.7 | 73 | 1 × 1.4 | 175 | 52.0 |
| 73.8 | 73 | 1 × 1.6 | 175 | 44.0 |
| 73.9 | 73 | 1 × 1.8 | 175 | 42.0 |
| 82.1 | 82 | 1 × 1 | N/A | 51 |
| 82.2 | 82 | 1 × 1.2 | 215 | 52 |
| 82.3 | 82 | 1 × 1.4 | 215 | 52 |
| 82.4 | 82 | 1 × 1.6 | 215 | 45 |
| 83.1 | 83 | 1 × 1 | N/A | 43 |
| 83.2 | 83 | 1 × 1.2 | 205 | 49 |
| 83.3 | 83 | 1 × 1.4 | 205 | 49 |
| 83.4 | 83 | 1 × 1.6 | 205 | 42 |
| 84.1 | 84 | 1 × 1 | N/A | 37 |
| 84.2 | 84 | 1 × 1.2 | 205 | 47 |
| 84.3 | 84 | 1 × 1.4 | 205 | 42 |
| 85.1 | 85 | 1 × 1 | N/A | 38 |
| 85.2 | 85 | 1 × 1.2 | 185 | 46 |
| 85.3 | 85 | 1 × 1.4 | 185 | 46 |
| 86.1 | 86 | 1 × 1 | N/A | 42 |
| 86.2 | 86 | 1 × 1.2 | 200 | 54 |
| 86.3 | 86 | 1 × 1.4 | 200 | 52 |
| 86.4 | 86 | 1 × 1.6 | 200 | 43 |
| 87.1 | 87 | 1 × 1 | N/A | 37 |
| 87.2 | 87 | 1 × 1.2 | 215 | 49 |
| 87.3 | 87 | 1 × 1.4 | 215 | 43 |
| 87.4 | 87 | 1 × 1.6 | 215 | 43 |
| 88.1 | 88 | 1 × 1 | N/A | 36 |
| 88.2 | 88 | 1 × 1.2 | 215 | 49 |
| 88.3 | 88 | 1 × 1.4 | 215 | 42 |
| 88.4 | 88 | 1 × 1.6 | 215 | 40 |

Table 24 provides additional properties for the films in Table 23.

TABLE 24

| Film # | $R_e$ (589 nm) | $R_{th}$ (589 nm) | Rth/d (589 nm) | $R_e$ (450 nm/ 550 nm) | $R_e$ (650 nm/ 550 nm) | $R_{th}$ (450 nm/ 550 nm) | $R_{th}$ (650 nm/ 550 nm) |
|---|---|---|---|---|---|---|---|
| 30.1 | 15.1 | 306.7 | 0.7 | 1.1 | 0.97 | 1.10 | 0.95 |
| 30.2 | 20.6 | 89.0 | 0.7 | 1.1 | 0.96 | 1.09 | 0.95 |
| 30.3 | 38.3 | 217.0 | 0.8 | 1.1 | 0.96 | 1.09 | 0.95 |
| 43.1 | 2.2 | 112.7 | 4.0 | 1.1 | 0.98 | 1.09 | 0.95 |
| 43.2 | −111.6 | 110.6 | 0.9 | 1.1 | 0.96 | 1.05 | 0.97 |
| 43.3 | −160.4 | −87435.2 | 0.9 | 1.1 | 0.96 | 2.53 | 0.41 |
| 43.4 | −113.5 | 124.2 | 0.8 | 1.1 | 0.96 | 1.06 | 0.96 |
| 46.2 | 26.6 | 526.6 | 0.5 | 1.1 | 0.96 | 1.08 | 0.96 |
| 46.3 | −652.0 | too large | 0.5 | | | | |
| 46.4 | too large | too large | 0.6 | | | | |
| 46.5 | −649.0 | too large | 0.5 | | | | |
| 50.2 | 52.3 | 571.6 | 0.6 | 1.08 | 0.96 | 1.08 | 0.95 |
| 50.3 | too large | too large | 0.8 | | | | |
| 54.2 | 24.84 | 279.37 | 0.9 | 1.08 | 0.96 | 1.03 | 0.99 |
| 54.3 | −189.99 | 296.20 | 1.5 | 1.08 | 0.96 | 1.07 | 0.93 |
| 54.4 | 10.80 | 64.75 | 2.6 | 1.08 | 0.96 | 1.09 | 0.95 |
| 54.5 | −106.93 | 145.89 | 1.9 | 1.08 | 0.96 | 1.09 | 0.95 |
| 57.2 | 5.04 | 422.51 | 0.9 | 1.09 | 0.97 | 1.08 | 0.97 |
| 57.3 | −596.00 | too large | 1.0 | | | | |
| 57.4 | −118.00 | too large | 1.0 | | | | |
| 57.5 | −371.00 | too large | 1.0 | | | | |
| 57.6 | −257.72 | 357.51 | 0.9 | 1.08 | 0.96 | 1.05 | 0.98 |
| 57.7 | −303.98 | 422.16 | 0.9 | 1.08 | 0.96 | 1.05 | 0.98 |
| 57.8 | −175.67 | 423.38 | 0.9 | 1.05 | 0.96 | 1.08 | 0.96 |
| 52.2 | 194.86 | −767.84 | 1.3 | 1.06 | 0.96 | 1.69 | 0.68 |
| 52.3 | 46.53 | 680.17 | 1.3 | 1.08 | 0.96 | 1.06 | 0.95 |
| 52.4 | −85.00 | 470.77 | 1.3 | 1.08 | 0.96 | 1.03 | 0.98 |
| 52.5 | 57.86 | 367.01 | 1.1 | 1.08 | 0.96 | 0.95 | 1.00 |
| 53.2 | 24.61 | 231.50 | 1.1 | 1.07 | 0.96 | 1.11 | 0.94 |
| 53.3 | 15.18 | 111.97 | 1.0 | 1.08 | 0.96 | 1.09 | 0.96 |
| 53.4 | 17.45 | 109.23 | 1.1 | 1.07 | 0.96 | 1.09 | 0.95 |
| 53.5 | 13.38 | 82.13 | 1.0 | 1.08 | 0.96 | 1.08 | 0.96 |
| 66.1 | 0.3 | −55.8 | −5.7 | 3.6 | 6.8 | 1.0 | 1.0 |
| 67.1 | 0.3 | −89.7 | −10.6 | −3.5 | 2.1 | 1.2 | 1.0 |
| 68.1 | 0.2 | −158.0 | −11.2 | 0.2 | 2.0 | 1.0 | 1.0 |
| 69.1 | 51.2 | −117.6 | −2.0 | 0.9 | 1.1 | 1.0 | 1.0 |
| 69.2 | 44.0 | −151.1 | −2.9 | 0.8 | 1.1 | 1.0 | 1.0 |
| 69.3 | 89.6 | −109.3 | −1.6 | 0.9 | 1.0 | 1.1 | 1.0 |
| 69.4 | 60.8 | −113.7 | −1.7 | 0.9 | 1.0 | 1.0 | 1.0 |
| 69.5 | 76.6 | −87.5 | −1.4 | 0.9 | 1.0 | 1.0 | 1.0 |
| 70.1 | 5.5 | −11.4 | −0.2 | 0.7 | 1.1 | 0.8 | 1.1 |
| 70.2 | 6.8 | −17.0 | −0.3 | 0.6 | 1.2 | 0.9 | 1.1 |

TABLE 24-continued

| Film # | $R_e$ (589 nm) | $R_{th}$ (589 nm) | Rth/d (589 nm) | $R_e$ (450 nm/ 550 nm) | $R_e$ (650 nm/ 550 nm) | $R_{th}$ (450 nm/ 550 nm) | $R_{th}$ (650 nm/ 550 nm) |
|---|---|---|---|---|---|---|---|
| 70.3 | 4.6 | −11.1 | −0.3 | −0.3 | 1.7 | 0.9 | 1.1 |
| 70.4 | 5.7 | −8.0 | −0.2 | −0.1 | 1.5 | 0.6 | 1.2 |
| 70.5 | −1.0 | −12.3 | −0.3 | 3.5 | −0.2 | 0.6 | 1.2 |
| 71.1 | 6.1 | −5.4 | −0.1 | 0.7 | 1.2 | 0.8 | 1.1 |
| 71.2 | 7.6 | −4.7 | −0.1 | 0.5 | 1.2 | 0.6 | 1.2 |
| 71.3 | 8.4 | −4.3 | −0.1 | 0.5 | 1.2 | 0.5 | 1.2 |
| 71.4 | 8.5 | −4.3 | −0.1 | 0.5 | 1.2 | 0.4 | 1.3 |
| 71.5 | 5.0 | −3.6 | −0.1 | 0.0 | 1.5 | 0.2 | 1.6 |
| 71.6 | 4.3 | −4.8 | −0.1 | −0.4 | 1.8 | −0.2 | 2.0 |
| 72.1 | 6.3 | −8.1 | −0.1 | 0.8 | 1.1 | 0.9 | 1.0 |
| 72.2 | 6.1 | −8.7 | −0.2 | 0.7 | 1.2 | 0.9 | 1.0 |
| 72.3 | 2.7 | −8.0 | −0.2 | 0.1 | 1.6 | 0.9 | 1.1 |
| 72.4 | −2.6 | −13.8 | −0.2 | 2.1 | 0.4 | 1.0 | 1.0 |
| 72.5 | −14.5 | −2.2 | −0.05 | 1.3 | 0.8 | −1.6 | 2.6 |
| 73.1 | 25.0 | −22.7 | −0.5 | 0.8 | 1.1 | 0.9 | 1.0 |
| 73.2 | 34.8 | −22.3 | −0.5 | 0.8 | 1.1 | 0.8 | 1.1 |
| 73.3 | 26.4 | −17.8 | −0.4 | 0.7 | 1.2 | 0.8 | 1.1 |
| 73.4 | 19.1 | −20.6 | −0.5 | 0.7 | 1.1 | 0.8 | 1.2 |
| 73.5 | 18.6 | −14.5 | −0.4 | 0.6 | 1.2 | 0.7 | 1.2 |
| 73.6 | 26.8 | −14.4 | −0.2 | 0.9 | 1.0 | 0.9 | 1.0 |
| 73.7 | 30.2 | −15.8 | −0.3 | 0.8 | 1.1 | 0.8 | 1.1 |
| 73.8 | 26.1 | −13.4 | −0.3 | 0.8 | 1.1 | 0.8 | 1.1 |
| 73.9 | 22.9 | −11.3 | −0.3 | 0.7 | 1.1 | 0.7 | 1.1 |
| 82.1 | 3.209 | −158.097 | 3.0999 | 1.103 | 0.917 | 0.982 | 1.015 |
| 82.2 | 61.747 | −34.630 | 0.666 | 0.997 | 1.003 | 0.999 | 0.991 |
| 82.3 | 73.351 | −38.657 | 0.743 | 0.992 | 1.004 | 0.993 | 0.994 |
| 82.4 | 78.489 | −42.247 | 0.939 | 0.991 | 1.006 | 1.077 | 0.975 |
| 83.1 | 2.122 | −83.432 | −1.940 | 0.922 | 1.017 | 0.972 | 1.024 |
| 83.2 | 24.891 | −15.009 | −0.306 | 0.892 | 1.053 | 0.896 | 1.050 |
| 83.3 | 35.226 | −20.047 | −0.409 | 0.877 | 1.060 | 0.886 | 1.054 |
| 83.4 | 38.401 | −22.457 | −0.535 | 0.859 | 1.068 | 0.872 | 1.060 |
| 84.1 | 1.919 | −99.118 | −2.679 | 0.815 | 1.066 | 0.958 | 1.019 |
| 84.2 | 69.881 | −41.347 | −0.880 | 0.907 | 1.049 | 0.916 | 1.041 |
| 84.3 | 74.817 | −42.662 | −1.016 | 0.895 | 1.052 | 0.903 | 1.046 |
| 85.1 | 3.002 | −132.495 | −3.487 | 0.955 | 1.011 | 0.995 | 1.003 |
| 85.2 | 83.935 | −51.382 | −1.117 | 0.916 | 1.043 | 0.929 | 1.035 |
| 85.3 | 104.780 | −65.776 | −1.430 | 0.925 | 1.039 | 0.936 | 1.032 |
| 86.1 | 1.078 | −91.626 | −2.182 | 0.786 | 1.128 | 0.841 | 0.990 |
| 86.2 | 11.163 | −2.170 | −0.040 | 0.585 | 1.208 | 3.780 | −5.568 |
| 86.3 | 12.626 | −1.063 | −0.020 | 0.504 | 1.278 | 2.390 | −2.516 |
| 86.4 | 13.025 | −2.825 | −0.066 | 0.477 | 1.349 | 5.068 | −6.635 |
| 87.1 | 3.119 | −183.472 | −4.959 | 0.953 | 1.028 | 1.009 | 0.995 |
| 87.2 | 55.589 | −35.083 | −0.716 | 0.825 | 1.085 | 0.861 | 1.066 |
| 87.3 | 58.971 | −35.006 | −0.814 | 0.794 | 1.103 | 0.826 | 1.084 |
| 87.4 | 62.773 | −34.244 | −0.796 | 0.770 | 1.113 | 0.783 | 1.106 |
| 88.1 | 1.634 | −142.284 | −3.952 | 0.859 | 1.089 | 0.960 | 1.015 |
| 88.2 | 66.429 | −39.755 | −0.811 | 0.705 | 1.134 | 0.742 | 1.106 |
| 88.3 | 61.407 | −38.319 | −0.912 | 0.624 | 1.167 | 0.695 | 1.129 |
| 88.4 | 55.016 | −36.105 | −0.903 | 0.553 | 1.201 | 0.627 | 1.172 |
| 98.1 | — | — | −4.39 | — | — | — | — |
| 99.1 | — | — | −5.70 | — | — | — | — |
| 100.1 | — | — | −8.54 | — | — | — | — |
| 101.1 | — | — | −6.58 | — | — | — | — |
| 102.1 | — | — | −3.87 | — | — | — | — |
| 103.1 | — | — | −9.15 | — | — | — | — |
| 104.1 | — | — | −11.09 | — | — | 1.06 | 0.97 |
| 105.1 | — | — | −9.67 | — | — | 1.02 | 0.99 |
| 106.1 | — | — | −11.33 | — | — | 1.07 | 0.97 |
| 107.1 | — | — | −12.08 | — | — | 1.07 | 0.96 |
| 108.1 | — | — | −16.0085 | — | — | 1.06 | 0.97 |
| 109.1 | — | — | −10.5215 | — | — | 1.10 | 0.95 |

Claims not Limited to Disclosed Embodiments

The preferred forms of the invention described above are to be used as illustration only, and should not be used in a limiting sense to interpret the scope of the present invention. Modifications to the exemplary embodiments, set forth above, could be readily made by those skilled in the art without departing from the spirit of the present invention.

The inventors hereby state their intent to rely on the Doctrine of Equivalents to determine and assess the reasonably fair scope of the present invention as it pertains to any apparatus not materially departing from but outside the literal scope of the invention as set forth in the following claims.

We claim:

1. A regioselectively substituted cellulose ester comprising:
(i) a plurality of $R^1$—CO— substituents;
(ii) a plurality of $R^4$—CO— substituents;
(iii) a plurality of hydroxyl substituents, wherein the degree of substitution of $R^1$—CO— at the C2 position ("C2DS$_{R1-CO-}$") is in the range of from about 0.2 to about 1.0, wherein the degree of substitution of $R^1$—CO— at the C3 position ("C3DS$_{R1-CO-}$") is in the range of from about 0.2 to about 1.0, wherein the degree of substitution of $R^1$—CO— at the C6 position ("C6DS$_{R1-CO-}$") is less than 0.1, wherein the degree of substitution of $R^4$—CO— at the C6 position ("C6DS$_{R4-CO-}$") is in the range of from about 0.1 to about 1.0, wherein the degree of substitution of hydroxyl is in the range of from about 0 to about 2.6, wherein $R^1$ is $(C_{1-20})$alkyl, wherein $R^4$ is $(C_{6-20})$aryl, wherein the aryl is unsubstituted or substituted by 1 to 6 $R^5$ groups, wherein $R^5$ is chosen from $(C_{1-6})$alkyl, halo$(C_{1-6})$alkyl, $(C_{1-6})$alkoxy, halo$(C_{1-6})$alkoxy, halo, $(C_{3-7})$cycloalkyl, $(C_{6-10})$aryl, or nitro.

2. The regioselectively substituted cellulose ester of claim 1, wherein $R^1$—CO— is propionyl.

3. The regioselectively substituted cellulose ester of claim 2, wherein the degree of substitution for propionyl is from about 1.0 to about 1.4, the C2 degree of substitution for propionyl is from 0.6 to 0.9, the C3 degree of substitution for propionyl is from about 0.3 to about 0.5.

4. The regioselectively substituted cellulose ester of claim 3, wherein the degree of substitution at the C6 position for propionyl is less than 0.05.

5. The regioselectively substituted cellulose ester of claim 1, wherein $(C_{6-20})$aryl-CO— is chosen from benzoyl and naphthoyl.

6. The regioselectively substituted cellulose ester of claim 1, wherein the weight average molecular weight ("$M_w$") is in the range from about 80,000 Da to about 250,000 Da.

* * * * *